(12) United States Patent
Toshimitsu

(10) Patent No.: US 12,437,006 B2
(45) Date of Patent: Oct. 7, 2025

(54) INFORMATION PROCESSING APPARATUS, NON-TRANSITORY COMPUTER READABLE MEDIUM STORING PROGRAM, AND INFORMATION PROCESSING METHOD FOR DOCUMENT ALIGNMENT

(71) Applicant: FUJIFILM Business Innovation Corp., Tokyo (JP)

(72) Inventor: Koki Toshimitsu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 702 days.

(21) Appl. No.: 17/584,384

(22) Filed: Jan. 26, 2022

(65) Prior Publication Data

US 2023/0097750 A1    Mar. 30, 2023

(30) Foreign Application Priority Data

Sep. 27, 2021 (JP) ................. 2021-156387

(51) Int. Cl.
*G06F 16/93* (2019.01)
*G06F 3/0482* (2013.01)
*G06F 3/04845* (2022.01)
*G06F 3/0486* (2013.01)
(Continued)

(52) U.S. Cl.
CPC .......... *G06F 16/93* (2019.01); *G06F 3/0482* (2013.01); *G06F 3/04845* (2013.01); *G06F 3/0486* (2013.01); *G06F 9/451* (2018.02); *G06T 7/70* (2017.01)

(58) Field of Classification Search
CPC ............ G06F 3/04845; G06F 3/0482; G06F 3/04842; G06F 3/0486; G06F 9/451; G06F 16/93; G06F 40/106; G06F 16/168; G06F 7/24; G06F 7/08; G06F 16/00; G06T 7/70; G06Q 10/06
See application file for complete search history.

(56) References Cited

U.S. PATENT DOCUMENTS

| | | | | |
|---|---|---|---|---|
| 5,847,708 A | * | 12/1998 | Wolff | G06F 16/954 715/764 |
| 8,032,505 B2 | | 10/2011 | Ito | |
| 9,170,725 B2 | * | 10/2015 | Ito | G06F 3/0483 |

(Continued)

FOREIGN PATENT DOCUMENTS

JP    2009217562    9/2009

OTHER PUBLICATIONS

"Office Action of Europe Counterpart Application", issued on Dec. 22, 2023, p. 1-p. 5.

(Continued)

*Primary Examiner* — Nicholas Ulrich
(74) *Attorney, Agent, or Firm* — JCIPRNET

(57) ABSTRACT

An information processing apparatus including a processor is provided. The processor is configured to acquire document attribute information of a document stored in a storage area, acquire other document attribute information of another document and positional information in a case where the other document is displayed in a display area, and determine a position in a case where the document is displayed in the display area based on the acquired document attribute information, the acquired other document attribute information, and the acquired positional information.

14 Claims, 34 Drawing Sheets

(51) Int. Cl.
*G06F 9/451* (2018.01)
*G06T 7/70* (2017.01)

(56) References Cited

U.S. PATENT DOCUMENTS

| | | | | |
|---|---|---|---|---|
| 2009/0234843 | A1* | 9/2009 | Ito | G06F 16/34 |
| | | | | 707/999.005 |
| 2010/0169823 | A1* | 7/2010 | Audet | G06Q 10/10 |
| | | | | 715/810 |
| 2011/0258540 | A1 | 10/2011 | Ueda et al. | |
| 2013/0191782 | A1 | 7/2013 | Sugita et al. | |
| 2015/0113394 | A1* | 4/2015 | Yamanakajima | G06F 3/0482 |
| | | | | 715/273 |

OTHER PUBLICATIONS

"Search Report of Europe Counterpart Application", issued on Aug. 9, 2022, pp. 1-7.
"Office Action of Japan Counterpart Application", issued on Jul. 22, 2025, with English translation thereof, p. 1-p. 10.

\* cited by examiner

FIG. 13

| DOCUMENT ID | DOCUMENT NAME | DOCUMENT TYPE | PROJECT NUMBER | X COORDINATE | Y COORDINATE | ... |
|---|---|---|---|---|---|---|
| D0000001 | FIRST QUOTATION | quotation | M0000001 | 1000 | 200 | |
| D0000002 | FIRST CONTRACT | contract | M0000001 | 1110 | 200 | |
| D0000003 | FIRST ORDER | order | M0000001 | 1220 | 200 | |
| D0000004 | SECOND QUOTATION | quotation | M0000002 | 1000 | 270 | |
| D0000005 | SECOND CONTRACT | contract | M0000002 | 1110 | 270 | |
| D0000006 | SECOND ORDER | order | M0000002 | 1220 | 270 | |
| D0000007 | THIRD QUOTATION | quotation | M0000003 | 1000 | 340 | |
| D0000008 | THIRD CONTRACT | contract | M0000003 | 1110 | 340 | |
| D0000009 | THIRD ORDER | order | M0000003 | 1220 | 340 | |
| D0000010 | FOURTH QUOTATION | quotation | M0000004 | (null) | (null) | |
| D0000011 | FOURTH CONTRACT | contract | M0000004 | (null) | (null) | |
| D0000012 | FOURTH ORDER | order | M0000004 | (null) | (null) | |
| ... | | | | | | |

FIG. 15

| DOCUMENT ID | DOCUMENT NAME | DOCUMENT TYPE | PROJECT NUMBER | X COORDINATE | Y COORDINATE | ... |
|---|---|---|---|---|---|---|
| D0000001 | FIRST QUOTATION | quotation | M0000001 | 1000 | 200 | |
| D0000002 | FIRST CONTRACT | contract | M0000001 | 1110 | 200 | |
| D0000003 | FIRST ORDER | order | M0000001 | 1220 | 200 | |
| D0000004 | SECOND QUOTATION | quotation | M0000002 | 1000 | 270 | |
| D0000005 | SECOND CONTRACT | contract | M0000002 | 1110 | 270 | |
| D0000006 | SECOND ORDER | order | M0000002 | 1220 | 270 | |
| D0000007 | THIRD QUOTATION | quotation | M0000003 | 1000 | 340 | |
| D0000008 | THIRD CONTRACT | contract | M0000003 | 1110 | 340 | |
| D0000009 | THIRD ORDER | order | M0000003 | 1220 | 340 | |
| D0000010 | FOURTH QUOTATION | quotation | M0000004 | 1000 | 410 | |
| D0000011 | FOURTH CONTRACT | contract | M0000004 | 1110 | 410 | |
| D0000012 | FOURTH ORDER | order | M0000004 | 1220 | 410 | |
| ... | | | | | | |

| DOCUMENT ID | DOCUMENT NAME | DOCUMENT TYPE | PROJECT NUMBER | X COORDINATE | Y COORDINATE | ... |
|---|---|---|---|---|---|---|
| D0000001 | FIRST QUOTATION | quotation | M0000001 | 1000 | 200 | |
| D0000002 | FIRST CONTRACT | contract | M0000001 | 1110 | 200 | |
| D0000003 | FIRST ORDER | order | M0000001 | 1220 | 200 | |
| D0000004 | SECOND QUOTATION | quotation | M0000002 | 1000 | 270 | |
| D0000005 | SECOND CONTRACT | contract | M0000002 | 1110 | 270 | |
| D0000006 | SECOND ORDER | order | M0000002 | 1220 | 270 | |
| D0000007 | THIRD QUOTATION | quotation | M0000003 | 1000 | 340 | |
| D0000008 | THIRD CONTRACT | contract | M0000003 | 1110 | 340 | |
| D0000009 | THIRD ORDER | order | M0000003 | (null) | (null) | |
| ⋮ | | | | | | |

FIG. 18

| DOCUMENT ID | DOCUMENT NAME | DOCUMENT TYPE | PROJECT NUMBER | X COORDINATE | Y COORDINATE | ... |
|---|---|---|---|---|---|---|
| D0000001 | FIRST QUOTATION | quotation | M0000001 | 1000 | 200 | |
| D0000002 | FIRST CONTRACT | contract | M0000001 | 1110 | 200 | |
| D0000003 | FIRST ORDER | order | M0000001 | 1220 | 200 | |
| D0000004 | SECOND QUOTATION | quotation | M0000002 | 1000 | 270 | |
| D0000005 | SECOND CONTRACT | contract | M0000002 | 1110 | 270 | |
| D0000006 | SECOND ORDER | order | M0000002 | 1220 | 270 | |
| D0000007 | THIRD QUOTATION | quotation | M0000003 | 1000 | 340 | |
| D0000008 | THIRD CONTRACT | contract | M0000003 | 1110 | 340 | |
| D0000009 | THIRD ORDER | order | M0000003 | 1220 | 340 | |
| ... | | | | | | |

| DOCUMENT ID | DOCUMENT NAME | DOCUMENT TYPE | PROJECT NUMBER | X COORDINATE | Y COORDINATE | ... |
|---|---|---|---|---|---|---|
| D0000010 | FOURTH QUOTATION | quotation | M0000004 | (null) | (null) | |
| D0000011 | FOURTH CONTRACT | contract | M0000004 | (null) | (null) | |
| D0000012 | FOURTH ORDER | order | M0000004 | (null) | (null) | |
| ⋮ | | | | | | |

FIG. 20

| DOCUMENT ID | DOCUMENT NAME | DOCUMENT TYPE | PROJECT NUMBER | X COORDINATE | Y COORDINATE | FINAL COORDINATE POSITION UPDATED DATE AND TIME |
|---|---|---|---|---|---|---|
| D0000001 | FIRST QUOTATION | quotation | M0000001 | 1000 | 200 | 12-21-2020 09:00:00 |
| D0000002 | FIRST CONTRACT | contract | M0000001 | 1110 | 200 | 12-21-2020 09:00:00 |
| D0000003 | FIRST ORDER | order | M0000001 | 1220 | 200 | 12-21-2020 09:00:00 |
| D0000004 | SECOND QUOTATION | quotation | M0000002 | 1000 | 270 | 12-21-2020 09:00:00 |
| D0000005 | SECOND CONTRACT | contract | M0000002 | 1110 | 270 | 12-21-2020 09:00:00 |
| D0000006 | SECOND ORDER | order | M0000002 | 1220 | 270 | 12-21-2020 09:00:00 |
| D0000007 | THIRD QUOTATION | quotation | M0000003 | 1000 | 340 | 12-21-2020 09:00:00 |
| D0000008 | THIRD CONTRACT | contract | M0000003 | 1110 | 340 | 12-21-2020 09:00:00 |
| D0000009 | THIRD ORDER | order | M0000003 | 1220 | 340 | 12-21-2020 09:00:00 |
| ... | | | | | | |

| DOCUMENT ID | DOCUMENT NAME | DOCUMENT TYPE | PROJECT NUMBER | X COORDINATE | Y COORDINATE | ... |
|---|---|---|---|---|---|---|
| D0000010 | FOURTH QUOTATION | quotation | M0000004 | 1000 | 410 | |
| D0000011 | FOURTH CONTRACT | contract | M0000004 | 1110 | 410 | |
| D0000012 | FOURTH ORDER | order | M0000004 | 1220 | 410 | |
| ... | | | | | | |

| DOCUMENT ID | DOCUMENT NAME | DOCUMENT TYPE | PROJECT NUMBER | X COORDINATE | Y COORDINATE | FINAL COORDINATE POSITION UPDATED DATE AND TIME | ... |
|---|---|---|---|---|---|---|---|
| D0000001 | FIRST QUOTATION | quotation | M0000001 | 1000 | 200 | 12-21-2020 09:00:00 | |
| D0000002 | FIRST CONTRACT | contract | M0000001 | 1110 | 200 | 12-21-2020 09:00:00 | |
| D0000003 | FIRST ORDER | order | M0000001 | 1220 | 200 | 12-21-2020 09:00:00 | |
| D0000004 | SECOND QUOTATION | quotation | M0000002 | 1000 | 270 | 12-21-2020 09:00:00 | |
| D0000005 | SECOND CONTRACT | contract | M0000002 | 1110 | 270 | 12-21-2020 09:00:00 | |
| D0000006 | SECOND ORDER | order | M0000002 | 1220 | 270 | 12-21-2020 09:00:00 | |
| D0000007 | THIRD QUOTATION | quotation | M0000003 | 1000 | 340 | 12-21-2020 09:00:00 | |
| D0000008 | THIRD CONTRACT | contract | M0000003 | 1110 | 340 | 12-21-2020 09:00:00 | |
| D0000009 | THIRD ORDER | order | M0000003 | 1220 | 340 | 12-21-2020 09:00:00 | |
| D0000010 | FOURTH QUOTATION | quotation | M0000004 | 1000 | 410 | 12-22-2020 09:00:00 | |
| D0000011 | FOURTH CONTRACT | contract | M0000004 | 1110 | 410 | 12-22-2020 09:00:00 | |
| D0000012 | FOURTH ORDER | order | M0000004 | 1220 | 410 | 12-22-2020 09:00:00 | |
| ... | | | | | | | |

| DOCUMENT ID | DOCUMENT NAME | DOCUMENT TYPE | PROJECT NUMBER | CREATOR ID | X COORDINATE | Y COORDINATE | ... |
|---|---|---|---|---|---|---|---|
| D0000001 | FIRST QUOTATION | quotation | M0000001 | User001 | 1000 | 200 | |
| D0000002 | FIRST CONTRACT | contract | M0000001 | User001 | 1110 | 200 | |
| D0000003 | FIRST ORDER | order | M0000001 | User001 | 1220 | 200 | |
| D0000004 | SECOND QUOTATION | quotation | M0000002 | User002 | 1000 | 270 | |
| D0000005 | SECOND CONTRACT | contract | M0000002 | User002 | 1110 | 270 | |
| D0000006 | SECOND ORDER | order | M0000002 | User002 | 1220 | 270 | |
| D0000007 | THIRD QUOTATION | quotation | M0000003 | User003 | 1000 | 340 | |
| D0000008 | THIRD CONTRACT | contract | M0000003 | User003 | 1110 | 340 | |
| D0000009 | THIRD ORDER | order | M0000003 | User003 | 1220 | 340 | |
| D0000010 | FOURTH QUOTATION | quotation | M0000004 | User004 | (null) | (null) | |
| D0000011 | FOURTH CONTRACT | contract | M0000004 | User004 | (null) | (null) | |
| D0000012 | FOURTH ORDER | order | M0000004 | User004 | (null) | (null) | |
| D0000013 | FIFTH QUOTATION | quotation | M0000005 | User005 | (null) | (null) | |
| D0000014 | FIFTH CONTRACT | contract | M0000005 | User005 | (null) | (null) | |
| D0000015 | FIFTH ORDER | order | M0000005 | User005 | (null) | (null) | |
| D0000016 | SIXTH QUOTATION | quotation | M0000006 | User004 | (null) | (null) | |
| D0000017 | SIXTH CONTRACT | contract | M0000006 | User004 | (null) | (null) | |
| D0000018 | SIXTH ORDER | order | M0000006 | User004 | (null) | (null) | |
| ... | | | | | | | |

| DOCUMENT ID | DOCUMENT NAME | DOCUMENT TYPE | PROJECT NUMBER | CREATOR ID | X COORDINATE | Y COORDINATE | ... |
|---|---|---|---|---|---|---|---|
| D0000001 | FIRST QUOTATION | quotation | M0000001 | User001 | 1000 | 200 | |
| D0000002 | FIRST CONTRACT | contract | M0000001 | User001 | 1110 | 200 | |
| D0000003 | FIRST ORDER | order | M0000001 | User001 | 1220 | 200 | |
| D0000004 | SECOND QUOTATION | quotation | M0000002 | User002 | 1000 | 270 | |
| D0000005 | SECOND CONTRACT | contract | M0000002 | User002 | 1110 | 270 | |
| D0000006 | SECOND ORDER | order | M0000002 | User002 | 1220 | 270 | |
| D0000007 | THIRD QUOTATION | quotation | M0000003 | User003 | 1000 | 340 | |
| D0000008 | THIRD CONTRACT | contract | M0000003 | User003 | 1110 | 340 | |
| D0000009 | THIRD ORDER | order | M0000003 | User003 | 1220 | 340 | |
| D0000010 | FOURTH QUOTATION | quotation | M0000004 | User004 | 1000 | 410 | |
| D0000011 | FOURTH CONTRACT | contract | M0000004 | User004 | 1110 | 410 | |
| D0000012 | FOURTH ORDER | order | M0000004 | User004 | 1220 | 410 | |
| D0000013 | FIFTH QUOTATION | quotation | M0000005 | User005 | 1000 | 550 | |
| D0000014 | FIFTH CONTRACT | contract | M0000005 | User005 | 1110 | 550 | |
| D0000015 | FIFTH ORDER | order | M0000005 | User005 | 1220 | 550 | |
| D0000016 | SIXTH QUOTATION | quotation | M0000006 | User004 | 1000 | 480 | |
| D0000017 | SIXTH CONTRACT | contract | M0000006 | User004 | 1110 | 480 | |
| D0000018 | SIXTH ORDER | order | M0000006 | User004 | 1220 | 480 | |
| ... | | | | | | | |

| DOCUMENT ID | DOCUMENT NAME | DOCUMENT TYPE | PROJECT NUMBER | X COORDINATE | Y COORDINATE | ... |
|---|---|---|---|---|---|---|
| D0000001 | FIRST QUOTATION | quotation | M0000001 | 1000 | 200 | |
| D0000002 | FIRST CONTRACT | contract | M0000001 | 1110 | 200 | |
| D0000003 | FIRST ORDER | order | M0000001 | 1220 | 200 | |
| D0000004 | SECOND QUOTATION | quotation | M0000002 | 1000 | 270 | |
| D0000005 | SECOND CONTRACT | contract | M0000002 | 1110 | 270 | |
| D0000006 | SECOND ORDER | order | M0000002 | 1220 | 270 | |
| D0000007 | THIRD QUOTATION | quotation | M0000003 | 1000 | 340 | |
| D0000008 | THIRD CONTRACT | contract | M0000003 | 1110 | 340 | |
| D0000009 | THIRD ORDER | order | M0000003 | 1220 | 340 | |
| D0000010 | FOURTH QUOTATION | quotation | M0000004 | (null) | (null) | |
| D0000011 | FOURTH CONTRACT | contract | M0000004 | (null) | (null) | |
| D0000012 | FOURTH ORDER | order | M0000004 | (null) | (null) | |
| ... | | | | | | |

| DOCUMENT ID | DOCUMENT NAME | DOCUMENT TYPE | PROJECT NUMBER | X COORDINATE | Y COORDINATE | ... |
|---|---|---|---|---|---|---|
| D0000001 | FIRST QUOTATION | quotation | M0000001 | 1000 | 200 | |
| D0000002 | FIRST CONTRACT | contract | M0000001 | 1110 | 200 | |
| D0000003 | FIRST ORDER | order | M0000001 | 1220 | 200 | |
| D0000004 | SECOND QUOTATION | quotation | M0000002 | 1000 | 270 | |
| D0000005 | SECOND CONTRACT | contract | M0000002 | 1110 | 270 | |
| D0000006 | SECOND ORDER | order | M0000002 | 1220 | 270 | |
| D0000007 | THIRD QUOTATION | quotation | M0000003 | 1000 | 340 | |
| D0000008 | THIRD CONTRACT | contract | M0000003 | 1110 | 340 | |
| D0000009 | THIRD ORDER | order | M0000003 | 1220 | 340 | |
| D0000010 | FOURTH QUOTATION | quotation | M0000004 | 1000 | 410 | |
| D0000011 | FOURTH CONTRACT | contract | M0000004 | (null) | (null) | |
| D0000012 | FOURTH ORDER | order | M0000004 | (null) | (null) | |
| ... | | | | | | |

B61

INFORMATION PROCESSING APPARATUS, NON-TRANSITORY COMPUTER READABLE MEDIUM STORING PROGRAM, AND INFORMATION PROCESSING METHOD FOR DOCUMENT ALIGNMENT

CROSS-REFERENCE TO RELATED APPLICATIONS

This application is based on and claims priority under 35 USC 119 from Japanese Patent Application No. 2021-156387 filed Sep. 27, 2021.

BACKGROUND

(i) Technical Field

The present invention relates to an information processing apparatus, a non-transitory computer readable medium storing a program, and an information processing method.

(ii) Related Art

For example, JP2009-217562A discloses a related document presenting system including: a storage section that, for each of a plurality of workspaces, stores an arrangement position of each electronic document arranged in a workspace; a reception section that, for one workspace selected among a plurality of workspaces, refers to information stored in the storage section, generates display information in which each electronic document in the workspace is arranged in each corresponding arrangement position, provides the generated display information to a user, and receives a designation of a target electronic document from the user on display based on the provided display information; a specifying section that refers to the information stored in the storage section, and specifies that, as an attention workspace, a workspace arranged with the electronic document considered to be identical with the target electronic document, for which the designation is received by the reception section, in a workspace other than the workspace corresponding to the display information provided by the reception section; a calculation section that calculates a degree of relationship of each electronic document in the attention workspace for the target electronic document based on positional information of each electronic document in the attention workspace specified by the specifying section and positional information of the electronic document considered to be identical with the target electronic document in the attention workspace; and a presentation section that presents information indicating an electronic document related to the target electronic document in each electronic document based on the degree of relationship of each electronic document for the target electronic document, which is calculated by the calculation section.

SUMMARY

Here, for example, in a case where stored documents are displayed in a workspace and the documents are displayed in an alignment method which is different from alignment of the documents in a case where a business is performed by a user, the business of the user using the documents in the workspace may not be efficiently performed.

Aspects of non-limiting embodiments of the present disclosure relate to an information processing apparatus, a non-transitory computer readable medium storing a program, and an information processing method that improve efficiency of the business of the user who uses the documents in the workspace, as compared with a case where the display is performed in the workspace using the alignment method which is different from the alignment of the documents in the case where the business is performed by the user.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a processor configured to: acquire document attribute information of a document stored in a storage area; acquire other document attribute information of another document, and positional information in a case where the other document is displayed in a display area; and determine a position in a case where the document is displayed in the display area based on the document attribute information, the other document attribute information, and the positional information, which are acquired.

BRIEF DESCRIPTION OF THE DRAWINGS

Exemplary embodiment(s) of the present invention will be described in detail based on the following figures, wherein:

FIGS. 9A and 9B are diagrams showing arrangement examples of thumbnail information in an extraction display area of an operation screen displayed on the display unit, in which FIG. 9A shows a first arrangement example and FIG. 9B shows a second arrangement example;

FIGS. 10A and 10B are diagrams showing arrangement examples of pieces of thumbnail information in the extraction display area of the operation screen displayed on the display unit, in which FIG. 10A shows a third arrangement example and FIG. 10B shows a fourth arrangement example;

FIG. 13 is a diagram explaining document information held by a document information management unit;

FIGS. 14A and 14B are diagrams explaining display content of the operation screen in a case where a batch extraction button is pressed, in which FIG. 14A shows a state in which an arrangement image area appears, and FIG. 14B shows a state in which an extraction display area is displayed according to the arrangement image area;

FIG. 15 is a diagram explaining content of document information updated in a case where batch extraction is performed;

FIGS. 16A and 16B are diagrams explaining a second exemplary embodiment, in which FIG. 16A is a diagram explaining an operation screen, and FIG. 16B is a diagram explaining document information held by a document information management unit;

FIGS. 17A and 17B are diagrams explaining display content of an operation screen in a case where a batch extraction button is pressed, in which FIG. 17A shows a state in which an arrangement image area appears, and FIG. 17B shows a state in which an extraction display area is displayed according to the arrangement image area;

FIG. 18 is a diagram explaining content of the document information updated in a case where batch extraction is performed;

FIGS. 19A and 19B are diagrams explaining a third exemplary embodiment, in which FIG. 19A is a diagram explaining an operation screen, and FIG. 19B is a diagram explaining document information held by a document information management unit;

FIG. 20 is a diagram explaining a work history held by a work history management unit;

FIGS. 21A and 21B are diagrams explaining display content of the operation screen in the case where a batch extraction button is pressed, in which FIG. 21A shows a state in which an arrangement image area appears, and FIG. 21B shows a state in which an extraction display area is displayed according to the arrangement image area;

FIGS. 22A and 22B are diagrams illustrating update performed by batch extraction, in which FIG. 22A shows the document information and FIG. 22B shows the work history;

FIG. 25 is a diagram explaining document information held by a document information management unit;

FIGS. 26A and 26B are diagrams explaining display content of the operation screen in a case where a batch extraction button is pressed, in which FIG. 26A shows a state in which an arrangement image area appears, and FIG. 26B shows a state in which an extraction display area is displayed according to the arrangement image area;

FIG. 27 is a diagram explaining content of document information updated in a case where batch extraction is performed;

FIGS. 30A and 30B are diagrams explaining display content of the operation screen in a case where a batch extraction button is pressed, in which FIG. 30A shows a state in which an arrangement image area appears, and FIG. 30B shows a state in which an extraction display area is displayed according to the arrangement image area;

FIGS. 31A and 31B are diagrams explaining an operation screen according to a sixth exemplary embodiment, in which FIG. 31A shows a state in which a user operation is not performed, and FIG. 31B shows a state after a batch extraction button is pressed;

FIG. 32 is a diagram explaining document information held by a document information management unit;

FIGS. 33A and 33B are diagrams explaining display content of the operation screen in a case where the batch extraction button is pressed, in which FIG. 33A shows a state in which the arrangement image area appears, and FIG. 33B shows a state in which an extraction display area is displayed according to the arrangement image area; and FIG. 34 is a diagram explaining content of document information updated in a case where batch extraction is performed.

DETAILED DESCRIPTION

Hereinafter, exemplary embodiments of the present invention will be described in detail with reference to the accompanying drawings.

Hardware Configuration of Image Displaying Apparatus 1

Figure 1:
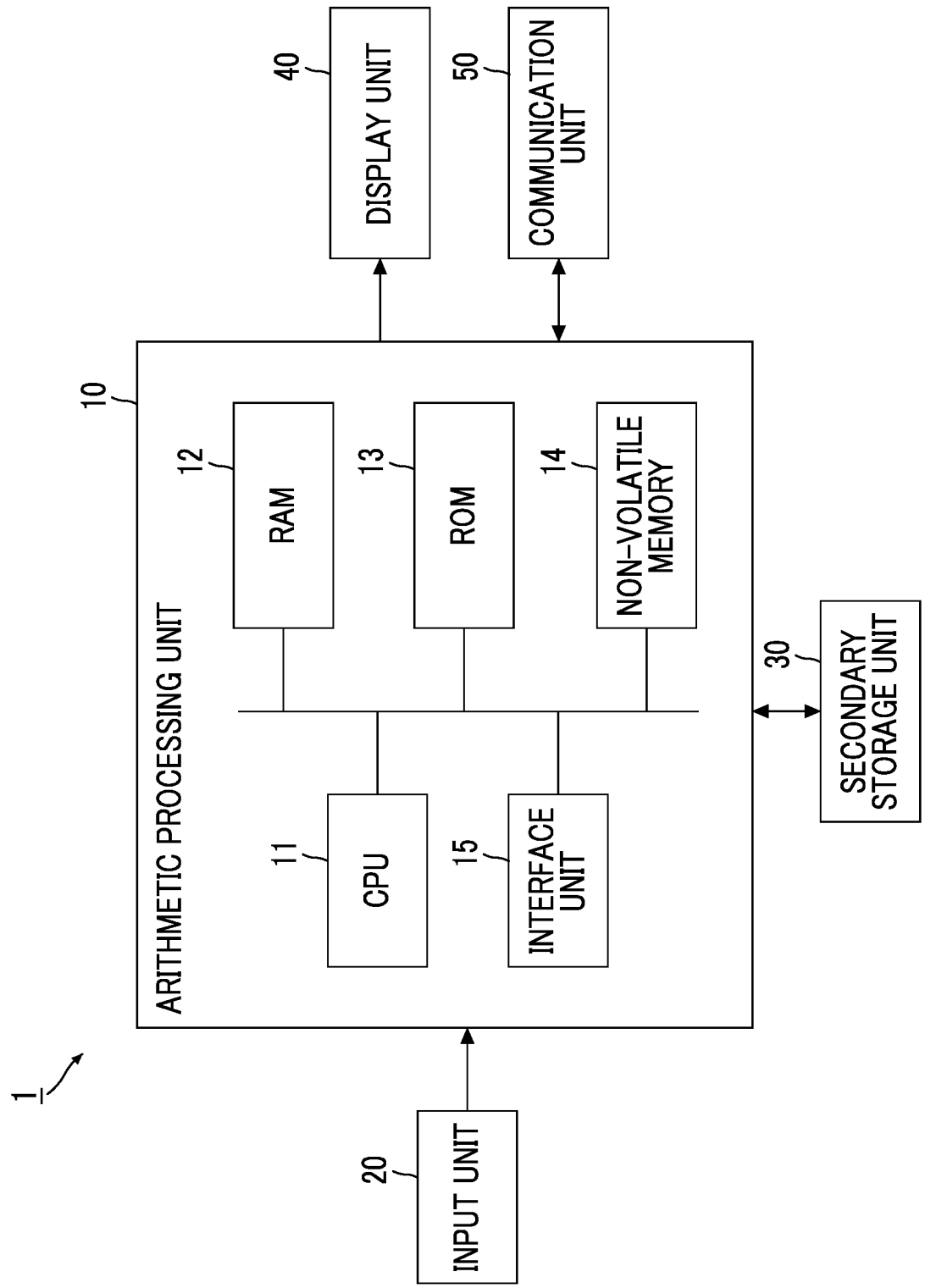
FIG. 1 is a diagram showing a hardware configuration example of an image displaying apparatus to which the present exemplary embodiment is applied.

FIG. 1 is a diagram showing a hardware configuration example of an image displaying apparatus 1 to which the present exemplary embodiment is applied.

As shown in FIG. 1, the image displaying apparatus 1 according to the present exemplary embodiment includes an arithmetic processing unit 10 that executes digital arithmetic processing according to a predetermined processing program at a time of screen display, an input unit 20 that receives an input operation from a user, and a secondary storage unit 30 that is realized by a Hard Disk Drive (HDD). Further, the image displaying apparatus 1 includes a display unit 40 that consists of a liquid crystal display panel and an organic Electro Luminescence (EL) display panel, and the like, which display images, text information, and the like to the user, and a communication unit 50 that transmits and receives data via a network. The image displaying apparatus 1 is an example of an information processing apparatus.

The arithmetic processing unit 10 includes a Central Processing Unit (CPU) 11, as an example of a processor, that controls an entire apparatus, a Random Access Memory (RAM) 12 that is used as a working memory of the CPU 11, and a Read Only Memory (ROM) 13 that stores an image display processing program or the like executed by the CPU 11. Further, the arithmetic processing unit 10 includes a non-volatile memory 14, such as a Static RAM (SRAM) or a flash memory, that is rewritable, can hold data even in a case where power supply is interrupted, and is backed-up by a battery, and an interface unit 15 that controls each unit, such as the input unit 20, which is connected to the arithmetic processing unit 10. The non-volatile memory 14 stores a document and image information, such as thumbnail information, displayed on the display unit 40.

The input unit 20 is a device, such as a pointing device, with which a user inputs an operation.

For example, in a case where the input unit 20 is a mouse or the like, the user can specify a position on the screen of the display unit 40 or a displayed image, or the like by performing a cursor movement operation or a click operation.

Further, in a case where the input unit 20 is a touch panel or the like, the user can specify the position on the screen or the displayed image by performing an operation of bringing a finger or the like in contact with the touch panel or an operation of maintaining a state in contact with the finger or the like for a longer time than a predetermined time. In this case, the input unit 20 is provided integrally with the display unit 40.

In addition to the device, such as the above-described pointing device, a keyboard or the like for performing a key input operation may be provided as the input unit 20.

Further, the secondary storage unit 30 stores image data and the like, and stores the image display processing program executed by the arithmetic processing unit 10. In a case where the arithmetic processing unit 10 reads the image display processing program, each process of the image displaying apparatus 1 of the present exemplary embodiment is executed.

The display unit 40 displays, for example, an office document or the like created by office software or other application programs, and thumbnail information that is highly convenient for managing a plurality of application files, image files, and the like is used.

The thumbnail information refers to a reduced image for displaying a list of files, and enables content to be approximately grasped without opening the file.

In a case where the file is configured with a plurality of pages, display may be performed in, in addition to a reduced display mode that allows content of only a first page or a representative page to be approximately grasped, a reduced display mode that allows content of each page to be approximately grasped by separating all pages to be distinguished. Further, the thumbnail image may be displayed by the operation of the user in a mode of an image enlarged and displayed on the display unit 40 without opening a file. The image in the mode is referred to as an "enlarged thumbnail image", and display of the enlarged thumbnail image may be referred to as "enlarged display".

The file may have a configuration of a single page or a page configuration in which a plurality of pages are bundled.

Here, the program executed by the CPU 11 is provided to the arithmetic processing unit 10 in a state of being stored in a computer-readable recording medium such as a magnetic recording medium (for example, a magnetic tape, a magnetic disk, or the like), an optical recording medium (for example, an optical disk), a magneto-optical recording medium, a semiconductor memory, or the like. Further, the program executed by the CPU 11 may be downloaded to the image displaying apparatus 1 by using a communication section such as the Internet.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The image displaying apparatus 1 may be connected to another apparatus via the network. As a result, a document or the like created by the other apparatus and transferred via the network is displayed on the image displaying apparatus 1. For example, in a case where certain business is configured with a plurality of documents, such as a development specification and a business order sheet, the plurality of documents are displayed on the image displaying apparatus 1. Further, the image displaying apparatus 1 performs a work of turning each page to different related departments and finally bundling and completing the pages as one document, and further, for example, a work such as approval is performed.

A Local Area Network (LAN) or the Internet is used as the network, and a complex type configuration of the LAN and the Internet may be provided.

Here, in a case where a plurality of documents are stored in an inbox in a personal workspace processed by the arithmetic processing unit 10 and the documents can be collectively extracted in a state of document arrangement which is easily started for a normal business by the user, business efficiency of the user can be improved.

The state of document arrangement which is easily started differs depending on a worker, and positional relationships of the document types, for example, an order, an arrangement shape, and an arrangement interval are various.

Therefore, the present exemplary embodiment has a configuration in which one or more documents stored in the inbox are collectively extracted with arrangement appropriate to normal business for each operation user based on a document arrangement situation in the workspace of the user or a coordinate arrangement history of the document. This will be described below.

Figure 2:
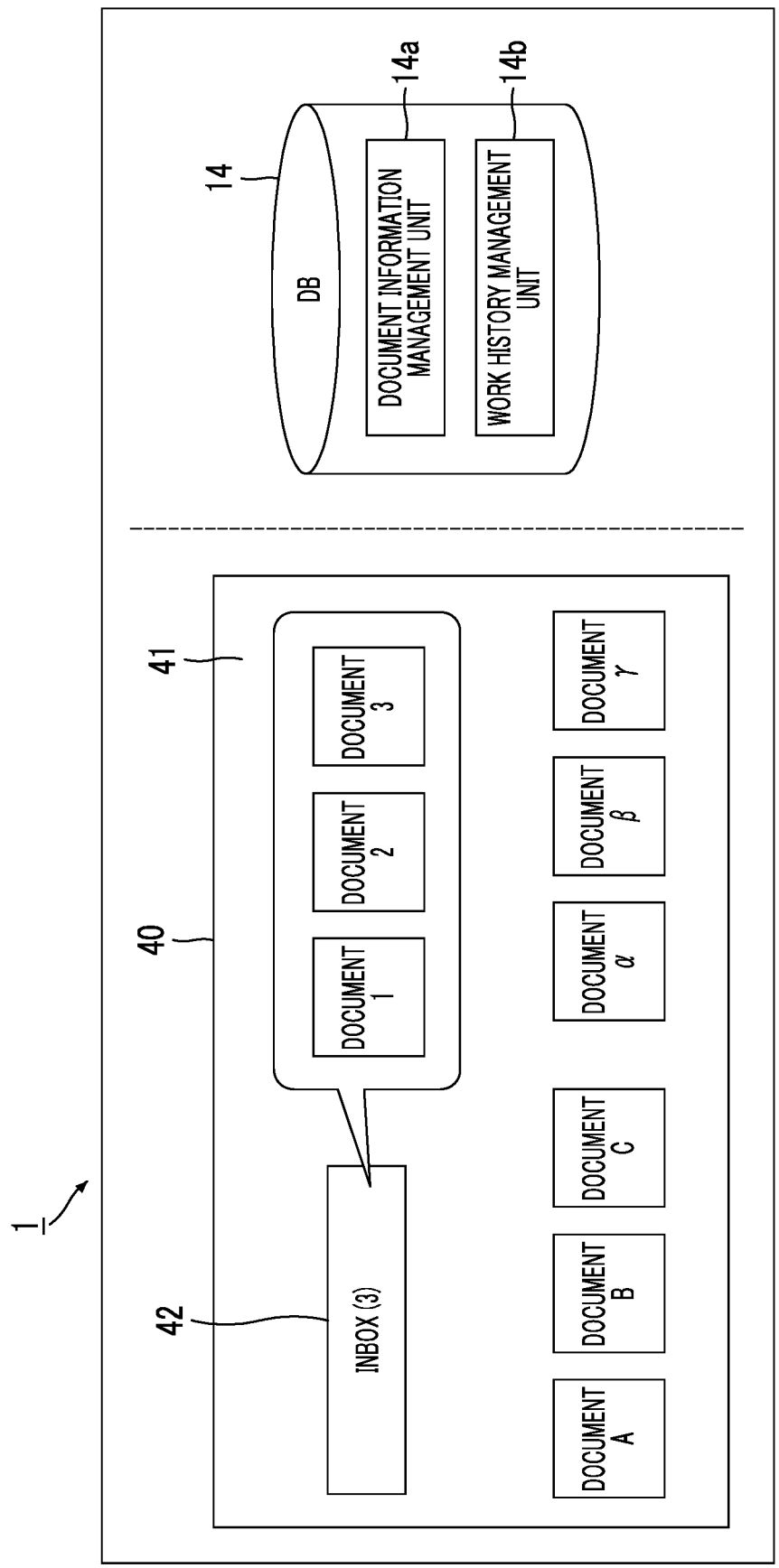
FIG. 2 is a diagram showing a configuration example of the image displaying apparatus.

FIG. 2 is a diagram showing a configuration example of the image displaying apparatus 1.

As shown in FIG. 2, a workspace 41 as the personal workspace is set in the display unit 40 of the image displaying apparatus 1. The workspace 41 is realized by file handling software using the RAM 12 (see FIG. 1).

The workspace 41 displays thumbnail information associated with the document at an arbitrary coordinate position. Further, the workspace 41 is a user's workspace in which the coordinate position of the thumbnail information can be moved and operations of preview, duplication, deletion, and the like can be performed on the document.

The document referred to here is a substance of a document (original content data). As described above, the workspace 41 displays the thumbnail information and the like associated with the document, and a word "document" may be used instead of the "thumbnail information" for explanation.

An inbox 42 arranged in the workspace 41 is a storage area which has a function capable of receiving a plurality of documents from another arbitrary user and which is capable of temporarily storing the documents received from the other user. The inbox 42 is arbitrarily arranged by the user in a location that is easy to see and easy to operate from above the workspace 41.

In a case where a document is stored in the inbox 42, the number of accumulated documents is displayed on an icon or a display name indicating the inbox 42, or a notification that a file has been received is provided to the user. In the example shown in FIG. 2, three documents, that is, a document 1, a document 2, and a document 3, are stored in the inbox.

A plurality of documents are stored in the inbox 42, and a document selected on the inbox 42 is moved to the workspace 41 by drag and drop due to a mouse operation or by a batch extraction operation, or the like. In the example shown in FIG. 2, as pieces of thumbnail information, a document A, a document B, and a document C, a document α, a document β, and a document γ are displayed, which have different types from the documents 1 to 3 stored in the inbox 42.

Further, a document information management unit 14a is set in a database as the non-volatile memory 14 (see FIG. 1)

of the image displaying apparatus 1. The document information management unit 14*a* has a function of managing document information (for example, document information Ta in FIG. 13) which is attribute information attached to the substance of the document. The attribute information is, for example, a document ID, a document type, a project number, a coordinate position (an X coordinate value, a Y coordinate value) on the workspace 41, or the like. The project number is synonymous with a group ID that bundles and indicates similar pieces of information.

More specifically, a creator ID indicating, for example, a worker may be added to the document information of the document information management unit 14*a* as a second related attribute (for example, see the document information Ta in FIG. 25). Even in a case where different projects having some connection are determined and the different projects correspond to the same type of work content, for example, a plurality of projects of an identical company at the same time, a set of documents of connected projects are arranged to be close even in a case where project numbers are not consecutive.

A work history management unit 14*b*, which manages the user's work history (for example, work history Tb in FIG. 20) and is shown by a broken line, may be set in the database. As a result, the database is reserved with an area for holding a final coordinate position with respect to the document on the workspace 41, and an area for holding the document ID, the document type, the project number, the final coordinate position on the workspace 41, final coordinate position update date and time, and the like. Since the user can arbitrarily change the arrangement of the document on the workspace 41, a history of the coordinate position where the document finally exists is held together with time information.

In a case where the work history management unit 14*b* is more specifically described, the document arranged on the workspace 41 is moved or deleted by the operation of the user in the normal business, so that the document is not limited to exist permanently and is not limited to be arranged at the same coordinate position.

That is, an extraction (arrangement) rule from the inbox 42 for each user is referred to as a normal business but changes finely every day in proficiency (experience or training) of the work of the user, automatic arrangement by a system according to a fixed rule defined in advance is not practical, and complicated setting performed for each user is to be avoided from a viewpoint of operability (usability).

Therefore, in a case where the work history management unit 14*b* holds the work history, arrangement appropriate to the normal business of the user is possible. Work history information may be held indefinitely, or may be held for a period such as one year or one month.

Further, in a case of using information of the final coordinate position of the document arranged in the workspace 41 in the past, the batch extraction is performed with arrangement desired to the user even in a case where a set of similar documents does not exist on the workspace 41. Further, even in a case where a set of similar documents exists on the workspace 41, the batch extraction is performed more accurately and effectively with the arrangement desired to the user by performing calculation while including past arrangement information.

Here, arrangement information of a document existing on the workspace 41 and the work history information held by the work history management unit 14*b* may be weighted or the like to determine which information is prioritized. The arrangement information of the document existing on the workspace 41 referred to here is current positional information, and the work history information is past positional information, and an alignment rule and an arrangement rule, which are set by the user from time to time, are guided.

More specifically, arrangement of the plurality of documents in the inbox 42 may be determined by using an average value for the work history information, for example, for a whole period. However, considering that a proficiency level of the user increases due to experience and the like, it may be considered that, in the whole past period, a period relatively close to the present is closer to a current user arrangement rule than a period far from the present. Therefore, as for the past positional information, the positional information of the document in the inbox 42 may be calculated by performing a weighting of adding weight to information relatively close to the present (for example, the past one week).

Further, in general, the current positional information may be more desired arrangement to the user than the past positional information but there is a case to which to the limitation is not applied. For example, in a case where the current positional information is not included in the past positional information, there is a possibility of returning to an arrangement rule, which is a user's trial rule, that is, a past arrangement rule. Therefore, the positional information of the document in the inbox 42 may be calculated by performing the weighting of adding the weight to the past positional information rather than the current positional information.

Further, for example, in a case where the current positional information is included in the past positional information, the positional information of the document in the inbox 42 may be calculated by performing the weighting of adding the weight to the current positional information rather than the past positional information.

The current positional information, that is, the arrangement information of the document existing on the workspace 41 is an example of the positional information in which another document is displayed in the display area. The past positional information, that is, the work history information held by the work history management unit 14*b* is an example of positional information as a history in which the other document is moved in the display area.

The positional information of the document in the inbox 42 may be calculated while using the arrangement information of the document existing on the workspace 41 but not using the work history information. A calculation method that does not use the work history information may be adopted in a case where the non-volatile memory 14 (see FIG. 1) of the image displaying apparatus 1 does not include the work history management unit 14*b* and a case where the non-volatile memory 14 includes the work history management unit 14*b*.

Figure 3:
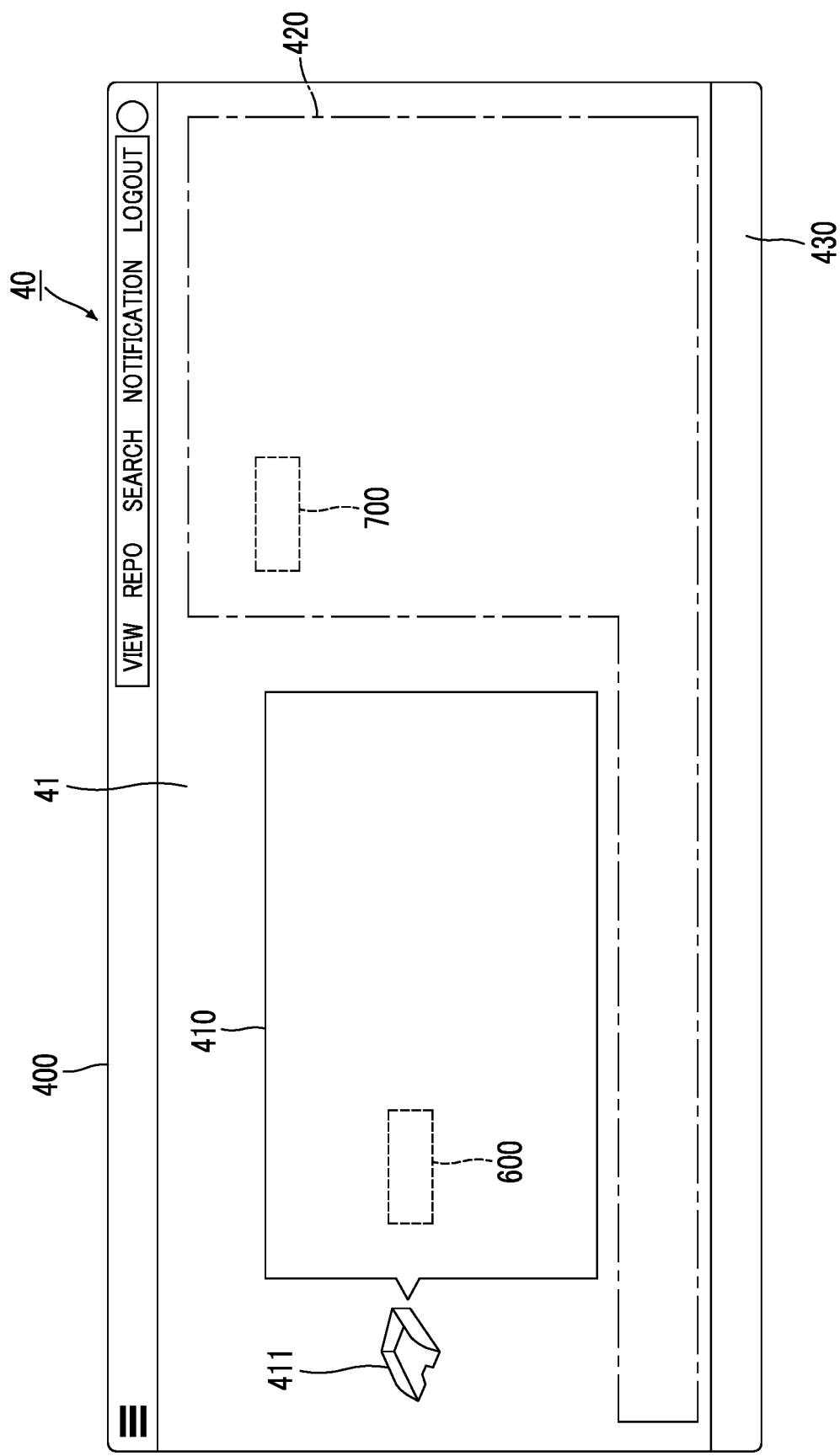
FIG. 3 is a diagram showing a configuration example of an operation screen displayed on a display unit.

FIG. 3 is a diagram showing a configuration example of an operation screen 400 displayed on the display unit 40.

The display unit 40 displays the operation screen 400 illustrated in FIG. 3. The operation screen 400 is the workspace 41 on the file handling software, and is an area arranged with pieces of thumbnail information 600 and 700 associated with documents transmitted by another user.

The file handling software is software that digitizes and manages files such as image data and document data, and has a function of promoting unified management of paper and electronic data.

The operation screen 400 displays a reception display area 410 and an extraction display area 420. Further, the operation screen 400 displays an icon 411 and a toolbar 430.

The icon 411 represents various functions, such as a program function, with pictograms, and indicates the inbox 42 (see FIG. 2). The toolbar 430 is a collection of instruction units that receive instructions by the user.

The reception display area 410 is an area for displaying the thumbnail information 600 associated with the document received in the inbox. The extraction display area 420 is an area for displaying the thumbnail information 700 extracted from the reception display area 410 according to the operation of the user.

The pieces of thumbnail information 600 and 700 are images that enable outline of documents to be grasped before opening the documents or files, and are display targets. The thumbnail information 600 is an image associated with the document stored in the inbox, and the thumbnail information 700 is an image associated with the document extracted from the inbox.

In the present exemplary embodiment, a document transmitted from another user is first stored in the inbox 42 (see FIG. 2), and existence of the document is shown in the reception display area 410 as thumbnail information 600. Further, in a case where the document in the inbox 42 is extracted by the operation of the user, the existence of the document is shown in the extraction display area 420 as the thumbnail information 700. The extraction display area 420 shown in FIG. 3 shows an example, and is an area excluding the reception display area 410 from the workspace 41.

A plurality of pieces of thumbnail information 600 can be displayed in the reception display area 410, and a plurality of pieces of thumbnail information 700 can also be displayed in the extraction display area 420.

Documents corresponding to the plurality of pieces of thumbnail information 600 in the reception display area 410 are collectively extracted or individually extracted.

In addition to a case where sizes of the plurality of pieces of thumbnail information 600 and 700 are the same, the sizes may be different depending on types of documents, paper sizes, and the like. Further, in a case where a user operation, such as a mouse over, in which a cursor (not shown) continues to point to position of the thumbnail information 600 or 700 is detected, enlarged display may be performed without newly starting a program.

The thumbnail information 600 or 700 is an image for grasping content for a file managed by the file handling software, and information that enables the user's business to smoothly proceed is displayed.

The thumbnail information 600 or 700 may be an image for confirming at least a part of the content, and, for example, may be displayed as an image obtained by simply reducing an original image in a case where a relevant file is image data, or may be displayed as an image obtained by reducing a representative page, such as a first page, in a case where the relevant file is document data of a plurality of pages.

In the present exemplary embodiment, the thumbnail information 600 or 700 functions as an icon for opening the relevant document. For example, by performing a specific operation such as a double-click operation on the thumbnail information 600 or 700, the relevant document is opened.

Functional Configuration of Image Displaying Apparatus 1

Next, a functional configuration of the image displaying apparatus 1 will be described.

Figure 4:
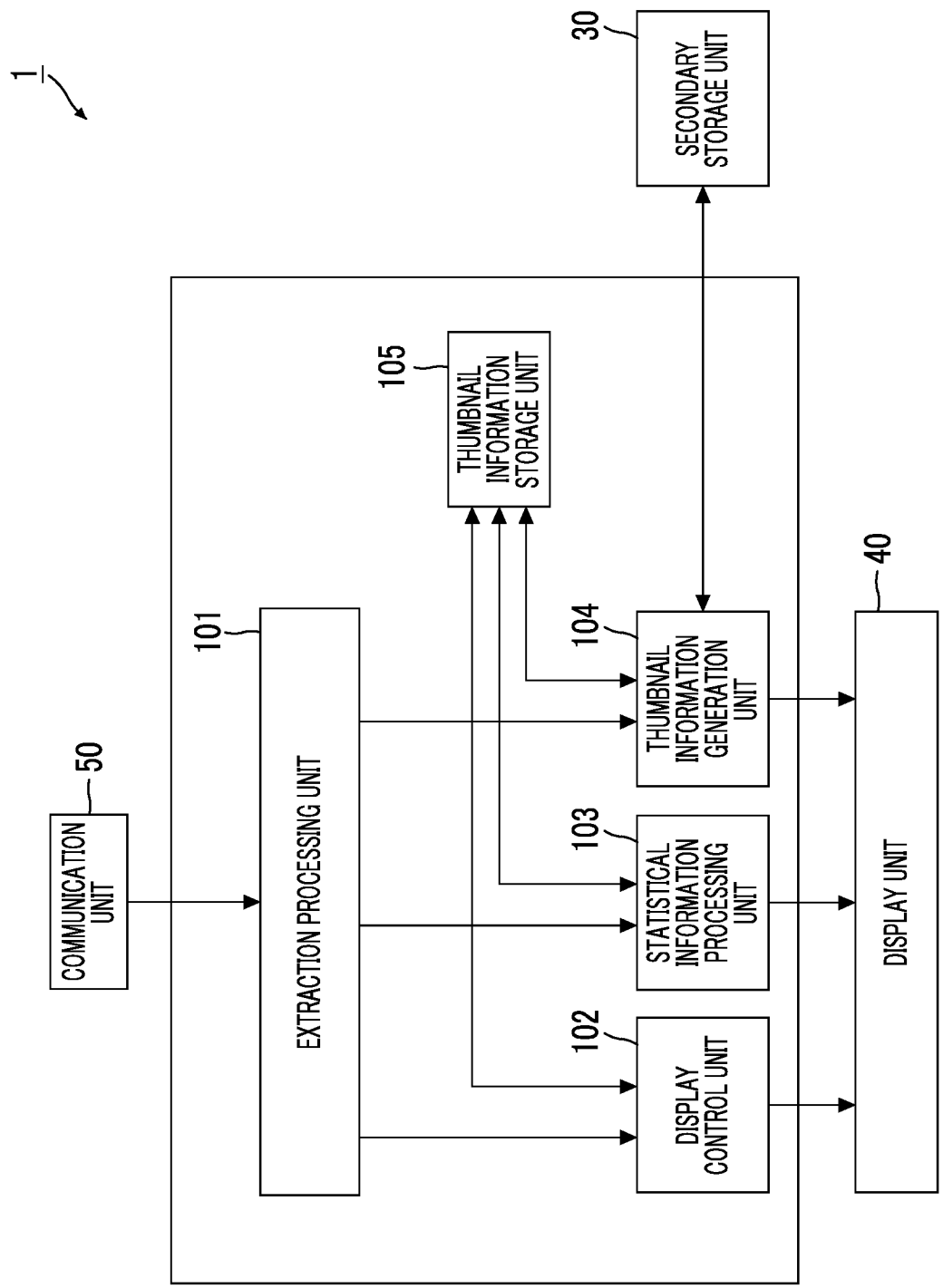
FIG. 4 is a block diagram showing a functional configuration example of the image displaying apparatus.
Figure 5:
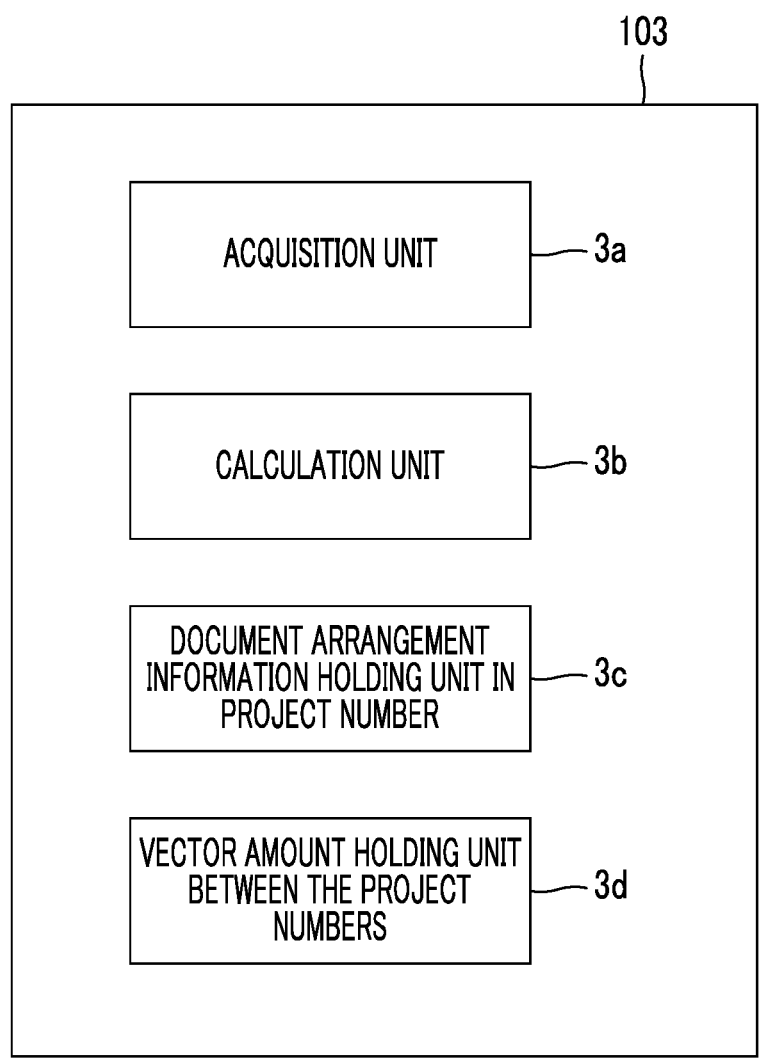
FIG. 5 is a block diagram showing the functional configuration example of the image displaying apparatus.

FIGS. 4 and 5 are block diagrams showing functional configuration examples of the image displaying apparatus 1.

As shown in FIG. 4, the image displaying apparatus 1 includes an extraction processing unit 101, a display control unit 102, a statistical information processing unit 103, a thumbnail information generation unit 104, and a thumbnail information storage unit 105, which are realized by the arithmetic processing unit 10 (see FIG. 1).

The extraction processing unit 101 performs a process of extracting a document from the inbox 42 (see FIG. 2). That is, the extraction processing unit 101 moves the thumbnail information of the reception display area 410 to the extraction display area 420, and, at that time, determines a coordinate position of the extraction display area 420 in which the thumbnail information is arranged.

The display control unit 102 presents to the user an arrangement image of the extraction display area 420 after extraction based on the coordinate position determined by the extraction processing unit 101, and arranges the thumbnail information in the extraction display area 420 according to the arrangement image screen in a case where the user approves the arrangement image screen.

More specifically, as shown in FIG. 5, the statistical information processing unit 103 shown in FIG. 4 includes an acquisition unit 3*a*, a calculation unit 3*b*, a document arrangement information holding unit 3*c* in the project number, and a vector amount holding unit 3*d* between the project numbers.

The acquisition unit 3*a* acquires document information stored in the document information management unit 14*a* (for example, the document information Ta of the first exemplary embodiment) or work history stored in the work history management unit 14*b* (for example, the work history Tb of the third exemplary embodiment). The calculation unit 3*b* uses the information acquired by the acquisition unit 3*a* to calculate the arrangement information of the document in the project number or calculate the vector amount between adjacent project numbers.

The document arrangement information holding unit 3*c* in the project number holds the document arrangement information in the project number selected from the arrangement information of the document, which is calculated by the calculation unit 3*b*. The vector amount holding unit 3*d* between the project numbers holds the vector amount between the project numbers, which is selected from the vector amount between adjacent project numbers, which is calculated by the calculation unit 3*b*.

Processing Example by Functional Configuration of Image Displaying Apparatus 1

Next, a processing example based on the functional configuration of the image displaying apparatus 1 (see FIGS. 4 and 5) will be described. First, a processing example by the statistical information processing unit 103 will be described.

Figure 6:
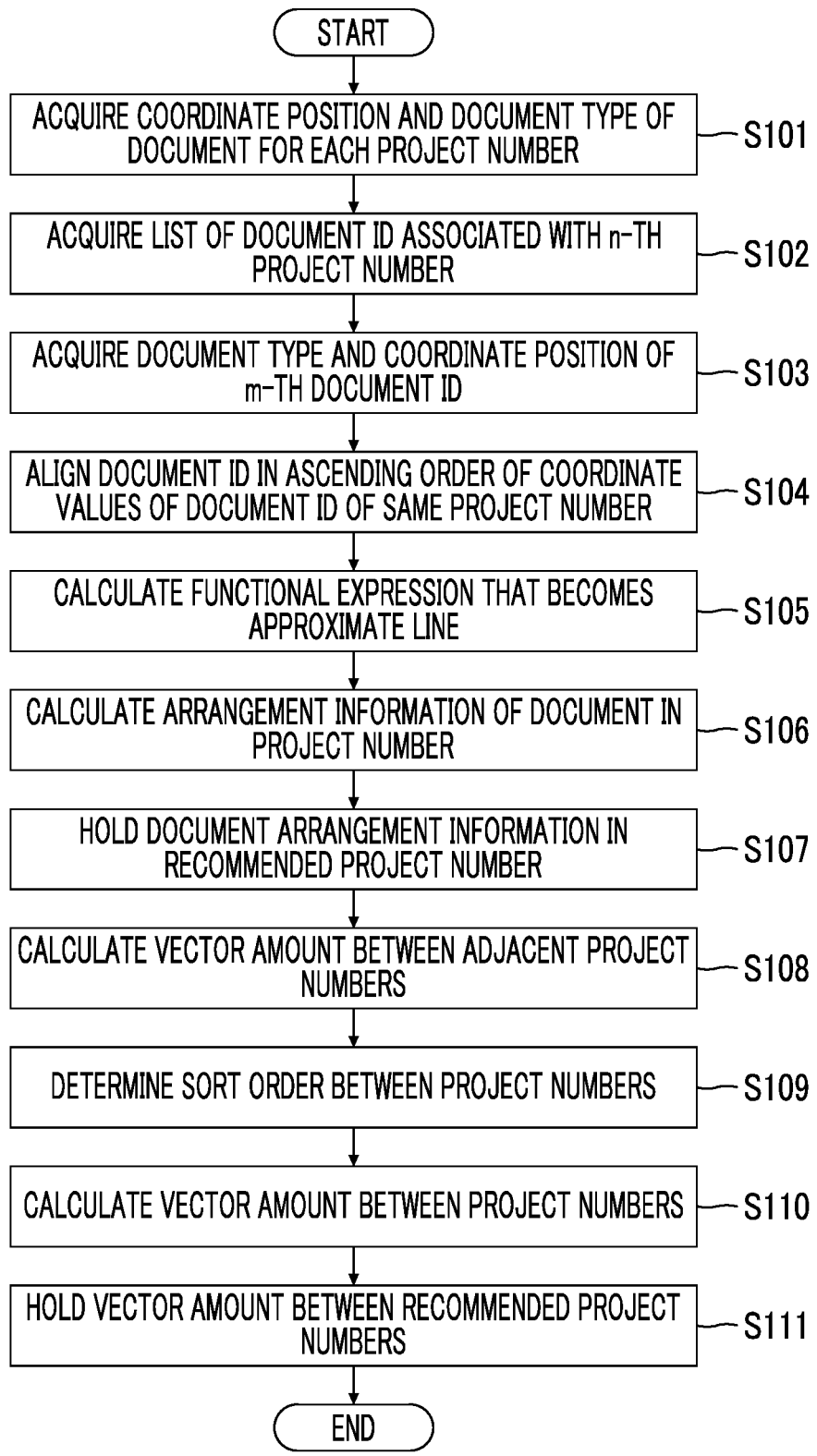
FIG. 6 is a flowchart showing a processing example by a statistical information processing unit.

FIG. 6 is a flowchart showing the processing example by the statistical information processing unit 103.

In the processing example shown in FIG. 6, the acquisition unit 3*a* (see FIG. 5) acquires the document information arranged on the workspace 41 of the user, or the coordinate position and the document type of the document for each project number from or the work history (step S101).

Then, in a case where a list of document IDs associated with an n-th project number is acquired (step S102), the acquisition unit 3*a* subsequently acquires the document type and the coordinate position of an m-th (m<n) document ID (step S103).

The acquired document IDs are aligned in ascending order of coordinate values of the document IDs of the identical project number (step S104), and the calculation unit 3*b* (see FIG. 5) calculates a functional expression that becomes an approximate line from coordinates of each document ID of the identical project number (step S105) and calculates the arrangement information of the document in the project number from the functional expression of the approximate line (step S106).

Steps 102 to 106 are repeated up to the final project number.

From calculation results of pieces of arrangement information of all the extracted documents of the project number, arrangement information of an average or representative document is selected, and is held by the document arrangement information holding unit 3c (see FIG. 5) in the project number as document arrangement information in a recommended project number (step S107). Then, the calculation unit 3b calculates the arrangement interval as the vector amount between adjacent project numbers (step S108).

A list of coordinates of a representative document ID of each project number (for example, a document ID of a quotation sheet) is acquired to be aligned in ascending order of the coordinate values, and a sort order between the project numbers is determined (step S109). After that, the calculation unit 3b calculates the vector amount between the most adjacent project numbers toward a direction of the sort order between the project numbers (step S110). From the calculation result of the vector amount between the project numbers, the vector amount between the average or representative project numbers is selected, and is held by the vector amount holding unit 3d between the project numbers as the vector amount between the recommended project numbers (step S111).

Next, a processing example by the extraction processing unit 101 will be described.

Figure 7:
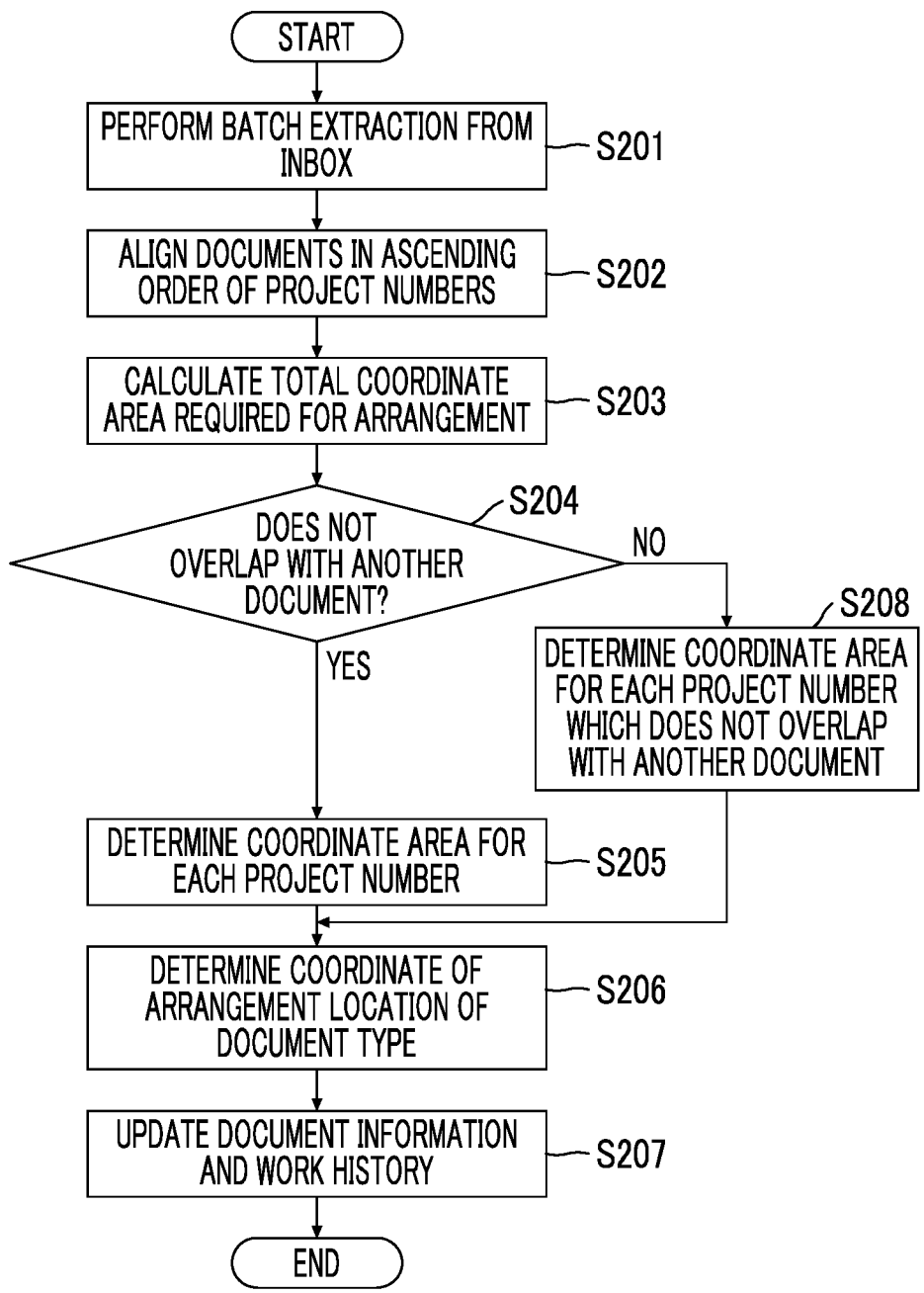
FIG. 7 is a flowchart showing a processing example by an extraction processing unit.

FIG. 7 is a flowchart showing the processing example by the extraction processing unit 101.

The processing example shown in FIG. 7 shows internal control in a case where the batch extraction is performed from the inbox 42 (see FIG. 2). In a case where the batch extraction is performed from the inbox according to an operation instruction of the user (step S201), the documents stored in the inbox are extracted for each project and are aligned in ascending order of the project numbers (step S202). Then, the total coordinate area required for arrangement is calculated from the recommended vector amount between the project numbers and the number of project numbers of the vector amount holding unit 3d between the project numbers (step S203).

Whether or not the total coordinate area fits on the workspace 41 without overlapping with another document is confirmed, starting from the coordinate position of the "representative document ID" of the largest project number which is already arranged, for example, the document ID of the quotation sheet (step S204).

In a case where the total coordinate area fits on the workspace 41 (Yes in step S204), a coordinate area for each project number is determined according to the vector amount between the recommended project numbers from the coordinate position of the "representative document ID" of the largest project number which is already arranged (step S205). After that, in the coordinate area for each project number in project units, coordinates of an arrangement location of the document type are determined according to the document arrangement information in the recommended project number (step S206). The document information and the work history are updated according to confirmation of the arrangement location by an operator (step S207).

The update of the document information referred to here will be described in, for example, a first exemplary embodiment which will be described later, and the update of the work history will be described in, for example, a third exemplary embodiment which will be described later. That is, in step S207, the document information and the work history are updated, but only the document information may be updated.

In a case where the total coordinate area does not fit on the workspace 41 (No in step S204), the coordinate area for each project number is determined on the arbitrary workspace 41 that does not overlap with the other document (step S208), and the process proceeds to step S206.

Next, a processing example by the display control unit 102 will be described.

Figure 8:
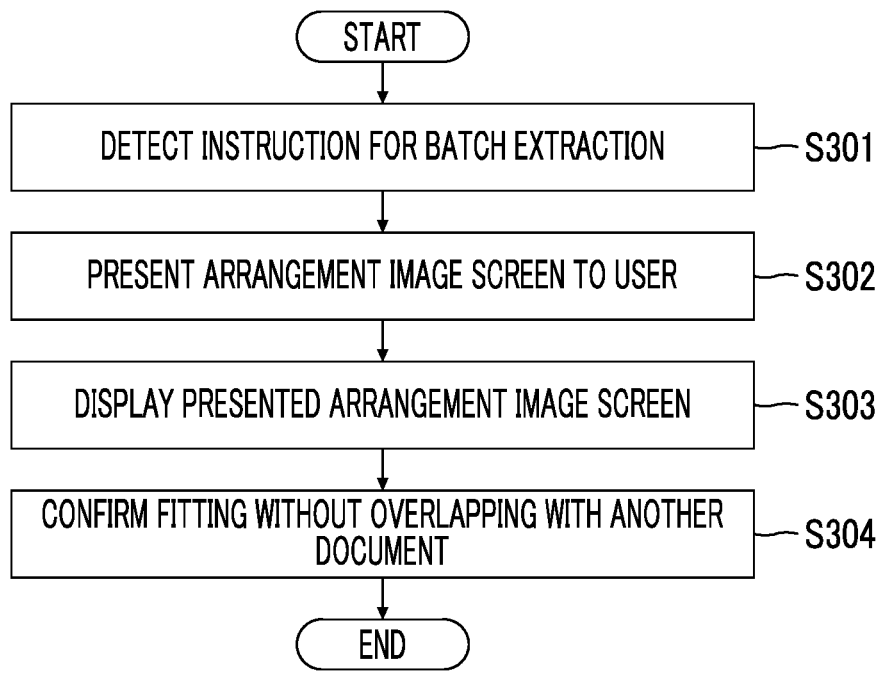
FIG. 8 is a flowchart showing a processing example by a display control unit.

FIG. 8 is a flowchart showing the processing example by the display control unit 102.

The processing example shown in FIG. 8 shows UI control performed together with the internal control (see FIG. 7) in a case where the batch extraction from the inbox 42 is performed (see FIG. 2). In a case where an instruction for the batch extraction from the inbox (see FIG. 2) is detected (step S301), a document arrangement image screen of the workspace 41 (see FIG. 2) after the batch extraction is performed is presented to the user (step S302). In a case where an instruction to display presented content is detected, the batch extraction is performed so that the result of the presented arrangement image screen is obtained (step S303). The fact that the total coordinate area fits on the workspace 41 without overlapping with the other document is confirmed starting from the coordinate position of the "representative document ID" of the largest project number which is already arranged, for example, the document ID of the quotation sheet (step S304), and the process is terminated.

Next, specific business content using the document will be described.

In digital transaction business (reception of an order), a general clerk as a worker receives a set of forms from a sales representative to an image displaying apparatus of the clerk when receiving an order sheet, confirms the content, and sends the set of forms to the outbox in order to request approval from a manager who is an approver. As the set of forms referred to here, for example, a form name is a quotation sheet, a contract sheet, an order sheet, or the like.

The worker arranges a set of forms received from the sales representative, that is, quotation sheets, contract sheets, and order sheets, to be aligned to be adjacent on the workspace 41 (see FIG. 2) in project units, and performs a paper work of visual comparison and confirmation, and editing operation. The documents are arranged on the workspace 41 using an alignment method that is easy for the user to work on.

The alignment method that is easy for the user to work on differs depending on the worker, and the positional relationships of the document types, for example, an order, an arrangement shape, and an arrangement interval are various. More specifically, an arrangement method for each project (group) differs depending on the user, and an arrangement method for each the document types in project units also differs depending on the user.

Arrangement Example of Thumbnail Information in Extraction Display Area 420

Next, an arrangement example of the thumbnail information in the extraction display area 420 of the operation screen 400 displayed on the display unit 40 will be described.

Figure 9A:
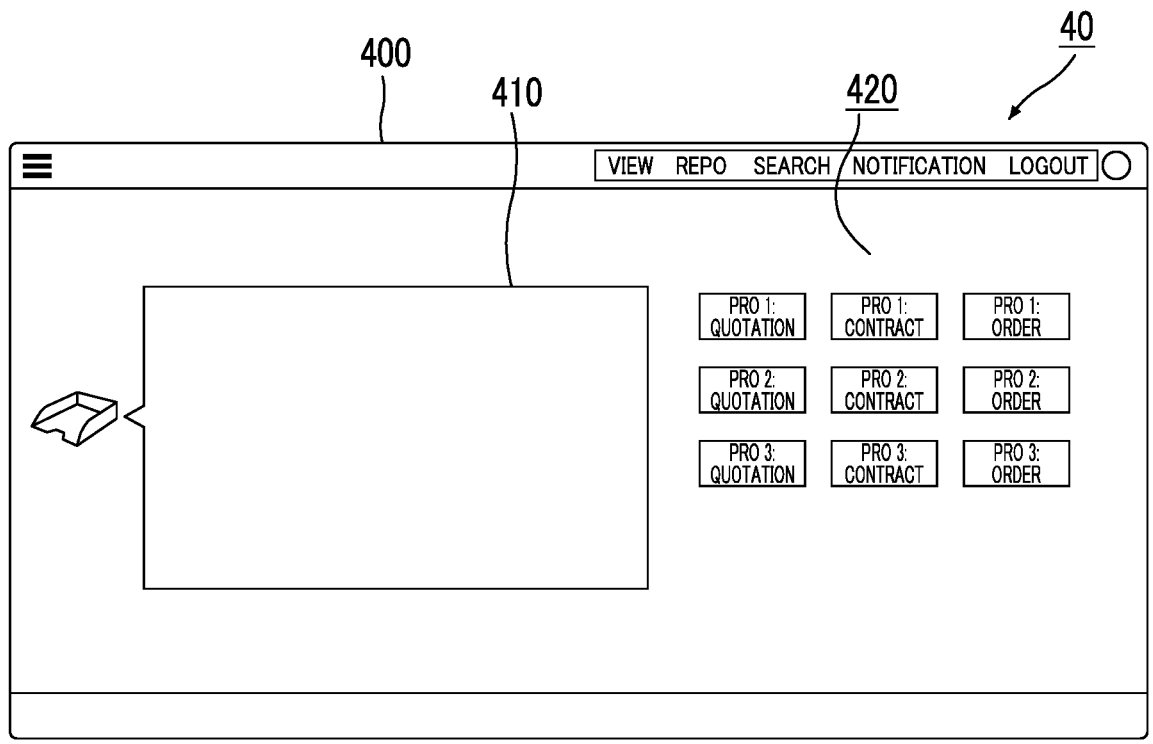
Figure 9B:
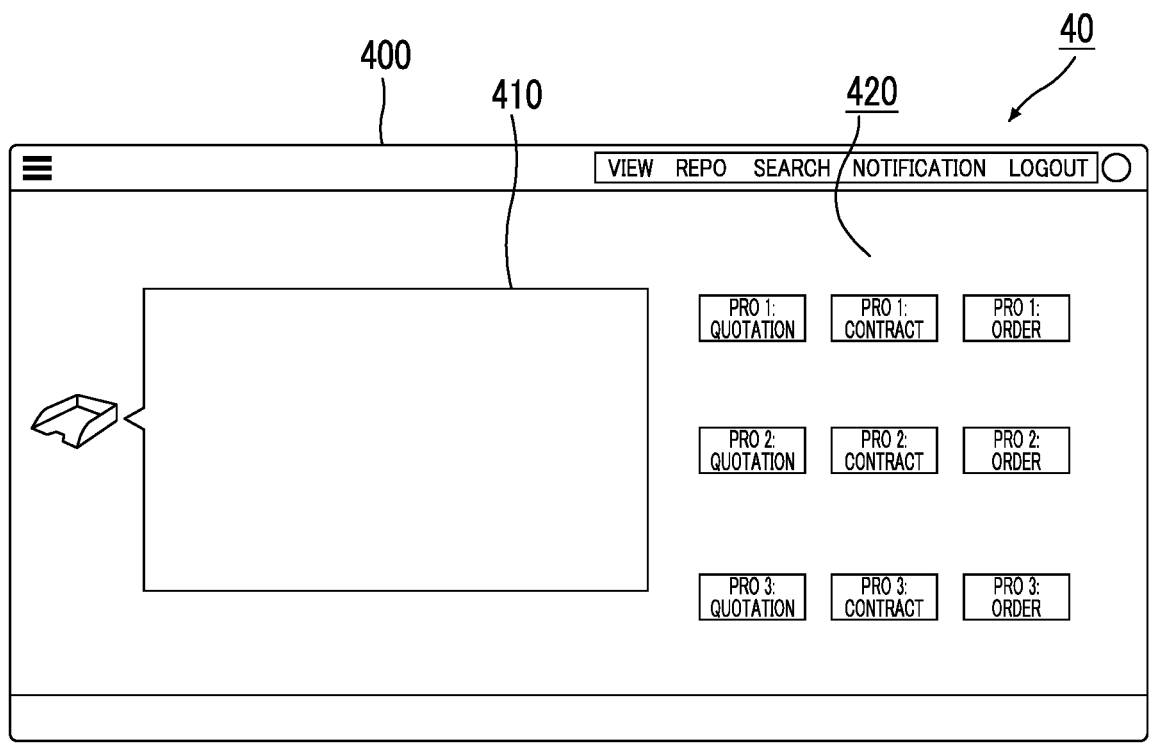
Figure 10A:
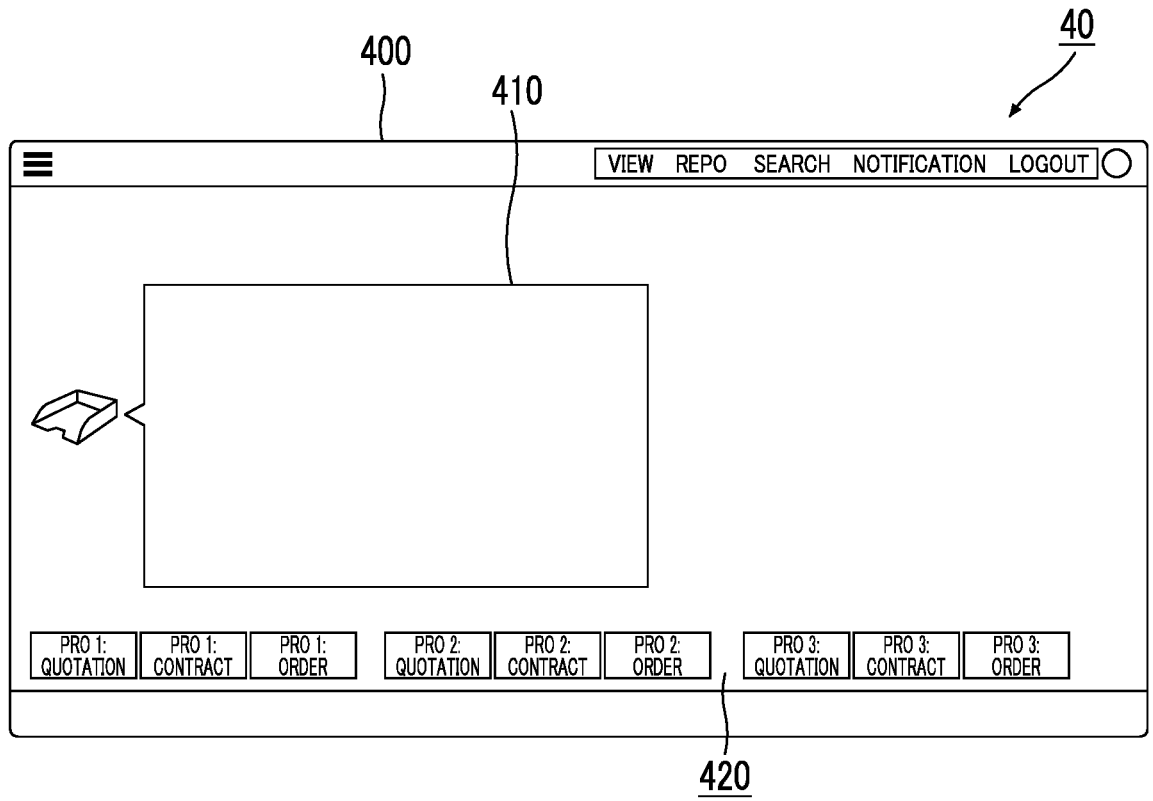
Figure 10B:
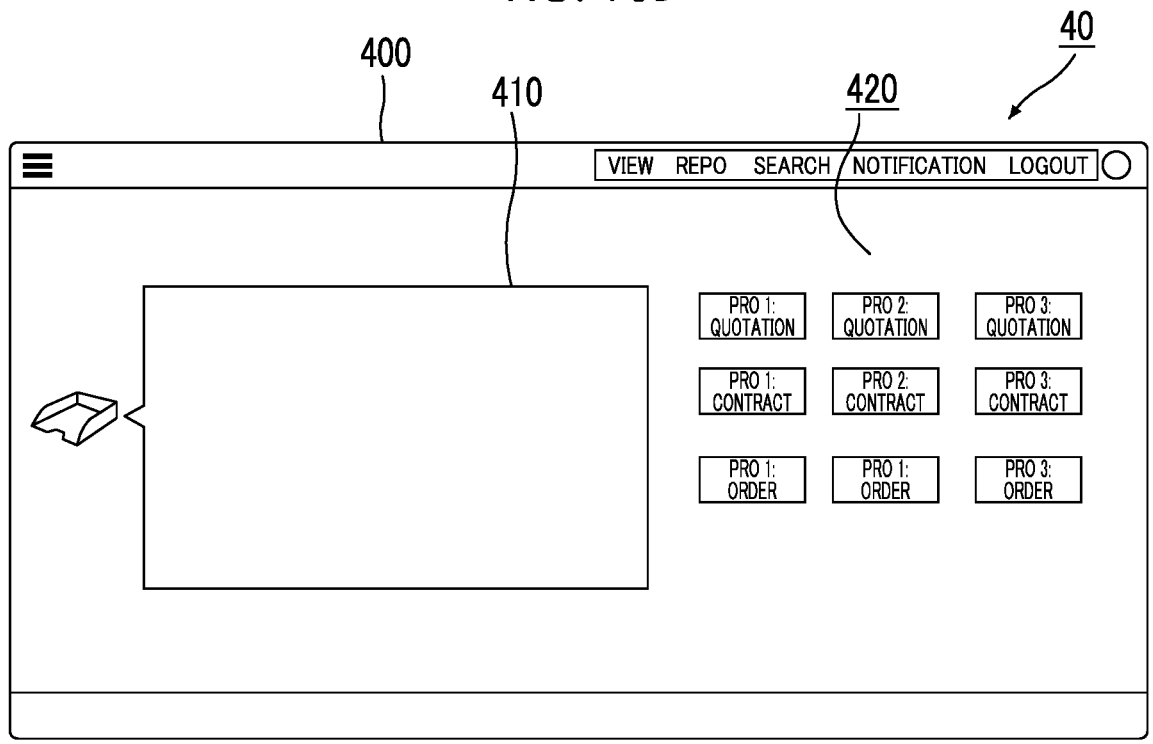
Figure 11:
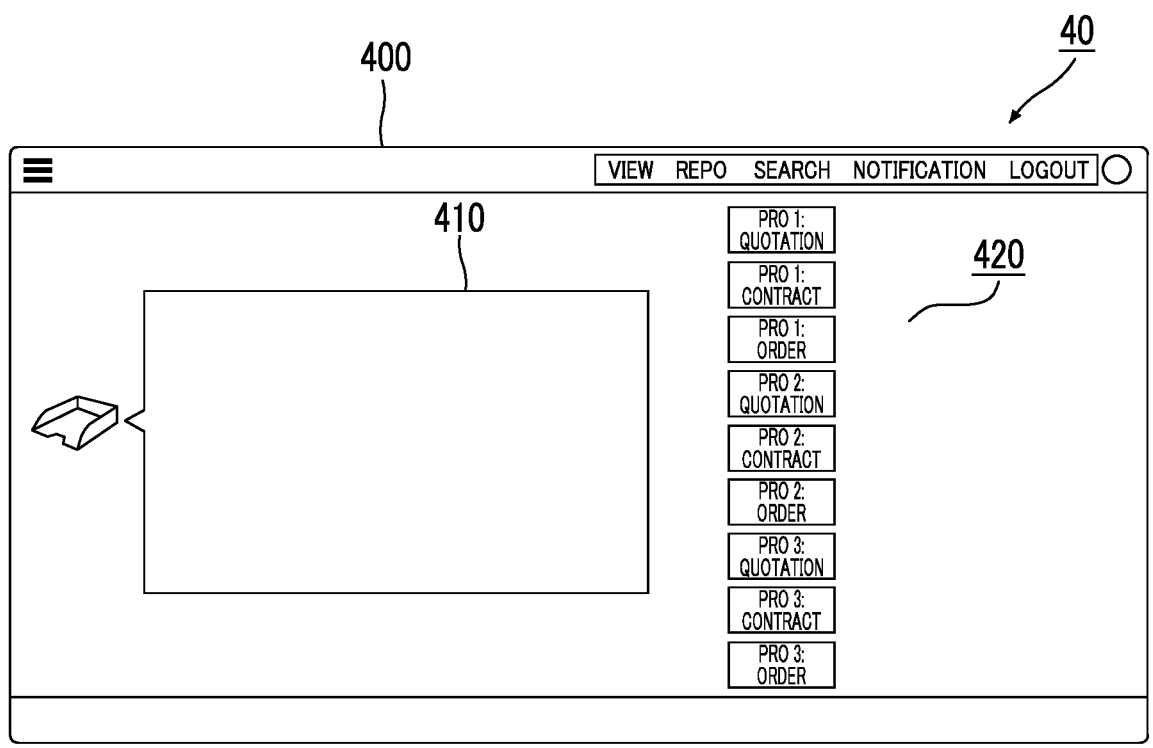
FIG. 11 is a diagram showing a fifth arrangement example of the pieces of thumbnail information in the extraction display area of the operation screen displayed on the display unit.

FIGS. 9A to 11 are diagrams showing the arrangement example of the thumbnail information in the extraction display area 420 of the operation screen 400 displayed on the display unit 40, and correspond to the operation screen 400 shown in FIG. 3. FIG. 9A is a first arrangement example, FIG. 9B is a second arrangement example, FIG. 10A is a third arrangement example, FIG. 10B is a fourth arrangement example, and FIG. 11 is a fifth arrangement example.

In the first arrangement example shown in FIG. 9A, a set of forms including a project 1 abbreviated as "Pro 1", a project 2 abbreviated as "Pro 2", and a project 3 abbreviated as "Pro 3" are arranged in the extraction display area 420 in a vertical direction.

The set of forms includes a quotation sheet abbreviated as "quotation", a contract sheet abbreviated as "contract", and an order sheet abbreviated as "order" in each of the projects 1 to 3, which are arranged in a horizontal direction. The thumbnail information is shown with the project number and the document name that combines the form name and the abbreviation of the document type.

As described above, the first arrangement example is a matrix, and, in the horizontal direction, pieces of thumbnail information are aligned in the order of the quotation sheet, the contract sheet, and the order sheet from left to right. Further, in the vertical direction, thumbnail images are arranged in the order of the project 1, the project 2, and the project 3 from top to bottom.

A total of nine thumbnail images are arranged in a right side area of the reception display area 410 in the extraction display area 420.

The second arrangement example shown in FIG. 9B is the same as the first arrangement example in FIG. 9A in that nine pieces of thumbnail information are arranged in the right side area of the reception display area 410 in the extraction display area 420. Further, the second arrangement example is the same as the first arrangement example in that the quotation sheet, the contract sheet and the order sheet are arranged in the horizontal direction, and the project 1, the project 2 and the project 3 are arranged in the extraction display area 420 in the vertical direction.

On the other hand, in the second arrangement example in FIG. 9B, intervals between the project 1, the project 2 and the project 3 in the vertical direction are wider than the intervals in the first arrangement example in FIG. 9A. In this way, the intervals between adjacent thumbnail images can be adjusted according to user's intention.

The third arrangement example shown in FIG. 10A is the same as the first arrangement example in FIG. 9A in that the nine pieces of thumbnail information are arranged in a combination of documents such as the quotation sheet, the contract sheet, and the order sheet for each of the projects 1 to 3.

On the other hand, in the third arrangement example shown in FIG. 10A, the nine pieces of thumbnail information are arranged in one horizontal row in a lower area of the reception display area 410 in the extraction display area 420, thereby being different from the first arrangement example in FIG. 9A in which the arrangement is performed in two directions, that is, the vertical direction and the horizontal direction, in a right side area of the reception display area 410. Further, in the third arrangement example, intervals between the projects 1 to 3 are wider than the intervals between the documents, thereby being different from the first arrangement example in which the interval between the adjacent pieces of thumbnail information is almost the same.

The fourth arrangement example shown in FIG. 10B is the same as the first arrangement example in FIG. 9A in that the nine pieces of thumbnail information are arranged in the combination of documents such as the quotation sheet, the contract sheet, and the order sheet for each of the projects 1 to 3. Further, the fourth arrangement example is the same as the first arrangement example in that the arrangement is performed in two directions, that is, the vertical direction and the horizontal direction, in the right side area of the reception display area 410. Further, the fourth arrangement example is the same as the first arrangement example in that the interval between adjacent pieces of thumbnail information is almost the same.

On the other hand, in the fourth arrangement example shown in FIG. 10B, the arrangement in the vertical direction and the arrangement in the horizontal direction are opposite to the first arrangement example in FIG. 9A. That is, in the fourth arrangement example, the quotation sheet, the contract sheet, and the order sheet are arranged in the vertical direction, and the project 1, the project 2, and the project 3 are arranged in the horizontal direction, thereby being different from the first arrangement example in which the quotation sheet, the contract sheet, and the order sheet are arranged in the horizontal direction and the project 1, the project 2 and the project 3 are arranged in the vertical direction.

The fifth arrangement example shown in FIG. 11 is the same as the first arrangement example in FIG. 9A in that the nine pieces of thumbnail information are arranged in the combination of documents such as the quotation sheet, the contract sheet, and the order sheet for each of the projects 1 to 3. Further, the fifth arrangement example is the same as the first arrangement example in that the nine pieces of thumbnail information are arranged in the right side area of the reception display area 410 in the extraction display area 420.

On the other hand, in the fifth arrangement example shown in FIG. 11, the nine pieces of thumbnail information are arranged in a vertical row, thereby being different from the first arrangement example in FIG. 9A in which the arrangement is performed in two directions, that is, the vertical direction and the horizontal direction. Further, in the fifth arrangement example, the interval between the projects 1 to 3 is the same as the interval between the documents, thereby being different from the third arrangement example in which the interval between the adjacent thumbnail information is wider than the interval between the documents.

In this way, in the projects 1 to 3, for example, the documents of the project 1 and the documents of the project 2 are arranged in the vertical direction, and the documents having different document types of the same project are arranged in the horizontal direction intersecting the vertical direction (first arrangement example in FIG. 9A and second arrangement example in FIG. 9B). Further, for example, the documents of the project 1 and the documents of the project 2 may be arranged in the horizontal direction, and the documents having different document types of the same project may be arranged in the vertical direction intersecting the horizontal direction (fourth arrangement example in FIG. 10B).

Further, for example, the documents of the project 1 and the documents of the project 2 may be arranged in the horizontal direction, and the documents having different document types of the same project may be also arranged in the horizontal direction (third arrangement example in FIG. 10A). Further, for example, the documents of the project 1 and the documents of the project 2 may be arranged in the vertical direction, and the documents having different document types of the same project may be also arranged in the vertical direction (the fifth arrangement example of FIG. 11).

In addition to the first arrangement example to the fifth arrangement example, for example, instead of the vertical direction or the horizontal direction, a diagonal direction that diagonally intersects the vertical direction or the horizontal direction may be used.

The arrangement example of the document can be said to be a document alignment mode defined by using the project number and document type information.

First Exemplary Embodiment

Next, the first exemplary embodiment to which the present exemplary embodiment is applied will be described with reference to FIGS. 12 to 15.

Figure 12:
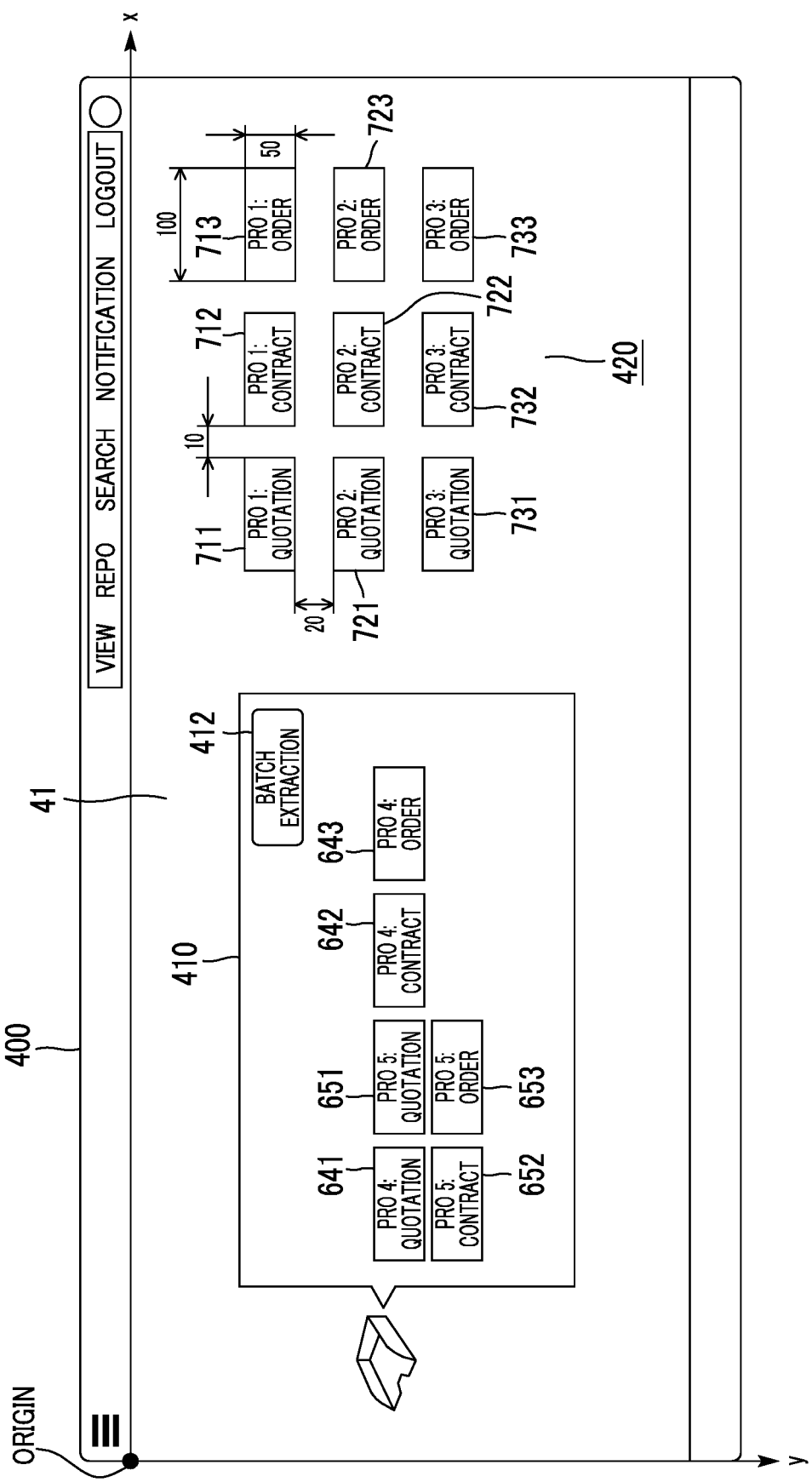
FIG. 12 is a diagram explaining an operation screen according to a first exemplary embodiment.

FIG. 12 is a diagram explaining the operation screen 400 according to the first exemplary embodiment.

The reception display area 410 of the operation screen 400 shown in FIG. 12 is displayed with thumbnail information 641 of "Pro 4: quotation" indicating a quotation sheet of a project 4, thumbnail information 642 of "Pro 4: contract" indicating a contract sheet of the project 4, and thumbnail information 643 of "Pro 4: order" indicating an order sheet of the project 4.

Further, the reception display area 410 is displayed with thumbnail information 651 of "Pro 5: quotation" indicating a quotation sheet for a project 5, thumbnail information 652 of the "Pro 5: contract" indicating a contract sheet for the project 5, and thumbnail information 653 of "Pro 5: order" indicating an order sheet for the item 5. In the reception display area 410, positions of the pieces of thumbnail information 641 to 643 and 651 to 653 are not significantly aligned, for example, by each project or by each form name.

Further, the pieces of thumbnail information are arranged in the extraction display area 420 of the operation screen 400 as in the above-described first arrangement example (see FIG. 9A). That is, a set of forms of the project 1 is arranged in an upper row, a set of forms of the project 2 is arranged in a middle row, and a set of forms of the project 3 is arranged in a lower row. The quotation sheet is arranged on a left side of each row, the contract sheet is arranged at a center of each row, and the order sheet is arranged on a right side of each row.

More specifically, in order from a left side of the upper row, thumbnail information 711 of "Pro 1: quotation" indicating a quotation sheet of the project 1, thumbnail information 712 of "Pro 1: contract" indicating a contract sheet of the project 1, and thumbnail information 713 of "Pro 1: order" indicating an order sheet of the project 1 are displayed. Further, in order from a left side of the middle row, thumbnail information 721 of "Pro 2: quotation" indicating a quotation sheet of the project 2, thumbnail information 722 of "Pro 2: contract" indicating a contract sheet of the project 2 and thumbnail information 723 of "Pro 2: order" indicating an order sheet of the project 2 are displayed. Further, in order from a left side of the lower row, thumbnail information 731 of "Pro 3: quotation" indicating a quotation sheet of the project 3, thumbnail information 732 of "Pro 3: contract" indicating a contract sheet of the project 3 and, thumbnail information 733 of "Pro 3: order" indicating an order sheet of the project 3 are displayed.

The pieces of thumbnail information 711 to 713, 721 to 723, and 731 to 733 have a horizontal dimension of 100 mm and a vertical dimension of 50 mm. Further, an interval between the pieces of thumbnail information 711, 721, and 731 and the pieces of thumbnail information 712, 722, and 732 is 10 mm, and an interval between the pieces of thumbnail information 712, 722, and 732 and the pieces of thumbnail information 713, 723, and 733 is also 10 mm. An interval between the pieces of thumbnail information 711 to 713 of the project 1 and the pieces of thumbnail information 721 to 723 of the project 2 is 20 mm, and an interval between the pieces of thumbnail information 721 to 723 of the project 2 and the pieces of thumbnail information 731 to 733 of the project 3 is also 20 mm.

FIG. 13 is a diagram explaining the document information Ta held by the document information management unit 14a (see FIG. 2).

The document information Ta shown in FIG. 13 includes items of a document ID, a document name, a document type, a project number, an X coordinate, and a Y coordinate. In FIG. 13, "M0000001" to "M0000004" indicating the projects 1 to 4 are shown, and "M0000005" indicating the project 5 is omitted.

The document ID of the document information Ta is attached to the document received by the document information management unit 14a in the inbox 42, and is given to the pieces of thumbnail information 641 to 643 and 651 to 653 which are displayed in the reception display area 410 and the pieces of thumbnail information 711 to 713, 721 to 723, and 731 to 733 which are displayed in the extraction display area 420.

The document name of the document information Ta corresponds to the document name shown in the thumbnail information.

The document type is attached with the form name, that is, any of "quotation" indicating a quotation sheet, "contract" indicating a contract sheet, and "order" indicating an order sheet.

The project number is attached with, for example, "M0000001" indicating the project 1.

The X coordinate and the Y coordinate indicate a position in a coordinate space of the workspace 41, and an upper left portion is treated as an origin (0,0), a horizontal direction is treated as the X axis, and a vertical direction is treated as the Y axis. More specifically, the X coordinate and the Y coordinate are positional information of the pieces of thumbnail information 711 to 713, 721 to 723, and 731 to 733 in the operation screen 400, and indicate a position of the thumbnail information displayed in the extraction display area 420. More specifically, among four corners of rectangular thumbnail information, an upper left corner near the origin is treated as a base point.

For the pieces of thumbnail information 641 to 643 and 651 to 653 of the reception display area 410, the X coordinate and the Y coordinate are not determined, so that, for example, "(null)" is shown in a portion of a broken line frame B11 in FIG. 13, which corresponds to the pieces of thumbnail information 641 to 643.

Here, a processing example of the document information Ta shown in FIG. 13 by the statistical information processing unit 103 will be described to correspond to the flowchart in FIG. 6 described above.

In the first exemplary embodiment, the acquisition unit 3a (see FIG. 5) acquires the coordinate position and the document type of the document for each project number from the document arranged in the extraction display area 420 of the workspace 41. That is, after extracting "M0000001", "M0000002", and "M0000003" as the project number, a document ID list of the project number "M0000001" is acquired, and the documents are realigned in ascending order of the X coordinates of the document IDs (see steps S101 to 104 in FIG. 6). As a result, a portion of a broken line frame B12 shown in FIG. 13 is created.

The calculation unit 3b (see FIG. 5) calculates the functional expression that is the approximate line from the X coordinate and the Y coordinate of each document ID of the project number (see step S105 in FIG. 6). In a case of the first exemplary embodiment, a functional expression of the intercept y=200 is obtained.

In a case where the more accurate approximate line, such as diagonal arrangement is obtained, a method for calculating an approximate straight line (regression line) by least squares method may be provided. The regression line is calculated by the following expression.

Regression coefficient(slope: $b$)=(covariance of $X$ and $Y$)/(variance of $X$)

Intercept($a$)=average of $Y$–regression coefficient ($b$)× average of $X$

The document arrangement direction is horizontal, the average document arrangement interval is (110, 0), and the document arrangement order is calculated as "quotation sheet, contract sheet, order sheet" (see step S106 in FIG. 6).

Similarly, "arrangement information of document" is calculated for the other project numbers "M0000002" and "M0000003".

Then, an average value or a representative one is extracted from the calculation results of the "arrangement information of document" of "M0000001", "M0000002", and "M0000003".

Here, the following document arrangement information is held as the "document arrangement information in the recommended project number" by the document arrangement information holding unit 3c (see FIG. 5) in the project number (see step S107 in FIG. 6).

Arrangement direction: Horizontal direction
Average arrangement interval: (110, 0)
Arrangement order: quotation sheet, contract sheet, order sheet, and
Coordinate area: (320, 50)
X direction: (1220+100)−(1000)=320
Y direction: (200+50)−(200)=50

The vector amount (arrangement interval) between adjacent project numbers is calculated (see step S108 in FIG. 6). That is, a coordinate list of the representative document ID of the project number is extracted. Here, the quotation sheet is calculated as a representative document of each project number.

In a case where arrangement is performed in ascending order of the X coordinate,
Project 1—D0000001 (Document type: quotation sheet, X coordinate: 1000, Y coordinate: 200)
Project 2—D0000004 (Document type: quotation sheet, X coordinate: 1000, Y coordinate: 270)
Project 3—D0000007 (Document type: quotation sheet, X coordinate: 1000, Y coordinate: 340).

After that, it is determined whether the sort order between the project numbers is the ascending order or the descending order of the project numbers (see step S109 in FIG. 6). Here, the "ascending order" is determined. In a case where there is no regularity, the "ascending order" is determined.

The calculation unit 3b (see FIG. 5) calculates "the vector amount (arrangement interval) between the project numbers" that are most adjacent to each other in the sort order (ascending order) direction between the project numbers (see step S110 in FIG. 6).

Between the project 1 and the project 2: (0, 70)
Between the project 2 and the project 3: (0, 70)

The vector amount holding unit 3d between the project numbers extracts the average value or the representative one from the calculation result of the vector amount between the project numbers, and holds the average value or the representative one as the "vector amount between the recommended project numbers" (see step S111 in FIG. 6).

Vector amount between project numbers (arrangement interval): (0, 70)

Here, a case, in which the pieces of thumbnail information 641 to 643 and 651 to 653 of the reception display area 410 are displayed in the extraction display area 420 by pressing the batch extraction button 412 in the workspace 41 shown in FIG. 12, will be described to correspond to the flowchart in FIGS. 7 and 8.

First, the internal control corresponding to the flowchart in FIG. 7 described above will be described.

In a case where the batch extraction button 412 is pressed, the documents are collectively extracted from the inbox (see step S201 in FIG. 7). That is, the documents stored in the inbox are extracted and aligned for each of the project numbers (new M0000004 and M0000005) (see step S202 in FIG. 7).

A required total coordinate area is calculated from the "vector amount between the recommended project numbers" and the number of project numbers for each project number (see step S203 in FIG. 7). Then, the fact that the total coordinate area fits on the workspace 41 without overlapping with another document arrangement is confirmed, starting from the coordinate position of the "representative document ID" of the largest project number among the projection numbers which are already arranged (see step S204 in FIG. 7). In a case where the total coordinate area does not fit on the workspace 41, the total coordinate area may be arranged in an arbitrary location.

From the coordinate position of the "representative document ID" of the largest project number already arranged, according to the "coordinate area of the document arrangement information in the recommended project number" and the "vector amount between the recommended project numbers", the coordinate area for each project number is determined (see step S205 in FIG. 7).

That is, the coordinate position of the "representative document ID" of the largest project number which is already arranged is
D0000003 (X coordinate: 1000, Y coordinate: 340),
the coordinate area of the document arrangement information in the recommended project number is
(X direction: 320, Y direction: 50), and
the vector amount between the recommended project numbers is
(X direction: 0, Y direction: 70).

Further, in the coordinate area for each project number to be arranged, the project number M0000004 is in
X direction: (1000–1320)
Y direction: (410–460), and
the project number M0000005 is in
X direction: (1000–1320)
Y direction: (480–530).

Further, a fact that there are no documents already arranged in the next coordinate space (rectangular area) is confirmed.
(x, y)=(1000, 410), (1000, 530), (1320, 410), (1320, 530)

The arrangement location of the document in the project number M0000004 is determined from the "coordinate area for each project number to be arranged" and the "document arrangement information in the recommended project number" (see step S206 in FIG. 7). That is, the document arrangement information in the recommended project number is Average arrangement interval: (110, 0)

Arrangement order: quotation sheet, contract sheet, order sheet, and the document arrangement location in the project number M0000004 is D0000010: (Document type: quotation sheet, X coordinate: 1000, Y coordinate: 410)

D0000011: (Document type: contract sheet, X coordinate: 1110, Y coordinate: 410)

D0000012: (Document type: order sheet, X coordinate: 1220, Y coordinate: 410).

Similarly, the arrangement location of the document in the project number M0000005 is determined.

In this way, an alignment rule is generated based on the information acquired from the document information Ta (see, for example, FIG. 13), and positions of the document IDs "D0000010" to "D0000012" in the extraction display area 420 (see, for example, FIG. 12) are determined according to the generated rule.

Next, the UI control corresponding to the flowchart of FIG. 8 described above will be described.

In a case where the batch extraction button 412 (see FIG. 12) is pressed in a screen of the inbox (see step S301 in FIG. 8), the arrangement image screen (see an arrangement image area 440 in FIG. 14A) in the extraction display area 420 (see FIG. 12) obtained after the batch extraction is performed is presented to the user (see step S302 in FIG. 8).

In a case where an OK operation is performed with content presented by the user, the batch extraction is performed so that a result of the presented arrangement image is obtained (see steps 303 and 304 in FIG. 8).

After that, in the internal control, the coordinate information of the extracted documents is updated when the batch extraction is performed with the presented document arrangement content (see step S207 in FIG. 7).

Figure 14A:
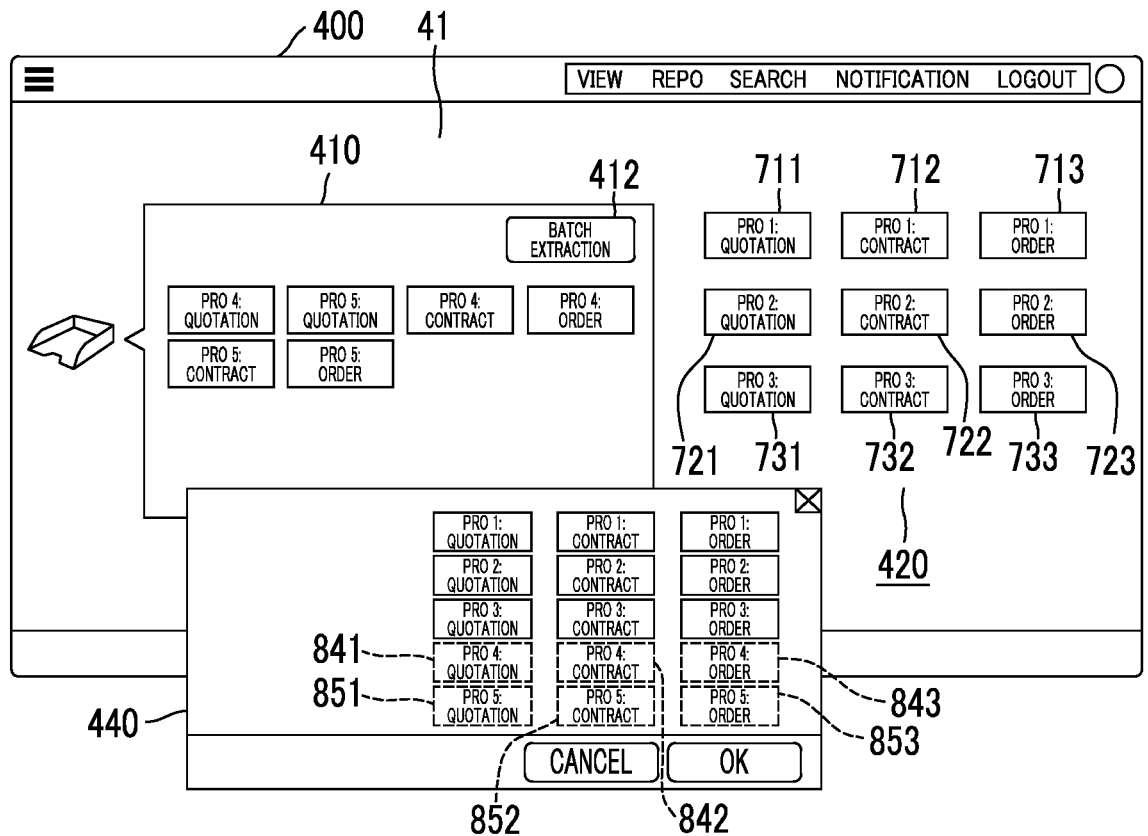
Figure 14B:
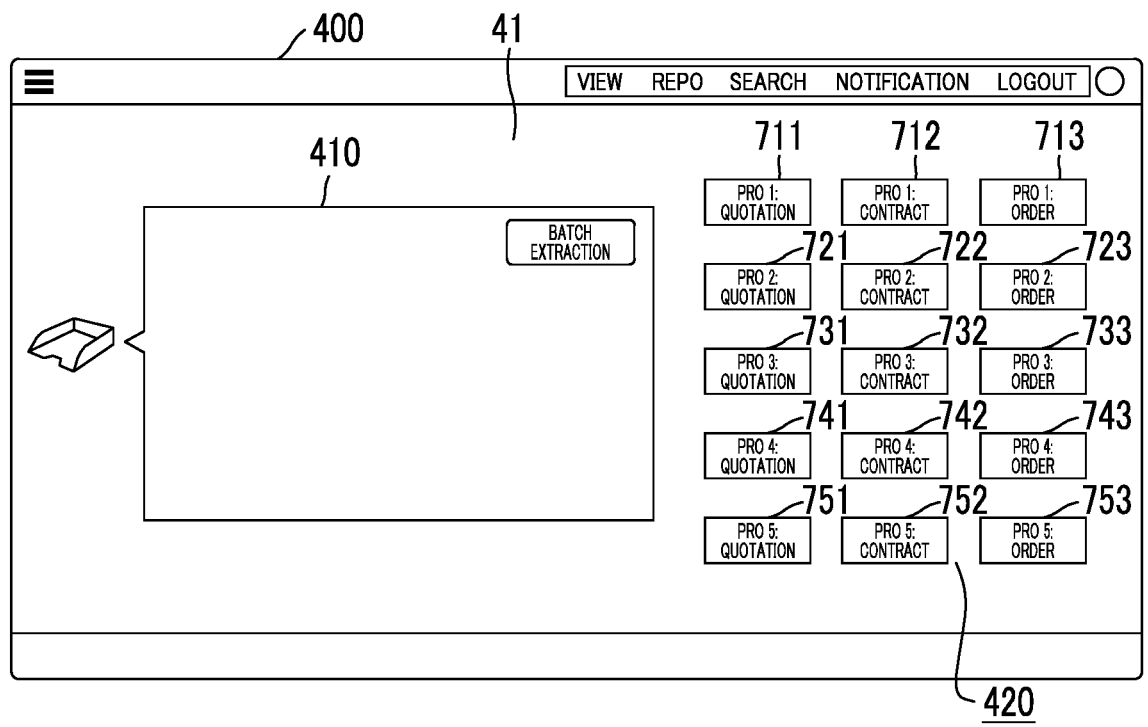

FIGS. 14A and 14B are diagrams explaining display content of the operation screen 400 in a case where the batch extraction button 412 is pressed. FIG. 14A shows a state in which the arrangement image area 440 appears and FIG. 14B shows a state in which display is performed in the extraction display area 420 as in the arrangement image area 440.

The arrangement image area 440 shown in FIG. 14A shows arrangement images in the extraction display area 420 in a case where batch extraction is performed on the pieces of thumbnail information of the reception display area 410.

In FIG. 14A, images are displayed so that certain pieces of thumbnail information 711 to 713, 721 to 723, and 731 to 733 are arranged in the extraction display area 420, pieces of thumbnail information 841 to 843 are arranged under the pieces of thumbnail information 731 to 733, and further, pieces of thumbnail information 851 to 853 are arranged under the pieces of thumbnail information 841 to 843. As described above, the pieces of thumbnail information 841 to 843 and 851 to 853 are displayed in the arrangement image area 440, together with the pieces of thumbnail information 711 to 713, 721 to 723, and 731 to 733 of the extraction display area 420.

The arrangement image area 440 is an example of an arrangement image, and the pieces of thumbnail information 841 to 843 and 851 to 83 are examples of all of the plurality of documents.

In a case where it is detected that an OK button shown in FIG. 14A is pressed, as shown in FIG. 14B, the pieces of thumbnail information 741 to 743 and 751 to 753 are positioned in the extraction display area 420 with alignment of the arrangement image shown in the arrangement image area 440. The pieces of thumbnail information 741 to 743 and 751 to 753 correspond to the pieces of thumbnail information 841 to 843 and 851 to 853 in FIG. 14A.

More specifically, positions of the pieces of thumbnail information 711 to 713, 721 to 723, and 731 to 733 shown in FIG. 14B in the extraction display area 420 are the same as in FIG. 14A. In other words, the X coordinate and the Y coordinate of the broken line frame B12 shown in the document information Ta of FIG. 13 are the same as the relevant X coordinate and the Y coordinate of FIG. 15 which will be described later. As a result, an influence in a case where the user continues the work is suppressed.

FIG. 15 is a diagram explaining the content of the document information Ta updated in a case where the batch extraction is performed, and corresponds to FIG. 13.

In a case where the operation screen 400 shown in FIG. 14B described above is confirmed, numerical values are input to items of the X coordinate and the Y coordinate of the document IDs "D0000010" to "D0000012" of "M0000004" indicating the project 4, as shown by a broken line frame B11 shown in FIG. 15. In addition, in FIG. 15, "M0000005" indicating the project 5 is omitted.

In a case where the document information Ta is updated, the updated document information Ta is held by the document information management unit 14a (see FIG. 2).

Here, the information surrounded by the broken line frame B11 of the document information Ta (see FIG. 13) is an example of document attribute information, and substances of "Pro 4 quotation sheet", "Pro 4 contract sheet", and "Pro 4 order sheet", which are surrounded by the broken line frame B11 are examples of the document. The non-volatile memory 14 (see FIG. 1) is an example of a storage area.

The information surrounded by the broken line frame B12 of the document information Ta (see FIG. 13) is an example of other document attribute information, and substances of "Pro 1 quotation sheet", "Pro 1 contract sheet", and "Pro 1 order sheet", which are surrounded by the broken line frame B12, are examples of another document. The X coordinate and the Y coordinate surrounded by the broken line frame B12 are examples of the positional information in a case where the other document is displayed in the display area. The extraction display area 420 (see FIG. 3) is an example of the display area.

Further, the coordinate area for each project number determined in step S205 of FIG. 7 and the coordinates of the arrangement location of the document type determined in step S206 are examples of a position in a case where the document is displayed in the display area.

As described above, the broken line frame B11 of the document information Ta (see FIG. 13) contains an example of the document attribute information, the broken line frame B12 contains an example of other document attribute information. The project number surrounded by the broken line frame B11 or B12 is an example of project information, and the document type is an example of type information.

Further, a Y-axis direction in the extraction display area 420 (see FIG. 3) is an example of one direction, and an X-axis direction is an example of another direction.

The arrangement image area 440 (see FIG. 14A) is an example of a reference arrangement image, and the operation with respect to the OK button in the arrangement image area 440 is an example of a user operation with respect to the arrangement image.

Significance of First Exemplary Embodiment

In this way, in a case where the user who is a clerical worker of the digital transaction business performs the business of confirming content in a case of receiving the order sheet from the sales representative and requesting approval from the manager who is the approver and in a case where the user extracts a set of documents related to a product order of a certain project from the sales representative from the inbox, the user has a work habit of sequentially arranging the quotation sheet, the contract sheet, and the order sheet side by side for each project so that arrangement is performed in ascending order in the first exemplary embodiment.

A case where a confirmation work is performed on the project 1, the project 2, and the project 3, a set of documents of the project 4 and a set of documents of the project 5 are in a situation of arriving at the inbox, and the user may want the documents extracted from the inbox to be automatically extracted using an alignment method according to an individual work habit instead of manually aligning the documents.

Therefore, in a case where the image displaying apparatus 1 (see FIG. 1) detects an instruction to perform the batch extraction, control is performed so that the project 1, the project 2, and the project 3 are aligned and the project 4 and the project 5 are arranged in the extraction display area 420. Therefore, the user can improve efficiency of the business of the user using the documents in the workspace 41.

Second Exemplary Embodiment

Next, a second exemplary embodiment to which the present exemplary embodiment is applied will be described.

Similarly to the case of the first exemplary embodiment, in the second exemplary embodiment, in a case where a user who is a clerical worker of a digital transaction business extracts a set of documents related to a product order of a certain project from the sales representative from the inbox, the user may have a work habit of performing in horizontal alignment for each project, that is, performing sequential arrangement of the quotation sheet, the contract sheet, and the order sheet so that alignment is performed in ascending order of the project numbers.

More specifically, the second exemplary embodiment is different from the first exemplary embodiment in the situation in which the sets of documents of the separate project 4 and the project 5 have arrived at the inbox. That is, in a case where a confirmation work is performed on the project 1, the project 2, and the project 3 (only some documents), remaining documents of the project 3 arrive at the inbox, and the remaining documents of the project 3 are collectively extracted on the workspace 41.

Hereinafter, the second exemplary embodiment will be described in detail with reference to FIGS. 16A to 18, and the description common to the first exemplary embodiment may be omitted.

Figures 16A, 16B:
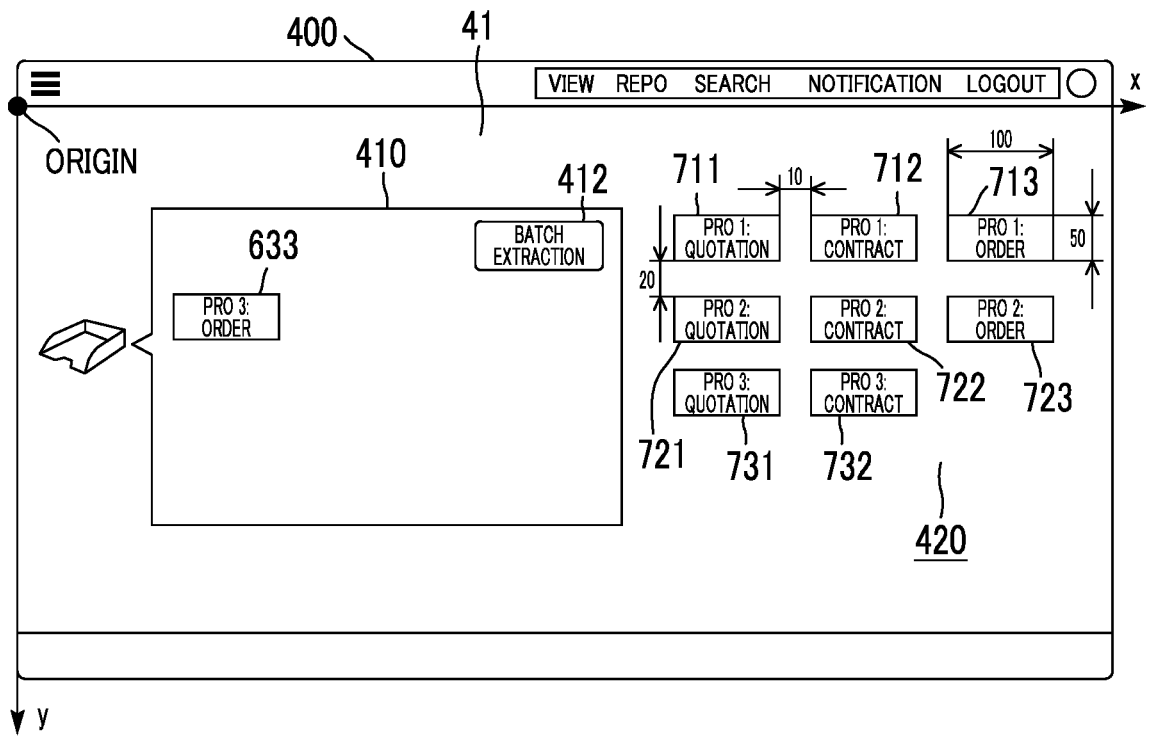

FIGS. 16A and 16B are diagrams explaining the second exemplary embodiment, and FIG. 16A is a diagram explaining the operation screen 400 and corresponds to FIG. 12 in the first exemplary embodiment. FIG. 16B is a diagram explaining the document information Ta held by the document information management unit 14a (see FIG. 2) and corresponds to FIG. 13 in the first exemplary embodiment.

In the reception display area 410 of the operation screen 400 shown in FIG. 16A, thumbnail information 633 of "Pro 3: order" indicating the order sheet of the project 3 is displayed.

Further, in the extraction display area 420 of the operation screen 400, the pieces of thumbnail information are arranged in the ascending order of the project numbers in the Y direction and are arranged in the order of the document type in the X direction, as in the case of the first exemplary embodiment. That is, the projects 1, 2, and 3 are arranged in each of the upper row, the middle row, and the lower row, a quotation sheet is arranged on the left side of each row, a contract sheet is arranged at the center of each row, and an order sheet is arranged on the right side of the upper row and the middle row. In FIG. 16A, the pieces of thumbnail information of the extraction display area 420 are common to the first exemplary embodiment (see FIG. 12), so that the description thereof will be omitted.

The order sheet is not arranged in the lower row of the three rows. That is, the order sheet, which is the remaining document of the project 3, is not arranged in the extraction display area 420, and the order sheet is stored in the inbox.

In the document information Ta shown in FIG. 16B, "(null)" is shown in items corresponding to the X coordinate and the Y coordinate of a broken line frame B21 corresponding to the thumbnail information 633. Since the items of the document information Ta shown in FIG. 16B are common to the items of the first exemplary embodiment (see FIG. 13), the description thereof will be omitted.

A processing example of the document information Ta shown in FIG. 16B by the statistical information processing unit 103 is the same as the content described in accordance with FIG. 6 in the first exemplary embodiment, so that the description thereof will be omitted.

Further, the internal control and the UI control performed by operating the batch extraction button 412 of the workspace 41 shown in FIG. 16A are basically the same as in the first exemplary embodiment, and are common to the description according to the flowcharts in FIGS. 7 and 8, so that the description in the second exemplary embodiment will be omitted.

Figure 17A:
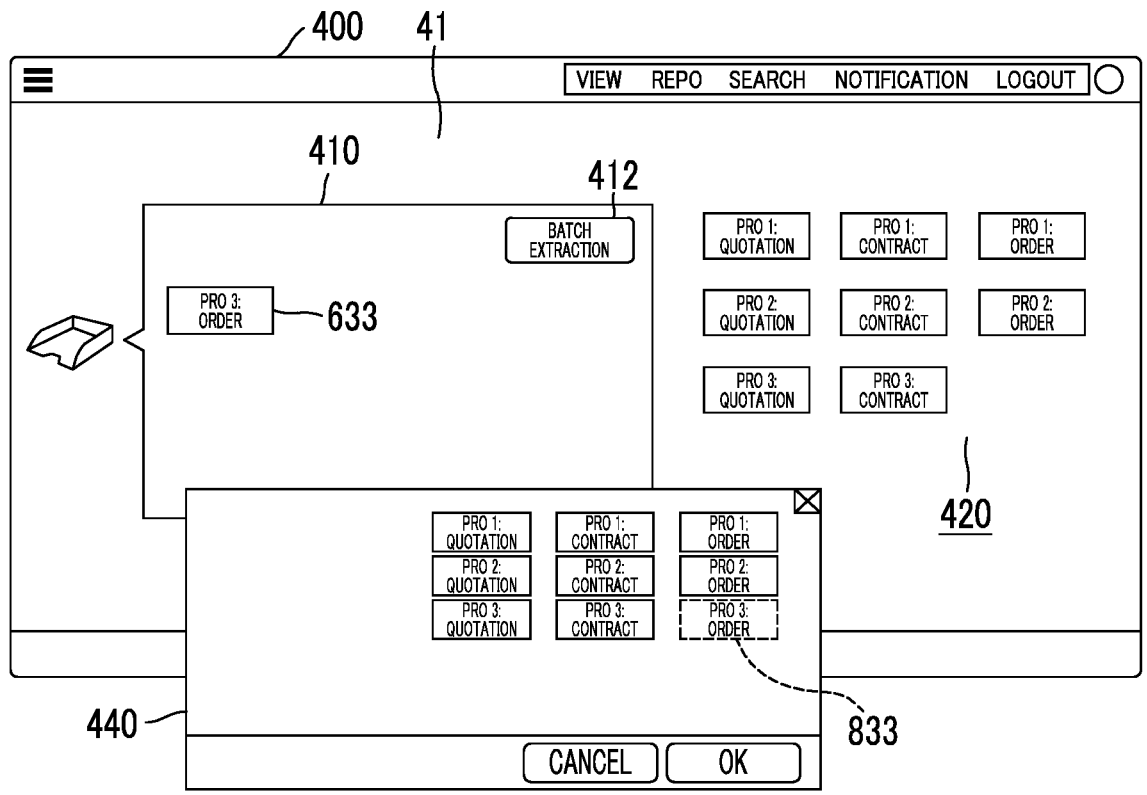
Figure 17B:
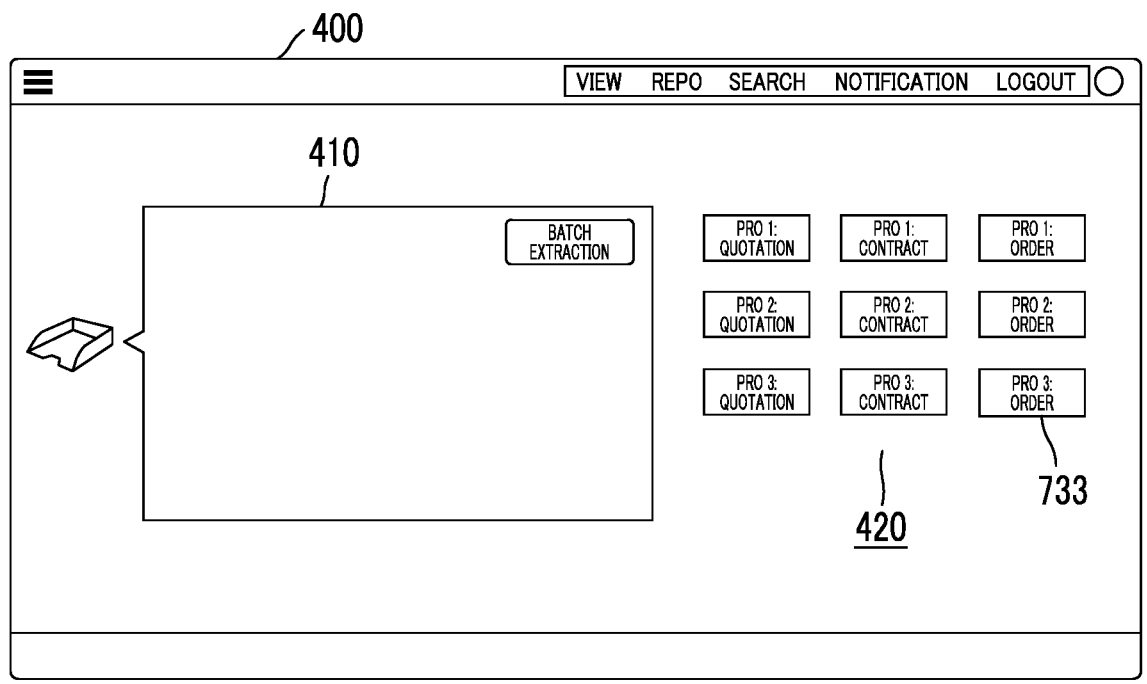

FIGS. 17A and 17B are diagrams explaining the display content of the operation screen 400 in a case where the batch extraction button 412 is pressed. FIG. 17A shows a state in which the arrangement image area 440 appears, and FIG. 17B shows a state in which the extraction display area 420 is displayed according to the arrangement image area 440. FIGS. 17A and 17B correspond to FIGS. 14A and 14B in the first exemplary embodiment.

In the arrangement image area 440 shown in FIG. 17A, the pieces of thumbnail information 711 to 713, 721 to 723, and 731 to 732 (see FIG. 16A) in the extraction display area 420 are arranged, and further, thumbnail information 833 corresponding to the thumbnail information 633 in the reception display area 410 is also arranged.

In a case where the OK button shown in FIG. 17A is pressed, the pieces of thumbnail information 711 to 713, 721 to 723, and 731 to 733 are positioned in the extraction display area 420 with the alignment of the arrangement images shown in the arrangement image area 440, as shown in FIG. 17B (see also FIG. 16A).

FIG. 18 is a diagram explaining the content of the document information Ta updated in a case where the batch extraction is performed, and corresponds to FIG. 16B. Further, FIG. 18 corresponds to FIG. 15 in the first exemplary embodiment.

In a case where the operation screen 400 shown in FIG. 17B described above is confirmed, numerical values of the X coordinate and Y coordinate of the document ID "D000009" of "M0000003" indicating the project 3 are input, as shown by a broken line frame B21 shown in FIG. 18.

Significance of Second Exemplary Embodiment

As described above, in the second exemplary embodiment, in a case where the confirmation work is performed on the quotation sheet, the contract sheet, and the order sheet of the project 1, the quotation sheet, the contract sheet, and the order sheet of the project 2, and the quotation sheet and the contract sheet of the project 3, extraction is performed in a state in which the order sheets of the project 3 are collectively aligned on the workspace 41, even in a case where the remaining order sheets of the project 3 arrive at the inbox.

Third Exemplary Embodiment

Next, a third exemplary embodiment to which the present exemplary embodiment is applied will be described.

In the third exemplary embodiment, a user who is a clerical worker of digital transaction business does not manually realign the documents extracted from the inbox and automatic extraction is performed using an alignment method according to an individual work habit, thereby being different from the first exemplary embodiment and the second exemplary embodiment in which the documents are realigned according to the arrangement of the extraction display area 420.

More specifically, after the confirmation work performed on the project 1, the project 2, and the project 3 is completed (moved or deleted from the workspace 41), the documents of the project 4 arrive at the inbox, so the remaining documents of the project 4 are collectively extracted on the workspace 41.

Hereinafter, the third exemplary embodiment will be described in detail with reference to FIGS. 19A to 22B, and the description common to the first exemplary embodiment or the second exemplary embodiment may be omitted.

Figures 19A, 19B:
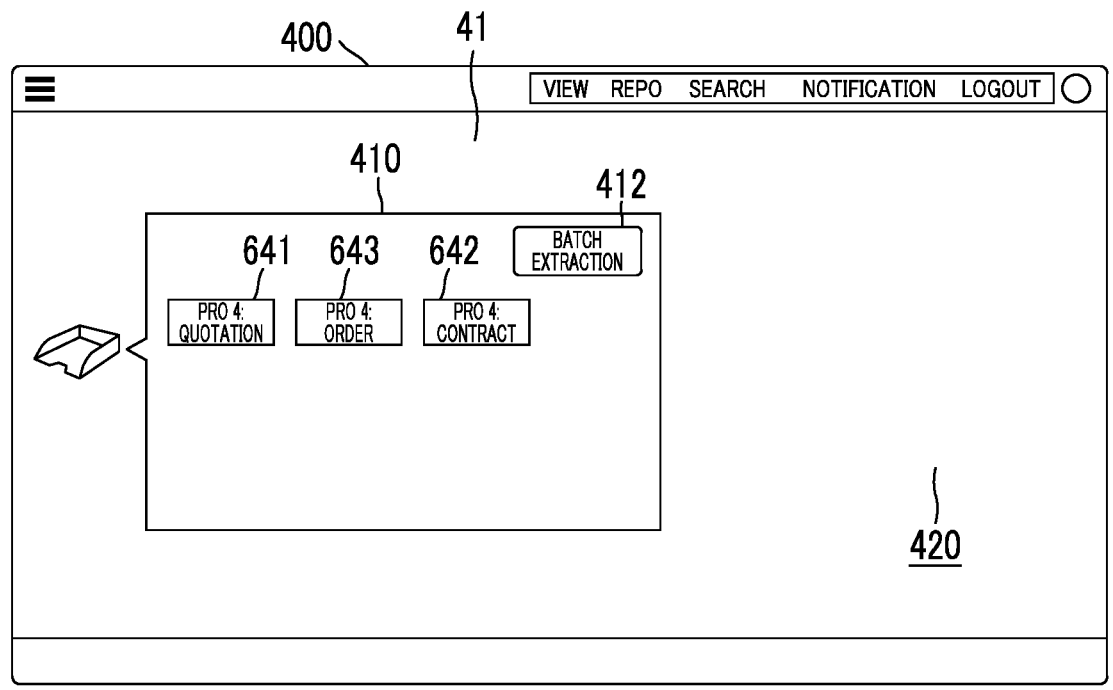

FIGS. 19A and 19B are diagrams explaining the third exemplary embodiment, and FIG. 19A is a diagram explaining the operation screen 400 and corresponding to FIG. 12 in the first exemplary embodiment. FIG. 19B is a diagram explaining the document information Ta held by the document information management unit 14a (see FIG. 2) and corresponds to FIG. 13 in the first exemplary embodiment.

The pieces of thumbnail information 641 to 643 of "Pro 4: quotation", "Pro 4: order" and "Pro 4: contract" are displayed in the reception display area 410 of the operation screen 400 shown in FIG. 19A.

The thumbnail information is not displayed in the extraction display area 420, unlike the cases of the first exemplary embodiment and the second exemplary embodiment.

In the document information Ta shown in FIG. 19B, "(null)" is shown in portions of the X coordinates and the Y coordinates of the document IDs "D0000010" to "D0000012" of "M0000004" included in a broken line frame B31 corresponding to the thumbnail information 633.

FIG. 20 is a diagram explaining the work history Tb held by the work history management unit 14b (see FIG. 2).

The work history Tb shown in FIG. 20 includes items of a document ID, a document name, a document type, and a project number, as the same as the document information Ta (for example, see FIG. 19B). Further, the work history Tb includes items of a final X coordinate and a final Y coordinate instead of the items of the X coordinate and the Y coordinate in the case of the document information Ta. The final X coordinate and the final Y coordinate are changed by the movement of the document in the extraction display area 420 by the user, and are examples of the latest positional information.

On the other hand, the work history Tb includes an item that is not included in the document information Ta, which is a "final coordinate position update date and time" indicated by a broken line frame B32. The final coordinate position update date and time is information indicating a date and time in which, in a case where the position of the thumbnail information in the extraction display area 420 is updated, the position is updated as the final X coordinate and the final Y coordinate.

As described above, in the third exemplary embodiment, a set of documents of the project does not exist in the workspace 41, and the arrangement position of the new project 4 in the extraction display area 420 is calculated using the work history Tb and presented to the user.

Therefore, the work history Tb of FIG. 20 includes each of the items of the final X coordinate, the final Y coordinate, and the final coordinate position update date and time. The positional information of the document, which is not displayed in the extraction display area 420 at a current time but is displayed in the past, can be acquired. As a result, it is possible to correspond to the increase in the proficiency level of the user.

Further, by using the update date and time, it is possible to confirm whether or not to be included in a period in a case where, for example, a work history holding period, such as one year, is set.

In FIG. 20, the work history Tb shows information on each of the quotation sheets, the contract sheets, and the order sheets of "M0000001" to "M0000003". From the work history information Tb, the X coordinates and the Y coordinates (FIG. 19B) of the document IDs "D0000010" to "D0000012" are determined according to the flowchart of FIG. 6 described above.

For example, the document arrangement information holding unit 3c in the project number (see FIG. 5) holds the following document arrangement information as the "document arrangement information in the recommended project number" (see step S107 in FIG. 6).

Arrangement direction: Horizontal direction
Average arrangement interval: (110, 0)
Arrangement order: quotation sheet, contract sheet, order sheet, and
Coordinate area: (320, 50)
X direction: (1220+100)−(1000)=320
Y direction: (200+50)−(200)=50

Further, the vector amount holding unit 3d between the project numbers extracts the average value or the representative one from the calculation result of the vector amount between the project numbers, and holds the average value or the representative one as the "vector amount between the recommended project numbers" (see step S111 in FIG. 6).

Vector amount between project numbers (arrangement interval): (0, 70)

At this time, the average value or the representative one of the coordinates of the "representative document ID" is extracted and held as the "recommended starting point coordinate position".

Recommended starting point coordinate position: (1000, 200)

Then, by performing the internal control corresponding to the flowchart in FIG. 7 described above, the arrangement location of the document in the new project number M0000004 is determined from the "coordinate area for each project number to be arranged" and the "document arrangement information in the recommended project number" (see step S206 in FIG. 7). That is, the document arrangement information in the recommended project number is Average arrangement interval: (110, 0)

Arrangement order: quotation sheet, contract sheet, order sheet, and the recommended starting coordinate position is (x, y)=(1000, 200), and the document arrangement location is D0000010: (Document type: quotation sheet, X coordinate: 1000, Y coordinate: 200)

D0000011: (Document type: contract sheet, X coordinate: 1110, Y coordinate: 200)

D0000012: (Document type: order sheet, X coordinate: 1220, Y coordinate: 200).

After that, the coordinate information of the extracted documents and the work history are updated when the batch extraction is performed with the presented document arrangement content (see step S207 in FIG. 7). That is, in the third exemplary embodiment, the work history is also updated unlike the first exemplary embodiment.

Figure 21A:
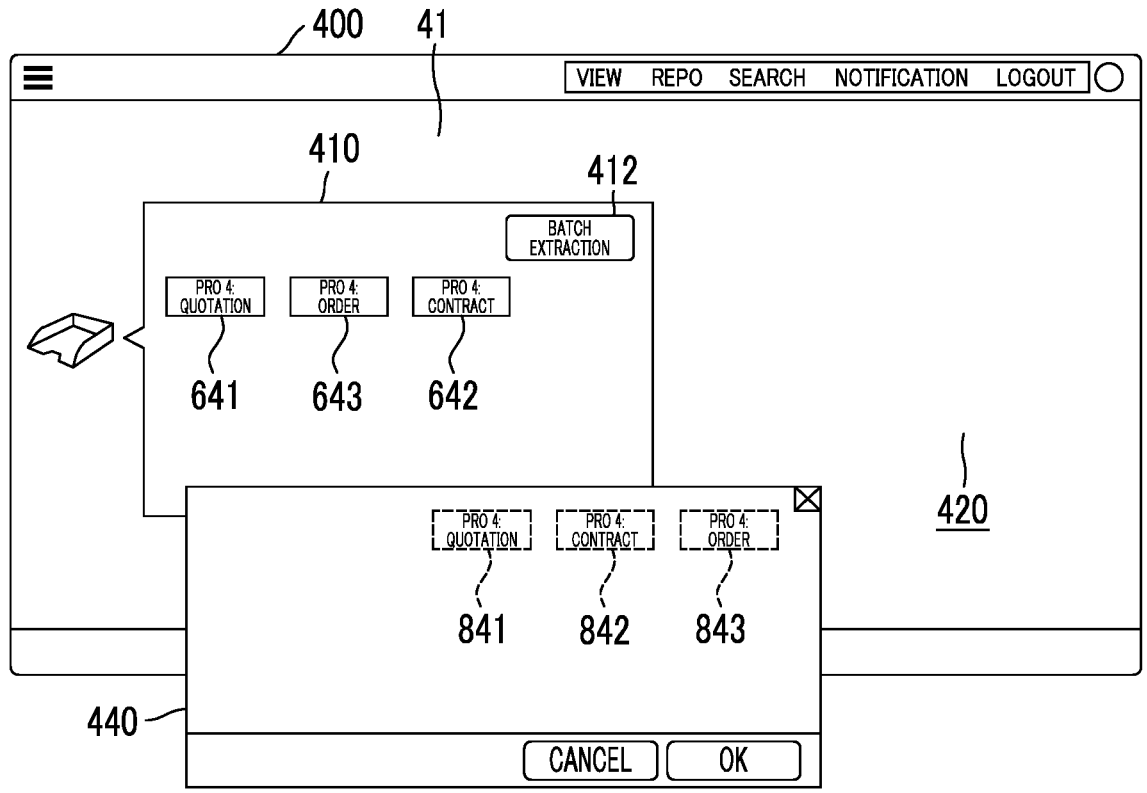
Figure 21B:
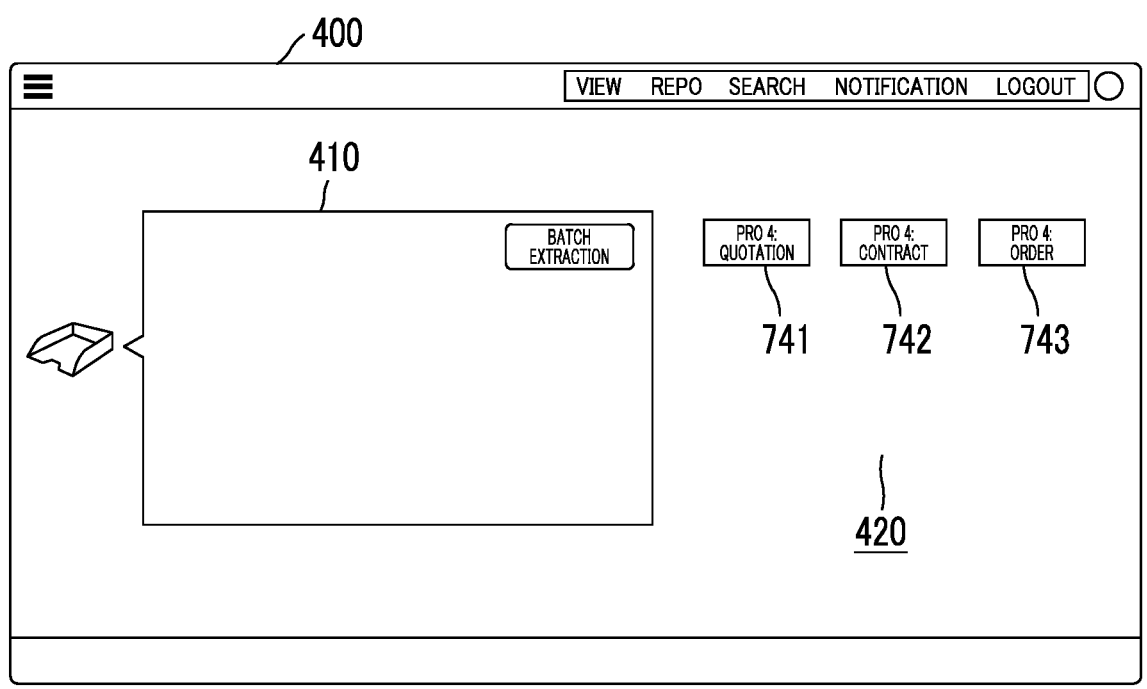

FIGS. 21A and 21B are diagrams explaining the display content of the operation screen 400 in a case where the batch extraction button 412 is pressed. FIG. 21A shows a state in which the arrangement image area 440 appears, and FIG. 21B shows a state in which the extraction display area 420 is displayed according to the arrangement image area 440. FIGS. 21A and 21B correspond to FIGS. 14A and 14B in the first exemplary embodiment.

In the arrangement image area 440 shown in FIG. 21A, the pieces of thumbnail information 841 to 843 corresponding to the pieces of thumbnail information 641 to 643 in the reception display area 410 are arranged. The pieces of thumbnail information 841 to 843 of the arrangement image area 440 are in the alignment of the quotation sheet, the contract sheet, and the order sheet in a predetermined order, and are different from the alignment of the pieces of thumbnail information 641 to 643 of the reception display area 410.

Further, the arrangement image area 440 is displayed with "Pro 4 quotation sheet", "Pro 4 contract sheet", and "Pro 4 order sheet" corresponding to the document IDs "D0000010" to "D0000012" (see FIG. 22B). On the other hand, the arrangement image area 440 is not displayed with "Pro 1 quotation sheet", "Pro 1 contract sheet", and "Pro 1 order sheet" corresponding to the document IDs "D0000001" to "D0000003" (see FIG. 22B).

In a case where the OK button shown in FIG. 21A is pressed, the pieces of thumbnail information 741 to 743 are positioned in the extraction display area 420 with the alignment of the arrangement images shown in the arrangement image area 440, as shown in FIG. 21B. As a result, the new pieces of thumbnail information 741 to 743 are displayed in the extraction display area 420.

FIGS. 22A and 22B are diagrams explaining update performed by batch extraction, FIG. 22A corresponds to FIG. 19B in the document information Ta, and FIG. 22B corresponds to FIG. 20 in the work history Tb.

In a case where the operation screen 400 shown in FIG. 21B described above is confirmed, numerical values are input to the items of the X coordinates and the Y coordinates of the document IDs "D0000010", "D0000011" and "D0000012" in the document information Ta, as shown in a broken line frame B31 in FIG. 22A. Further, as shown in a broken line frame B33 in FIG. 22B, the document IDs "D0000010", "D0000011", and "D0000012" are added to the work history Tb.

Significance of Third Exemplary Embodiment

As described above, in the third exemplary embodiment, in a case where the confirmation work performed on the quotation sheets, the contract sheets, and the order sheets of the projects 1 to 3 is completed and the quotation sheet, the contract sheet, and the order sheet of the project 4 are newly arrived at the inbox, the pieces of thumbnail information are arranged in the extraction display area 420 in an alignment method of performing the confirmation work on the projects 1 to 3, that is, an alignment method according to the individual work habit.

Fourth Exemplary Embodiment

Next, a fourth exemplary embodiment to which the present exemplary embodiment is applied will be described.

Similar to the first to third exemplary embodiments, automatic extraction is performed using an alignment method according to an individual work habit in the fourth exemplary embodiment. Then, in a case where a user performs a confirmation work on the project 1, the project 2, and the project 3, the sets of documents of the project 4, the project 5, and the project 6 have arrived at the inbox, so the documents of the project 4 to 6 are collectively extracted on the workspace 41.

More specifically, in the fourth exemplary embodiment, the project 4 and the project 6 are non-consecutive project numbers and belong to an identical business partner company (sales representative). In a case where extraction is performed in a form in which the projects are arranged to be close to each other to perform the work collectively, improvement of work efficiency can be expected.

Hereinafter, the fourth exemplary embodiment will be specifically described with reference to FIGS. 23 to 27, and the description common to the first to third exemplary embodiments may be omitted.

Figure 23:
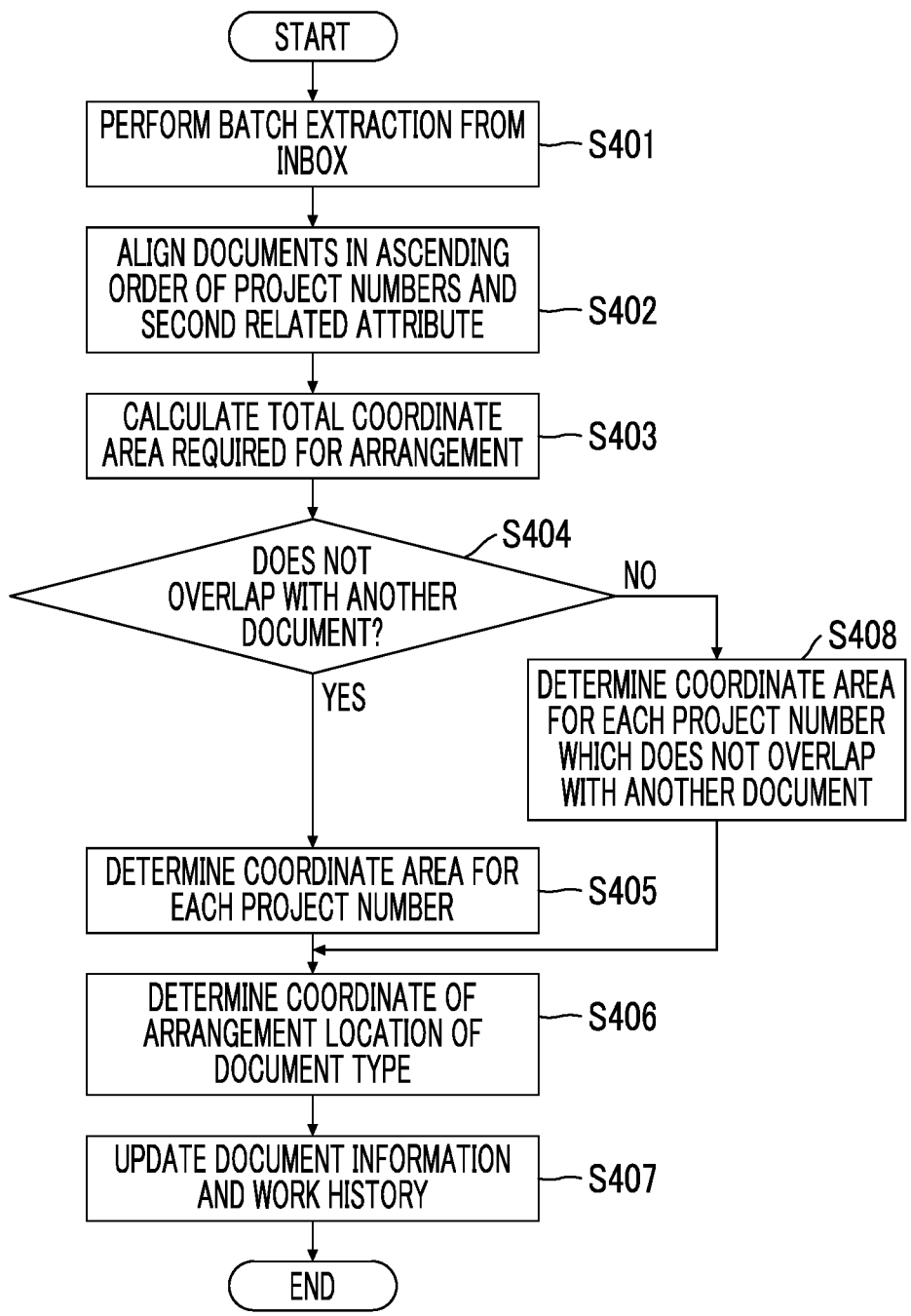
FIG. 23 is a flowchart showing a processing example by an extraction processing unit according to a fourth exemplary embodiment.

FIG. 23 is a flowchart showing a processing example by the extraction processing unit 101 (see FIG. 4) of the fourth exemplary embodiment, and corresponds to FIG. 7.

In the processing example shown in FIG. 23, in a case where batch extraction is performed from the inbox according to the operation instruction of the user (step S401), the documents stored in the inbox are extracted for each project and aligned in ascending order of the project number and the second related attribute (step S402). That is, in the processing example shown in FIG. 23, alignment is performed in ascending order while using the project number as a first sort key and the second related attribute as a second sort key, thereby being different from the case of FIG. 7 in which the project numbers are arranged.

Steps S403 to S408 are the same as steps S203 to S208 in FIG. 7, and the description thereof will be omitted.

Figure 24:
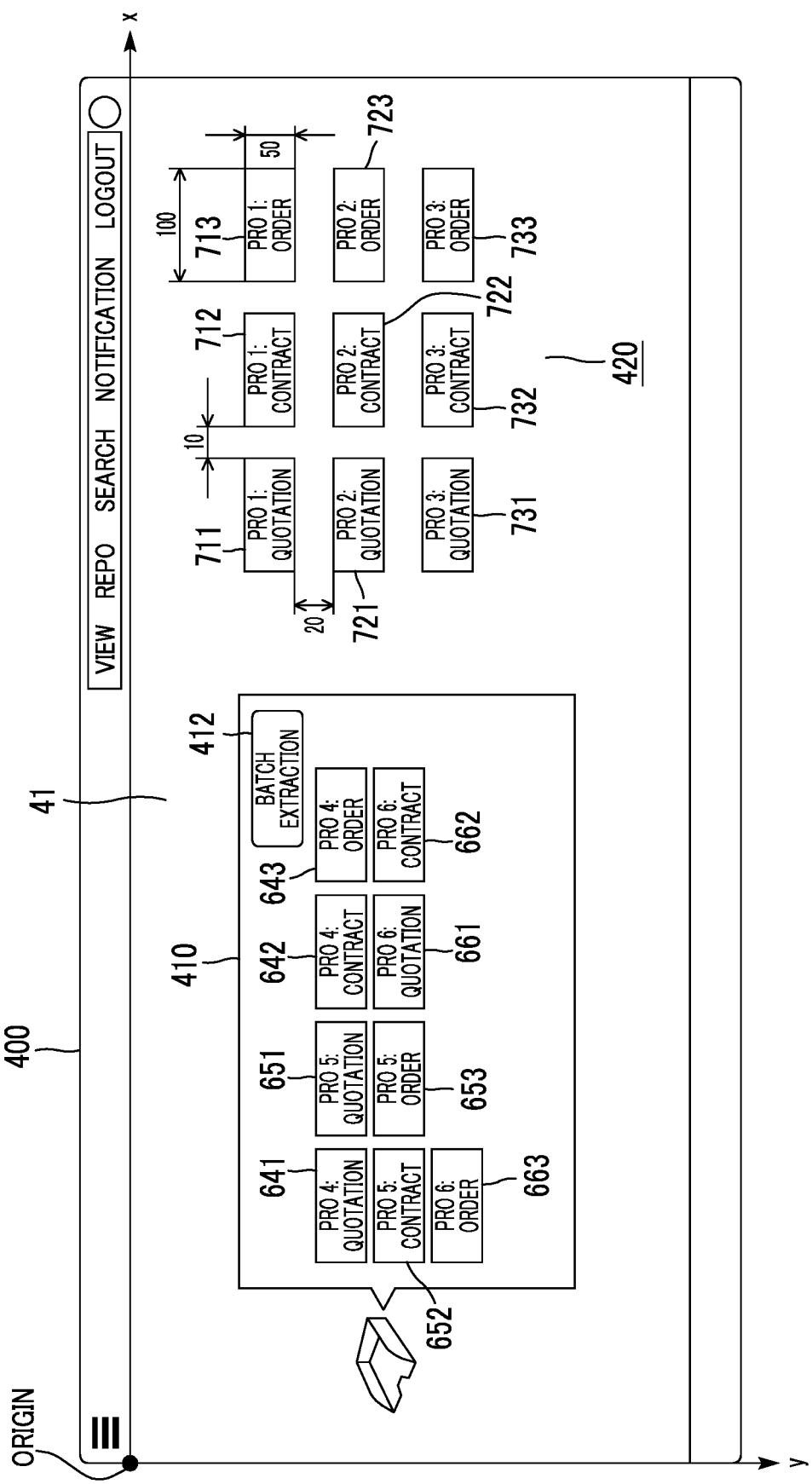
FIG. 24 is a diagram explaining an operation screen according to the fourth exemplary embodiment.

FIG. 24 is a diagram explaining an operation screen 400 of the fourth exemplary embodiment, and corresponds to FIG. 12 of the first exemplary embodiment.

Each of the pieces of thumbnail information 641 to 643 having "Pro 4: quotation", "Pro 4: order", and "Pro 4: contract" is displayed in the reception display area 410 of the operation screen 400 shown in FIG. 24. Further, each of the pieces of thumbnail information 651 to 653 having "Pro 5: quotation", "Pro 5: order" and "Pro 5: contract" and each of the pieces of thumbnail information 661 to 663 having "Pro 6: quotation", "Pro 6: order", and "Pro 6: contract" are also displayed.

Further, the extraction display area 420 is displayed with the pieces of thumbnail information 711 to 713, 721 to 723, and 731 to 733 for each of the quotation sheets, the contract sheets, and the order sheets of the projects 1 to 3.

FIG. 25 is a diagram explaining the document information Ta held by the document information management unit 14*a* (see FIG. 2), and corresponds to FIG. 13 of the first exemplary embodiment.

In the document information Ta shown in FIG. 25, "(null)" is shown in portions of the X coordinates and the Y coordinates of the document IDs "D0000010" to "D0000012" included in a broken line frame B41. "(null)" shown in portions of the X coordinates and the Y coordinates of the document IDs "D0000010" to "D0000012" corresponds to the pieces of thumbnail information 641 to 643 (see FIG. 24).

Further, "(null)" is shown in portions of the X coordinates and the Y coordinates of the document IDs "D0000016" to "D0000018" included in a broken line frame B42. "(null)" shown in portions of the X coordinates and the Y coordinates of the document IDs "D0000016" to "D0000018" corresponds to the pieces of thumbnail information 661 to 663 (see FIG. 24).

Further, "(null)" is also shown in portions of the X coordinates and the Y coordinates of the document IDs "D0000013" to "D0000015" in a range sandwiched between the broken line frame B41 and the broken line frame B42. "(null)" shown in portions of the X coordinates and the Y coordinates of the document IDs "D0000013" to "D0000015" corresponds to the pieces of thumbnail information 651 to 653 (see FIG. 24).

Further, the document information Ta shown in FIG. 25 is different from the document information Ta shown in FIG. 13 of the first exemplary embodiment in that the item of the creator ID is included as shown in a broken line frame B43. The creator ID corresponds to the second related attribute (see step S402 in FIG. 23).

The second related attribute is an example of creator information.

As shown in the document information Ta in FIG. 25, the creator ID of the set of forms of the project number "M0000001" is User001. Further, the creator ID of the set of forms of the project number "M0000002" is User002, the creator ID of the set of forms of the project number "M0000003" is User003, and the creator ID of the set of forms of the project number "M0000005" is User005. Each of the creator IDs is different from each other.

On the other hand, all the creator IDs of the set of forms of the project numbers "M0000004" and "M0000006" is User004. Therefore, the creator ID is the same and, for example, it is preferable that the projects are arranged to be close to each other in the extraction display area 420.

Here, in the workspace 41 shown in FIG. 24, the processing example performed by the extraction processing unit 101 shown in FIG. 23 in a case where the batch extraction button 412 is pressed is basically the same as the case of the first exemplary embodiment (see FIG. 7). A different step S402 will be described.

The documents stored in the inbox are extracted using the project number, and the extracted project numbers "M0000004", "M0000005", and "M0000006" are not the documents already arranged in the extraction display area 420, so that arrangement is performed using the project number as the first sort key and using the creator ID as the second sort key in ascending order (see step S402 in FIG. 23). That is,
1) M0000004, User004
2) M0000006, User004
3) M0000005, User005.

Therefore, the document arrangement location in the project number "M0000004" and the user ID "User004" by the internal control corresponding to the flowchart of FIG. 7 described above is
  D0000010: (Document type: quotation sheet, X coordinate: 1000, Y coordinate: 410)
  D0000011: (Document type: contract sheet, X coordinate: 1110, Y coordinate: 410)
  D0000012: (Document type: order sheet, X coordinate: 1220, Y coordinate: 410),
the document arrangement location in the project number "M0000006" and the user ID "User004" is
  D0000016: (Document type: quotation sheet, X coordinate: 1000, Y coordinate: 480)
  D0000017: (Document type: contract sheet, X coordinate: 1110, Y coordinate: 480)
  D0000018: (Document type: order sheet, X coordinate: 1220, Y coordinate: 480), and
the document arrangement location in the project number "M0000005" and the user ID "User005" is
  D0000013: (Document type: quotation sheet, X coordinate: 1000, Y coordinate: 550)
  D0000014: (Document type: contract sheet, X coordinate: 1110, Y coordinate: 550)
  D0000015: (Document type: order sheet, X coordinate: 1220, Y coordinate: 550).

That is, the Y coordinate of the project number "M0000004" is 410, the Y coordinate of the project number "M0000006" is 480, the Y coordinate of the project number "M0000005" is 550, and the project numbers "M0000004" and "M0000006" having the same creator ID are arranged adjacent to each other.

In the fourth exemplary embodiment, as described above, the X coordinate and the Y coordinate as the positional information displayed in the extraction display area 420 in the document information Ta (see FIG. 25) are used, but the present invention is not limited thereto. As in the third exemplary embodiment, the final X coordinate and the final Y coordinate of the work history Tb (see FIG. 20) may be used.

Figure 26A:
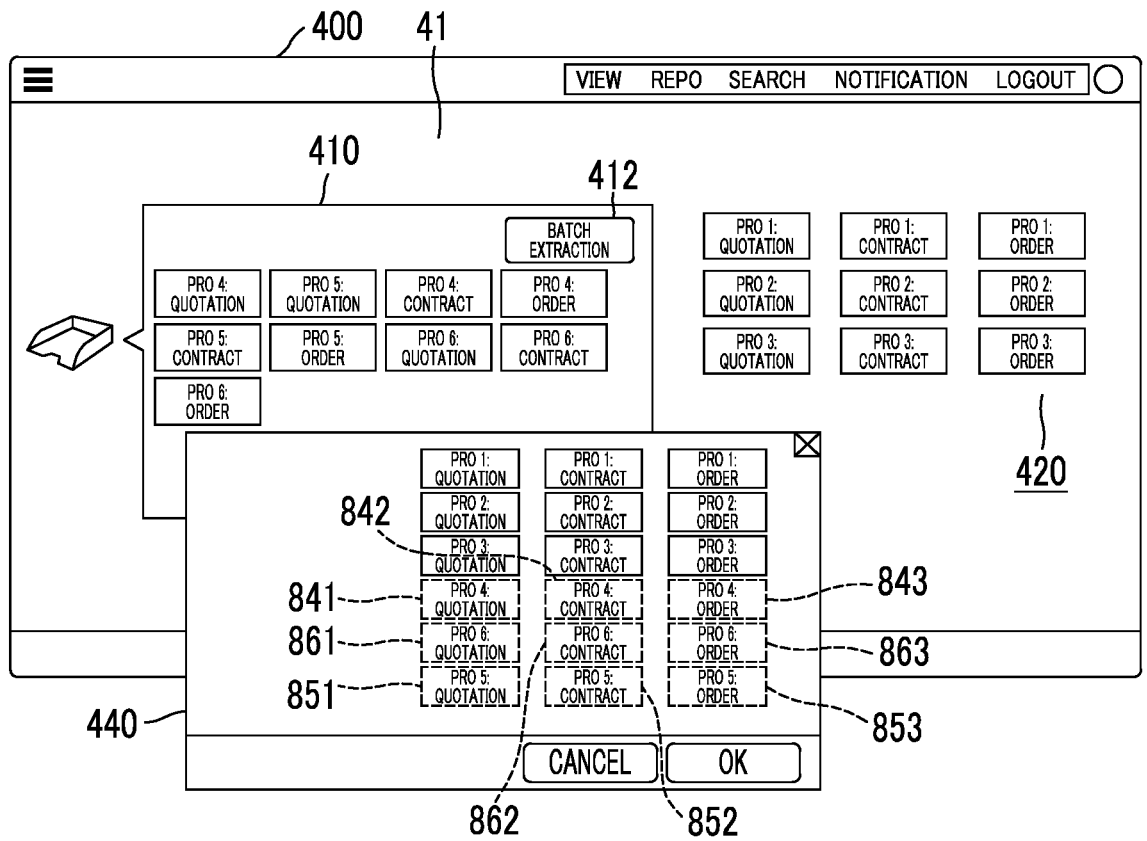
Figure 26B:
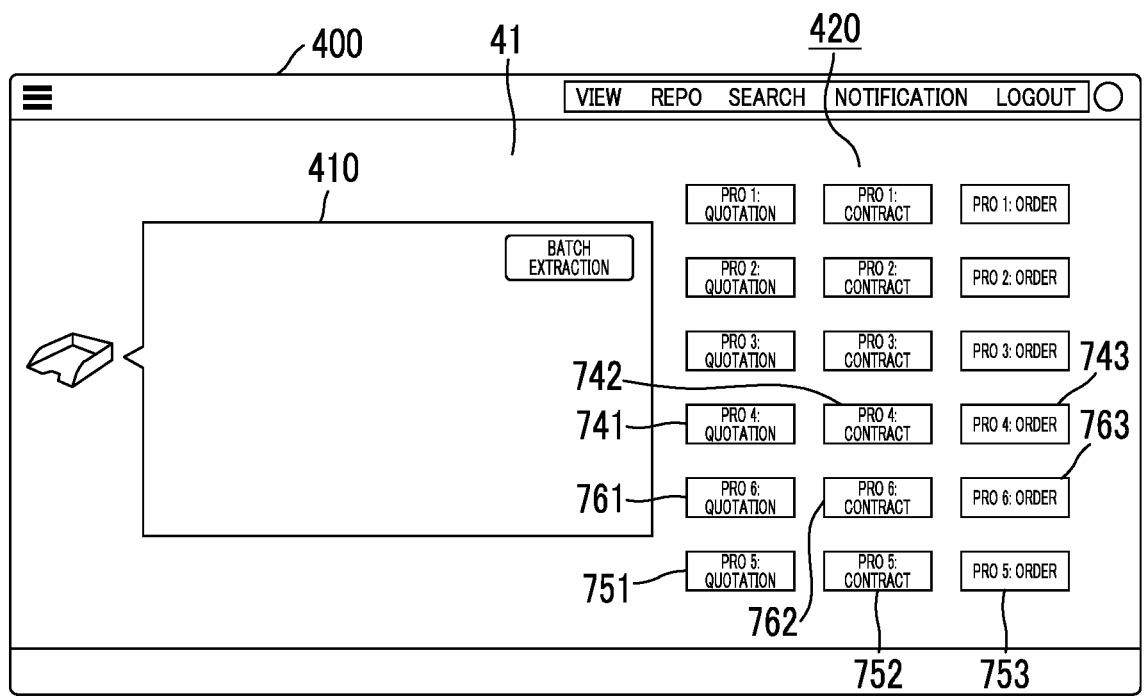

FIGS. 26A and 26B are diagrams explaining the display content of the operation screen 400 in a case where the batch extraction button 412 is pressed. FIG. 26A shows a state in which the arrangement image area 440 appears, and FIG. 26B shows the arrangement image area 440. The state displayed in the extraction display area 420 is shown. FIGS. 26A and 26B correspond to FIGS. 14A and 14B in the first exemplary embodiment.

In the arrangement image area 440 shown in FIG. 26A, following the pieces of thumbnail information corresponding to the pieces of thumbnail information 711 to 713, 721 to 723, and 731 to 733 (see FIG. 24) in the extraction display area 420, the pieces of thumbnail information 841 to 843, 851 to 853, and 861 to 863 corresponding to the pieces of thumbnail information 641 to 643, 651 to 653, and 661 to 663 (see FIG. 24) in the reception display area 410 are arranged.

In a case where an OK button shown in FIG. 26A is pressed, the pieces of thumbnail information 741 to 743, 761 to 763, and 751 to 753 are positioned in the extraction display area 420 with the alignment of the arrangement images shown in the arrangement image area 440, as shown in FIG. 26B.

As a result, the new pieces of thumbnail information 741 to 743 and 761 to 763 having the same user ID are arranged to be close to each other in the extraction display area 420, and the pieces of thumbnail information 751 to 753 are displayed below the new pieces of thumbnail information 741 to 743 and 761 to 763.

In this way, in a case where the project numbers are different but the user IDs are the same, the positions of the documents are determined to be closer than a case where the user IDs are different.

FIG. 27 is a diagram explaining the content of the document information Ta updated in a case where the batch extraction is performed, and corresponds to FIG. 25. Further, FIG. 27 corresponds to FIG. 15 in the first exemplary embodiment.

In a case where the operation screen 400 shown in FIG. 26B described above is confirmed, numerical values are input to the items of the X coordinates and Y coordinates of the documents "M0000004" and "M0000006" as in the broken line frames B41 and B42 shown in FIG. 25. Further, numerical values are input to the items of the X coordinate and Y coordinate of each document of "M0000005" in a range sandwiched between the broken line frame B41 and the broken line frame B42.

Significance of Fourth Exemplary Embodiment

As described above, in the fourth exemplary embodiment, the creator ID, which is the second related attribute of the documents stored in the inbox, is used, the documents are extracted for each project to be aligned in ascending order using the project number as the first sort key and the creator ID, which is the second related attribute, as the second sort key, so that documents of the identical business partner company (sales representative) are arranged to be close to the extraction display area 420, thereby improving work efficiency.

Fifth Exemplary Embodiment

Next, a fifth exemplary embodiment to which the present exemplary embodiment is applied will be described.

Similar to the fourth exemplary embodiment, in the fifth exemplary embodiment, in a case where a user performs a confirmation work on the project 1, the project 2 and the project 3, the sets of documents of the project 4, the project 5, and the project 6 have arrived at the inbox, so that the documents of the project 4 to the project 6 are collectively extracted on the workspace 41.

More specifically, in the fifth exemplary embodiment, projects whose project numbers are not consecutive but which have some relationship with included description content (for example, including text (annotation), such as "urgent", "immediate", "emergency", or "priority", in the description) are extracted in a form to be preferentially arranged to be close to each other, so that improvement in work efficiency may be expected.

Hereinafter, the fifth exemplary embodiment will be described in detail with reference to FIGS. 28 to 30B, and the description common to the first to fourth exemplary embodiments may be omitted.

Figure 28:
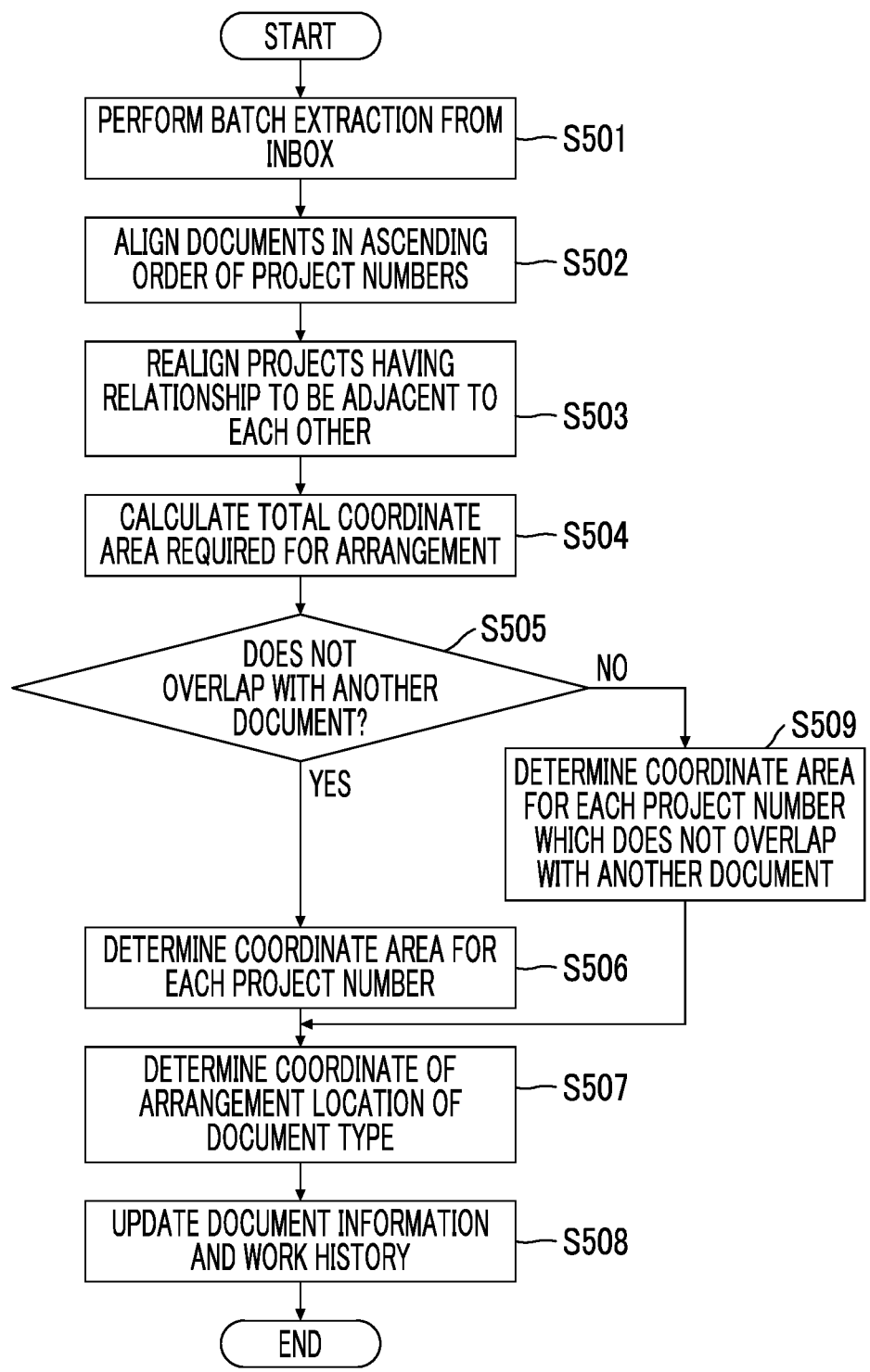
FIG. 28 is a flowchart showing a processing example by an extraction processing unit according to a fifth exemplary embodiment.

FIG. 28 is a flowchart showing a processing example by the extraction processing unit 101 (see FIG. 4) in the fifth exemplary embodiment, and corresponds to FIG. 7.

In the processing example shown in FIG. 28, in a case where batch extraction is performed from the inbox according to the operation instruction of the user (step S501), the documents stored in the inbox are extracted for each project and are aligned in ascending order of the project number (step S502).

Then, content analysis is performed on each document, and the projects determined to have relationship are realigned to be adjacent to each other (step S503). Determination of whether or not there is relationship is performed based on whether or not the description content includes predetermined text, such as "urgent", "immediate", or "emergency", or an annotation. In a case where there are a plurality of documents containing the annotations, it is determined that the respective documents have relationship.

Steps S504 to S509 are the same as steps S203 to S208 in FIG. 7, and the description thereof will be omitted.

Figure 29:
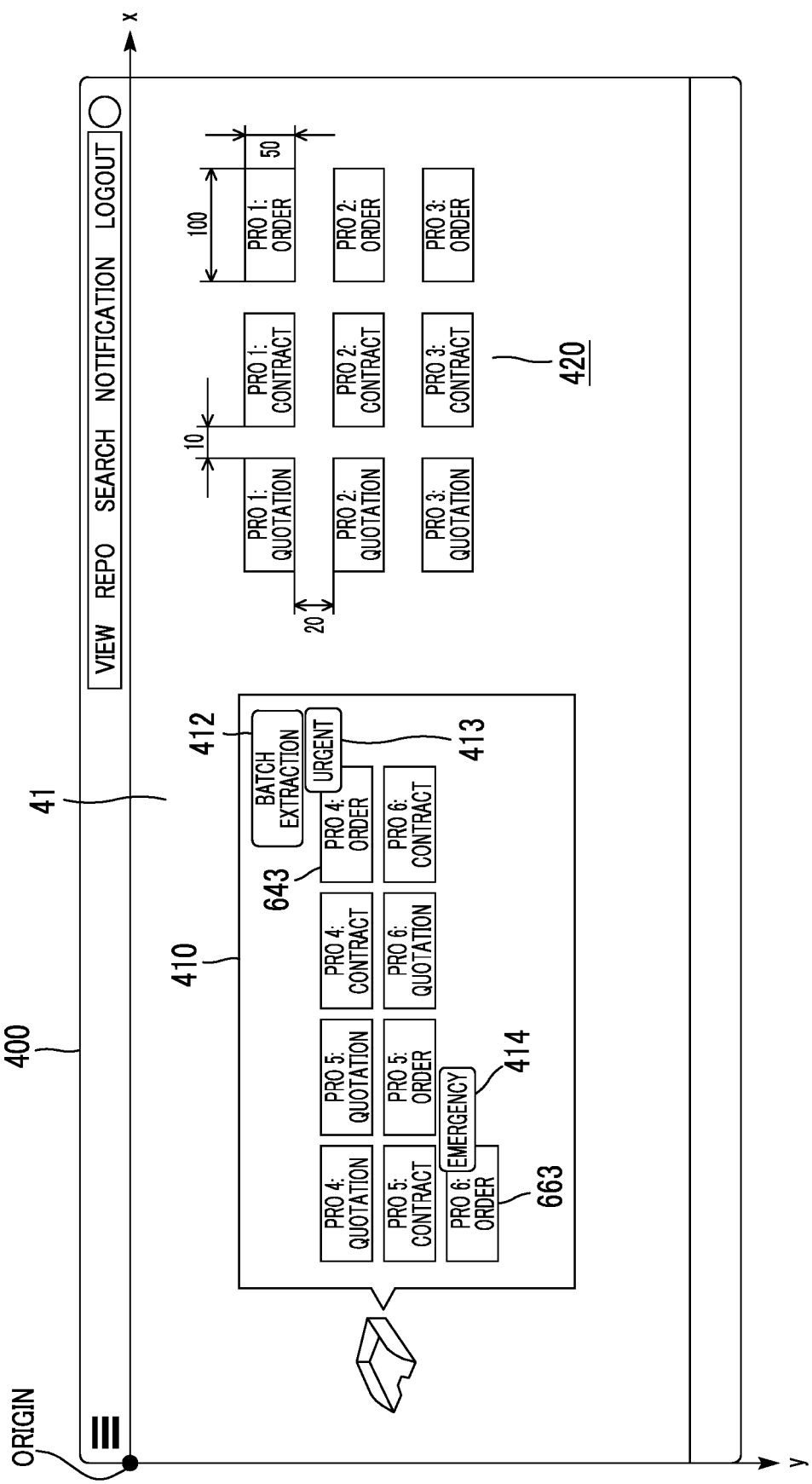
FIG. 29 is a diagram explaining an operation screen according to the fifth exemplary embodiment.

FIG. 29 is a diagram explaining an operation screen 400 of the fifth exemplary embodiment, and corresponds to FIG. 12 of the first exemplary embodiment.

In the reception display area 410 of the operation screen 400 shown in FIG. 29, each of the pieces of thumbnail information of "Pro 4: quotation", "Pro 4: order", "Pro 4: contract", "Pro 5: quotation", "Pro 5: order", "Pro 5: contract", "Pro 6: quotation", "Pro 6: order" and "Pro 6: contract" are displayed.

More specifically, the thumbnail information 643 of "Pro 4: order" includes an annotation 413 of "urgent", and the thumbnail information 663 of "Pro 6: order" includes an annotation 414 of "emergency".

Further, the extraction display area 420 is displayed with each of the pieces of thumbnail information of "Pro 1: quotation", "Pro 1: order", "Pro 1: contract", "Pro 2: quotation", "Pro 2: order", "Pro 2: contract", "Pro 3: quotation", "Pro 3: order" and "Pro 3: contract".

Here, the document information Ta held by the document information management unit 14a (see FIG. 2) of the fifth exemplary embodiment has a part in common to the case of the fourth exemplary embodiment (see FIG. 25), so that the illustration and description thereof will be omitted. As a supplementary explanation, the document information Ta of the fifth exemplary embodiment has the items of the document ID, the document name, the document type, the project number, the X coordinate, and the Y coordinate, and is the same as the document information obtained by excluding the item of "creator ID" from the document information Ta (see FIG. 25) of the fourth exemplary embodiment.

Here, in the workspace 41 shown in FIG. 29, the processing example shown in FIG. 28 and performed by the extraction processing unit 101 in a case where the batch extraction button 412 is pressed is basically the same as the case of the first exemplary embodiment (see FIG. 7), and a different step S503 will be described.

The content analysis is performed on each of the documents of "M0000004", "M0000005", and "M0000006" sorted in ascending order of the project numbers to determine connection of each of the documents (each of the projects). In the case of the fifth exemplary embodiment, the "Pro 4: order sheet" contains the annotation 413 of "urgent" and the "Pro 6: order sheet" contains the annotation 414 of "emergency", so that it is determined that the project 4 and the project 6 have relationship.

As a result, the project numbers "M0000004" and "M0000006" are realigned to be adjacent to each other (see step S503 in FIG. 28). That is,

1) M0000004
2) M0000006
3) M0000005.

Therefore, the document arrangement location in the project number "M0000004" by the internal control corresponding to the flowchart of FIG. 7 described above is D0000010: (Document type: quotation sheet, X coordinate: 1000, Y coordinate: 410)
D0000011: (Document type: contract sheet, X coordinate: 1110, Y coordinate: 410)

D0000012: (Document type: order sheet, X coordinate: 1220, Y coordinate: 410), the document arrangement location in the project number "M0000006" is D0000016: (Document type: quotation sheet, X coordinate: 1000, Y coordinate: 480)

D0000017: (Document type: contract sheet, X coordinate: 1110, Y coordinate: 480)

D0000018: (Document type: order sheet, X coordinate: 1220, Y coordinate: 480), and the document arrangement location in the project number "M0000005" is D0000013: (Document type: quotation sheet, X coordinate: 1000, Y coordinate: 550)

D0000014: (Document type: contract sheet, X coordinate: 1110, Y coordinate: 550)

D0000015: (Document type: order sheet, X coordinate: 1220, Y coordinate: 550).

That is, the Y coordinate of the project number "M0000004" is 410, the Y coordinate of the project number "M0000006" is 480, and the Y coordinate of the project number "M0000005" is 550, so that the project numbers "M0000004" and "M0000006" of the related documents are arranged to be adjacent to each other.

In the fifth exemplary embodiment, as described above, the X coordinate and the Y coordinate as the positional information displayed in the extraction display area 420 in the document information Ta are used, but the present invention is not limited thereto. As in the third exemplary embodiment, the final X coordinate and the final Y coordinate of the work history Tb (see FIG. 20) may be used.

Figure 30A:
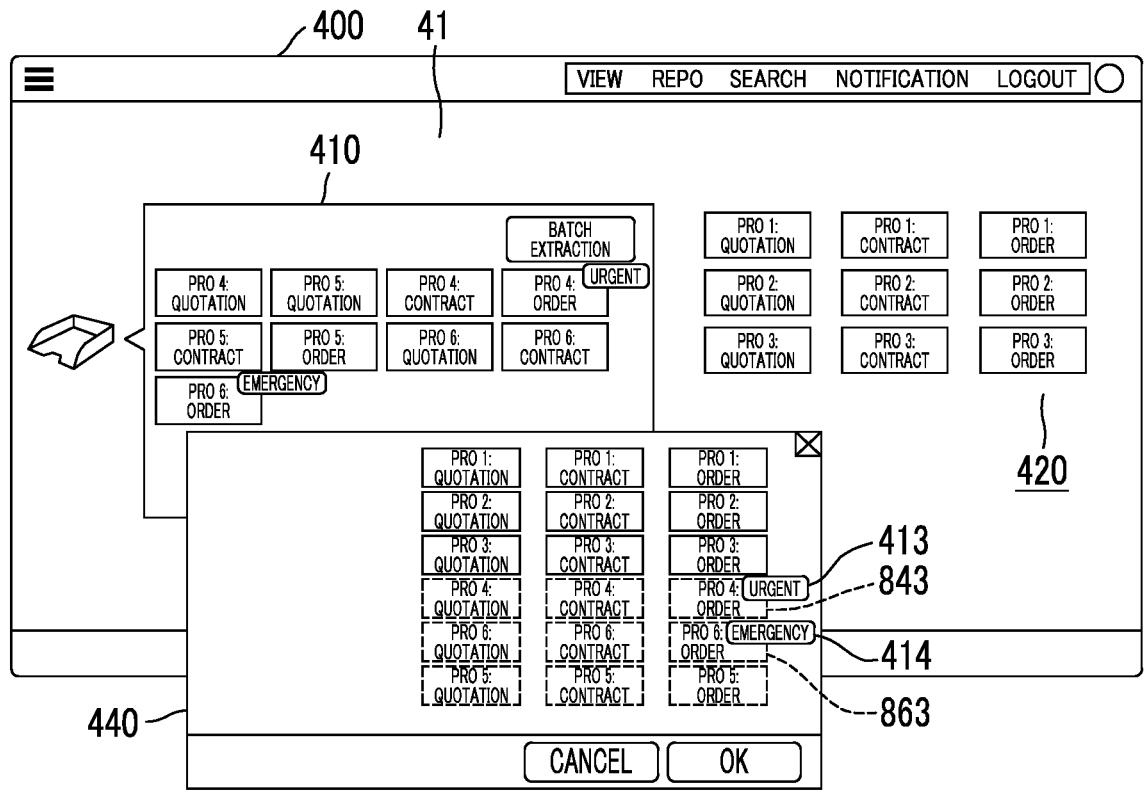
Figure 30B:
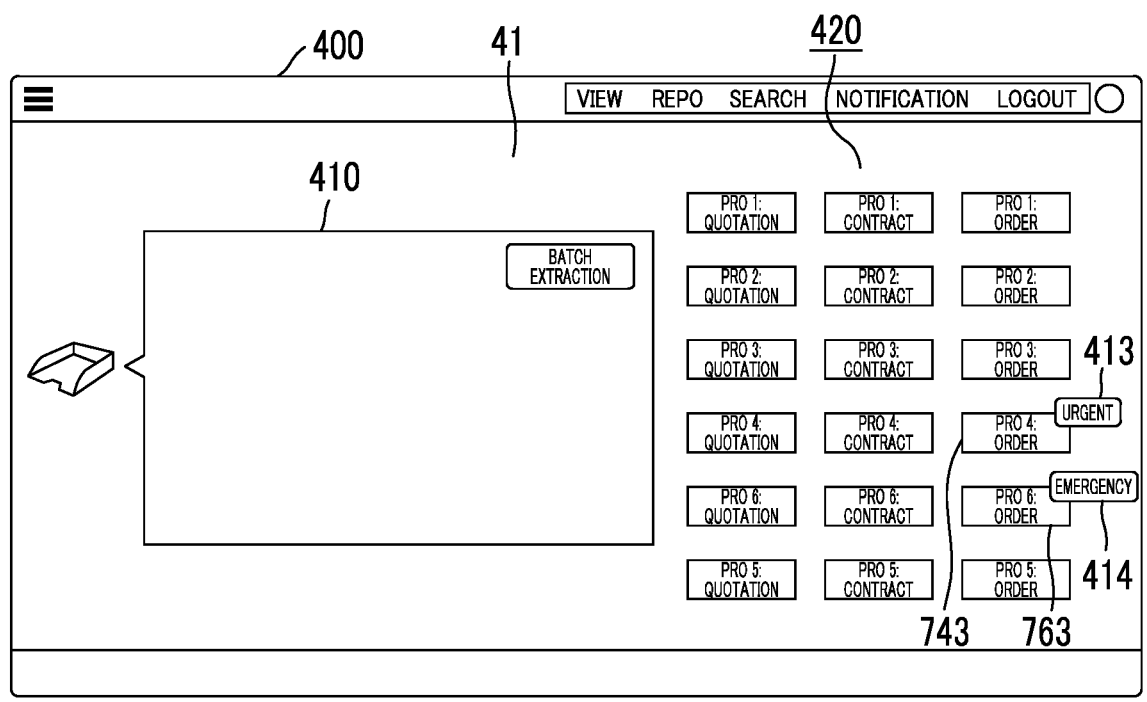

FIGS. 30A and 30B are diagrams explaining the display content of the operation screen 400 in a case where the batch extraction button 412 is pressed. FIG. 30A shows a state in which the arrangement image area 440 appears, and FIG. 30B shows a state in which the extraction display area 420 is displayed according to the arrangement image area 440. FIGS. 30A and 30B correspond to FIGS. 14A and 14B in the first exemplary embodiment.

In the arrangement image area 440 shown in FIG. 30A, following the thumbnail information of each of the documents of the project 1 to the project 3 in the extraction display area 420, the thumbnail information of each of the documents of the project 4 to the project 6 in the reception display area 410 is arranged.

More specifically, in the arrangement image area 440, the thumbnail information 843 of "Pro 4: order sheet" includes the annotation 413 of "urgent", and the thumbnail information 863 of "Pro 6: order sheet" includes an annotation 414 of "emergency".

In a case where an OK button shown in FIG. 30A is pressed, the thumbnail information of each of the documents of the project 1 to the project 6 is displayed in the extraction display area 420 with the alignment of the arrangement images and the annotation display shown in the arrangement image area 440, as shown in FIG. 30B.

The annotation 413 of "urgent" and the annotation 414 of "emergency" are also displayed in the extraction display area 420.

As a result, the new project 4 including the annotation display and the project 6 are displayed to be arranged to be close to each other in the extraction display area 420.

To be easily noticed by the user, the annotation display is positioned at upper right part conspicuous with respect to the thumbnail information in the fifth exemplary embodiment. Further, in the fifth exemplary embodiment, a mode is adopted of displaying a color different from a color indicating the pieces of thumbnail information of the reception display area 410, the arrangement image area 440, or the extraction display area 420, but a display mode including the display position of the annotation display is not limited thereto. For example, there is a display mode in which a size of the annotation display changes, a display mode in which a background color and a text color of the annotation display are repeatedly inverted.

However, even in the fifth exemplary embodiment, since automatic extraction is performed using an alignment method according to an individual work habit, the alignment should not be changed depending on presence or absence of the annotation display.

Further, for example, annotation display is preferable so that the interval of the pieces of thumbnail information is not irregular, but a display mode may be considered that attracts attention of the user with the irregular interval due to the annotation display.

Further, the display of thumbnail information is not changed depending on the presence or absence of the annotation display, but a display mode may be considered that attracts attention of the user by adopting the display mode in which the thumbnail information including the annotation display is changed with other thumbnail information. For example, the display mode includes changing a size, a color, or the like of the thumbnail information.

Here, the document information Ta, which is updated in a case where the batch extraction is performed, is the same as the document information Ta (see FIG. 27) of the fourth exemplary embodiment, from which the item of "creator ID" is excluded, so that illustration and description thereof will be omitted.

Significance of Fifth Exemplary Embodiment

As described above, in the fifth exemplary embodiment, the documents which are stored in the inbox and which include the annotation display are determined to be the documents having relationship, the annotation display is arranged to be close to the extraction display area 420, so that work efficiency can be improved.

Sixth Exemplary Embodiment

Next, a sixth exemplary embodiment to which the present exemplary embodiment is applied will be described.

In the sixth exemplary embodiment, in a case where a confirmation work is performed on the project 1, the project 2 and the project 3, a set of documents of the project 4 and the project 5 arrives at the inbox, so that only the "quotation sheets" of the documents of the new projects 4 and 5 are collectively extracted on the workspace 41. That is, instead of performing the batch extraction on all the documents of the project 4 and the project 5, the batch extraction is performed on a part of the documents of the project 4 and the project 5.

Hereinafter, the sixth exemplary embodiment will be described in detail with reference to FIGS. 31A to 34, and the description common to the first to fifth exemplary embodiments may be omitted.

Figure 31A:
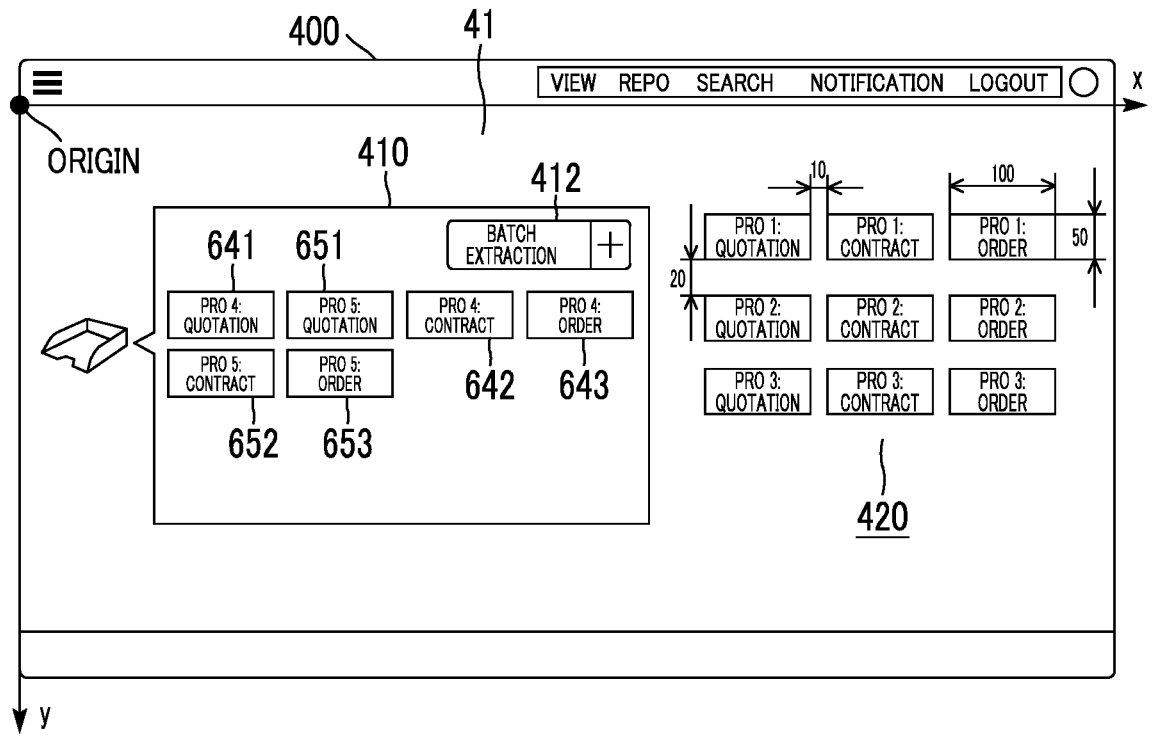
Figure 31B:
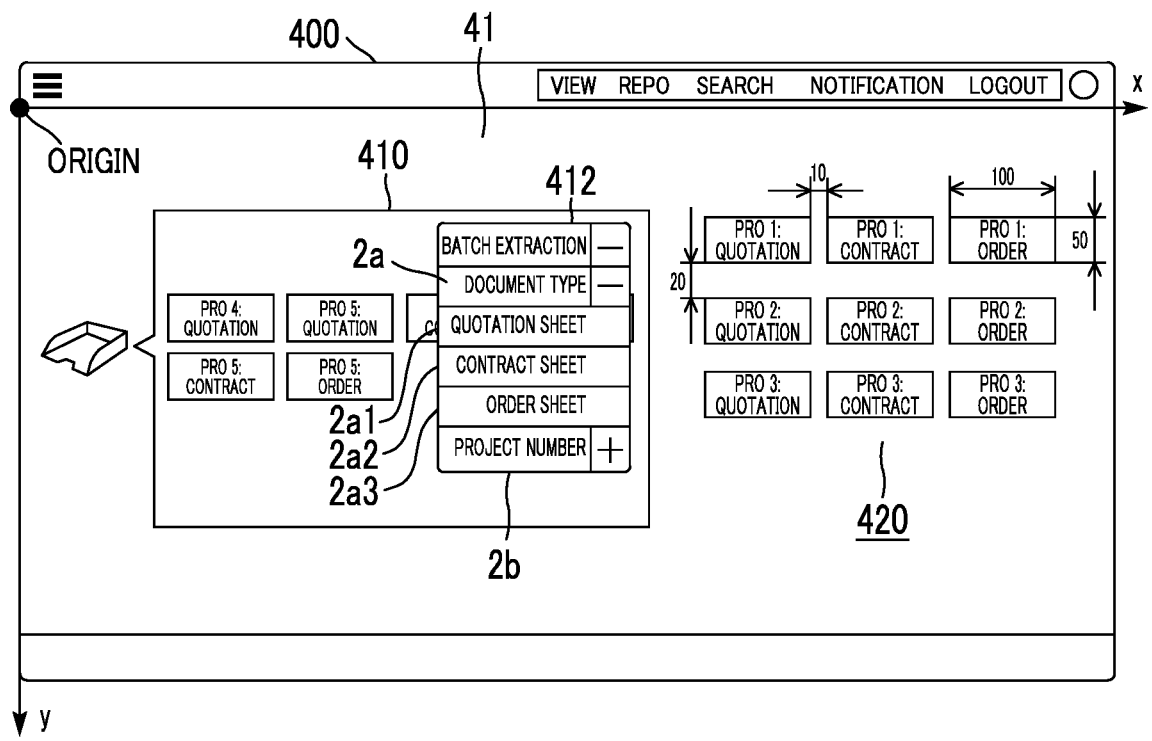

FIGS. 31A and 31B are diagrams explaining the operation screen 400 of the sixth exemplary embodiment, and FIG. 31A shows a state in which a user operation is not performed, and corresponds to FIG. 12 of the first exemplary embodiment. FIG. 31B shows a state after the batch extraction button 412 is pressed.

The reception display area 410 of the operation screen 400 shown in FIG. 31A is also displayed with each of the pieces of thumbnail information 641 to 643 of "Pro 4:

quotation", "Pro 4: order" and "Pro 4: contract" and each of the pieces of thumbnail information 651 to 653 of "Pro 5: quotation", "Pro 5: order" and "Pro 5: contract".

Further, the extraction display area 420 is displayed with each of the pieces of thumbnail information of "Pro 1: quotation", "Pro 1: order", "Pro 1: contract", "Pro 2: quotation", "Pro 2: order", "Pro 2: contract", "Pro 3: quotation", "Pro 3: order" and "Pro 3: contract".

The batch extraction button 412 shown in FIG. 31A is an accordion menu, and in a case of being pressed, a hidden detail screen of the batch extraction button 412 is displayed as shown in FIG. 31B. In the batch extraction button 412, either an item 2a for instructing to perform a batch extraction method by specifying the document type or the item 2b for instructing to perform the batch extraction method by specifying the project number.

Content of the accordion menu of the batch extraction button 412 is switched according to the attributes of the documents in the reception display area 410.

In the case of the sixth exemplary embodiment, the item 2a of the document type includes, as submenus, an item 2a1 for specifying the quotation sheet, an item 2a2 for specifying the contract sheet, and an item 2a3 for specifying the order sheet. Therefore, for example, in a case where the quotation sheet is collectively extracted among the pieces of thumbnail information 641 to 643 and 651 to 653 in the reception display area 410, the item 2a1 is specified. Further, for example, in a case where the quotation sheet and the contract sheet are collectively extracted, the items 2a1 and items 2a2 are specified.

In FIG. 31B, a submenu of item 2b of the project number is not shown, but in the case of the sixth exemplary embodiment, the item for specifying the project 4 and the item for specifying the project 5 are displayed.

In addition, in the case of the sixth exemplary embodiment, a configuration is adopted in which either the item 2a of the document type or the item 2b of the project number is selected, but a configuration may be adopted in which the documents to be collectively extracted is selected by combining the items 2a and 2b.

FIG. 32 is a diagram explaining the document information Ta held by the document information management unit 14a (see FIG. 2), and corresponds to FIG. 13 in the first exemplary embodiment.

The document information Ta shown in FIG. 32 includes items of a document ID, a document name, a document type, a project number, an X coordinate, and a Y coordinate. Further, in a broken line frame B61, "(null)" is shown in portions of the X coordinates and the Y coordinate of the document IDs "D0000010" to "D0000012" corresponding to the pieces of thumbnail information 641 to 643 (see FIG. 24).

Here, in the workspace 41 shown in FIGS. 31A and 31B, a processing example of the document information Ta shown in FIG. 32 by the statistical information processing unit 103 is the same as the content described to correspond to FIG. 6 in the first exemplary embodiment. However, supplementary description will be performed for the case of the sixth exemplary embodiment.

In the sixth exemplary embodiment, in a case where the acquisition unit 3a acquires the document type and the coordinate position of m-th (m<n) document ID (see step S103 in FIG. 6), attribute of the documents stored in the inbox is acquired. That is, Document type Project number are acquired, and the accordion menu of the batch extraction button 412 is created as described above from the attribute of the extracted document and the list of the attributes.

Figure 33A:
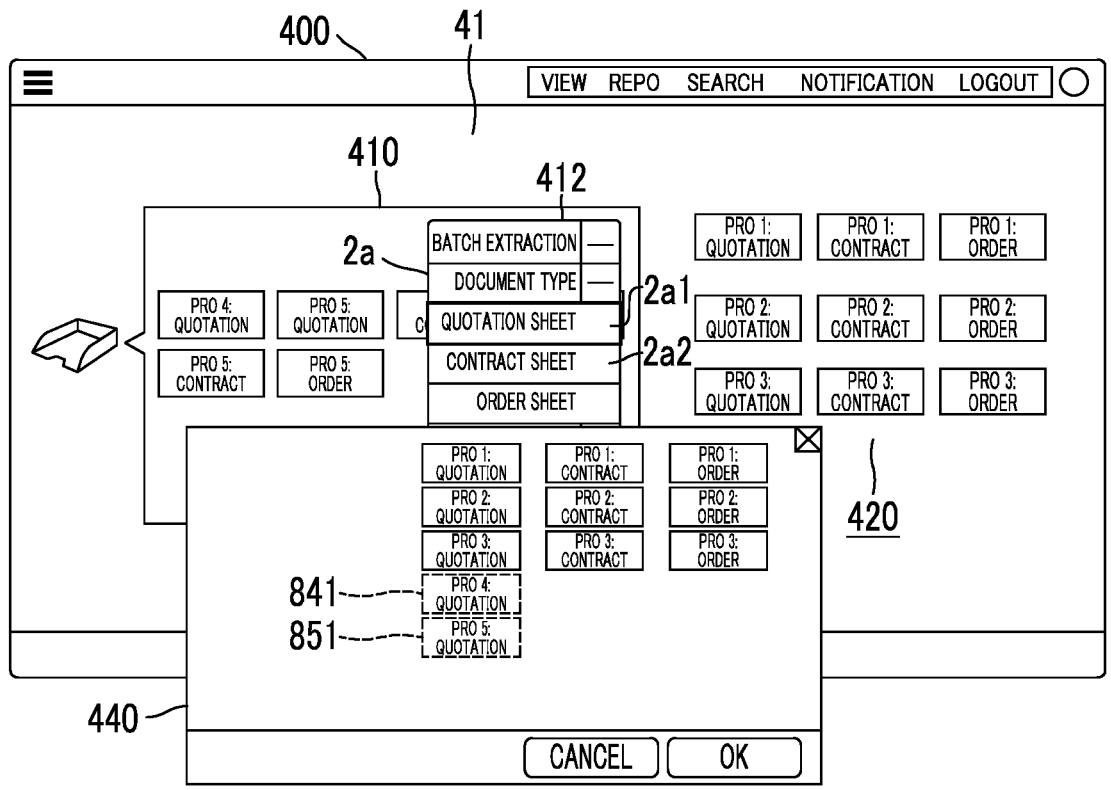
Figure 33B:
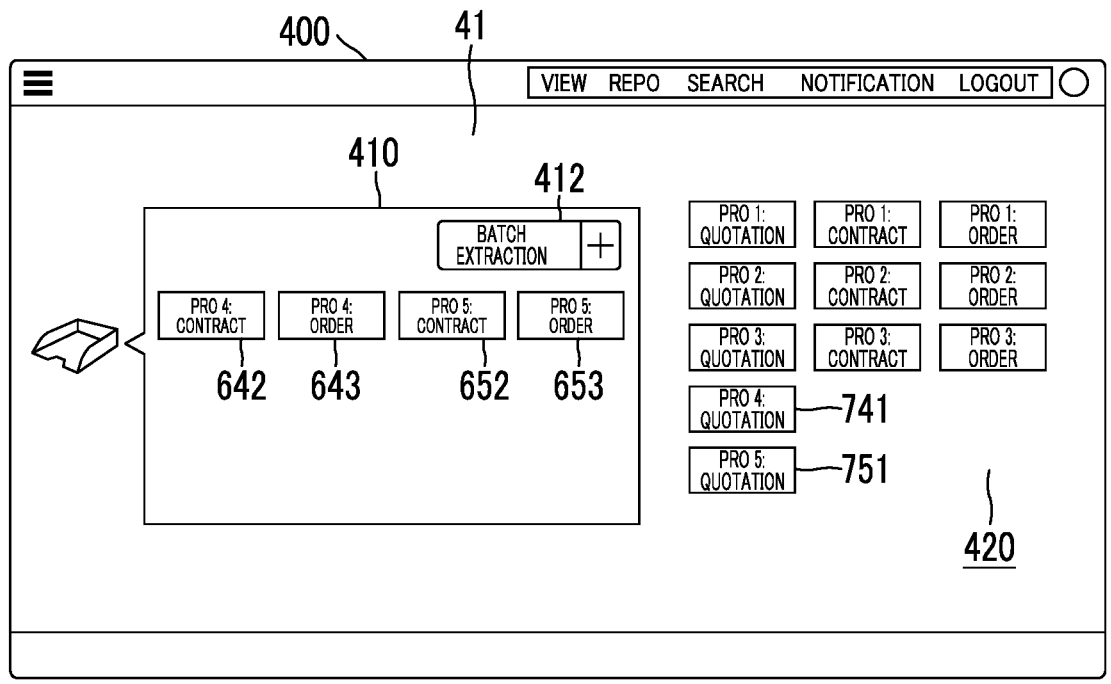

FIGS. 33A and 33B are diagrams explaining the display content of the operation screen 400 in a case where the batch extraction button 412 is pressed. FIG. 33A shows a state in which the arrangement image area 440 appears, and FIG. 33B shows a state in which the extraction display area 420 is displayed according to the arrangement image area 440. FIGS. 33A and 33B correspond to FIGS. 14A and 14B of the first exemplary embodiment.

FIG. 33A shows a case where the item 2a1 for designating the quotation sheet of the item 2a of the document type is specified in the batch extraction button 412 of the annotation display.

In the arrangement image area 440 shown in FIG. 33A, among the pieces of thumbnail information 641 to 643 and 651 to 653 (see FIG. 31A) in the reception display area 410, the pieces of thumbnail information 841 and 851 corresponding to the pieces of thumbnail information 641 and 651 of the quotation sheet (see FIG. 31A) are arranged.

The pieces of thumbnail information 841 and 851 of the arrangement image area 440 are arranged for each project. That is, the pieces of thumbnail information of the quotation sheet are arranged on a left side in a left and right direction.

In a case where an OK button shown in FIG. 33A is pressed, the pieces of thumbnail information 741 and 751 are positioned in the extraction display area 420 with the alignment of the arrangement images shown in the arrangement image area 440, as shown in FIG. 33B. As a result, the pieces of thumbnail information 741 and 751 of the new quotation sheet is displayed in the extraction display area 420.

FIG. 34 is a diagram explaining content of the document information Ta updated in a case where the batch extraction is performed, and corresponds to FIG. 32. Further, FIG. 34 corresponds to FIG. 15 of the first exemplary embodiment.

In a case where the operation screen 400 shown in FIG. 33B is confirmed, numerical values are input to the items of the X coordinate and the Y coordinate of the document ID "D0000010" which is the quotation sheet of the project number "M0000004" as in a broken line frame B61 shown in FIG. 34, and "(null)" is still shown in the items of the X coordinates and Y coordinates of each of the document ID "D0000011" of the contract sheet and the document ID "D0000012" of the order sheet. Although not shown in FIG. 34, the project number "M0000005" is updated in the same manner as the project number "M0000004".

Significance of Sixth Exemplary Embodiment

As described above, in the sixth exemplary embodiment, the batch extraction can be performed on not all the documents stored in the inbox but some of the documents, so that the work efficiency can be improved.

Processor

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

Program

The process performed by the image processing apparatus 1 according to the exemplary embodiment is prepared, for example, as a program such as application software.

Also, it is possible to provide the program for realizing the exemplary embodiment not only by a communication section but also by being stored in a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor configured to:
   acquire document attribute information of a document stored in a storage area;
   acquire other document attribute information of another document, and positional information of the other document by accessing the storage area in a case where the other document is displayed in a display area, wherein the positional information of the other document is calculated by weighting positional information as a history in which the other document is moved to the display area;
   determine a position in a case where the document is displayed in the display area based on the document attribute information, the other document attribute information, and the positional information, which are acquired; and
   align an icon of the document and an icon of the other document based on the determined position.

2. The information processing apparatus according to claim 1,
   wherein the document attribute information of the document and the other document attribute information of the other document include project information indicating a project to be used and type information indicating a document type.

3. The information processing apparatus according to claim 2,
   wherein, in a case where respective pieces of the project information of the document attribute information and the other document attribute information are the same, the document and the other document are aligned in one direction, and, in a case where respective pieces of the type information of the document attribute information and the other document attribute information are the same, the icon of the document and the icon of the other document are aligned in another direction intersecting the one direction.

4. The information processing apparatus according to claim 2,
   wherein, in a case where respective pieces of the project information of the document attribute information and the other document attribute information are the same, the icon of the document and the icon of the other document are aligned in one direction, and, in a case where respective pieces of the type information of the document attribute information and the other document attribute information are the same, the icon of the document and the icon of the other document are aligned in the one direction.

5. The information processing apparatus according to claim 2,
   wherein the position of the document to be determined is different between a case where respective pieces of the type information of the document attribute information and the other document attribute information are the same and a case where the respective pieces of the type information are different from each other.

6. The information processing apparatus according to claim 2,
   wherein the document attribute information and the other document attribute information further include creator information associated with a document creator, and
   in a case where pieces of the project information are different and pieces of the creator information are the same, the position of the document is determined to be closer than a case where the pieces of the creator information are different.

7. The information processing apparatus according to claim 1,
   wherein an arrangement image in a case where the icon of the document is aligned at the determined position is presented, and
   the document in the storage area is moved to the display area and is arranged according to the arrangement image by an operation of a user with respect to the arrangement image.

8. The information processing apparatus according to claim 7,
   wherein, in the arrangement image, the document is displayed together with the other document.

9. The information processing apparatus according to claim 8,
   wherein a plurality of the documents are stored in the storage area, and
   all of the plurality of documents in the storage area are displayed in the arrangement image.

10. The information processing apparatus according to claim 8,
    wherein a plurality of the documents are stored in the storage area, and
    some of the plurality of documents in the storage area are displayed in the arrangement image.

11. The information processing apparatus according to claim 7,
    wherein, in the arrangement image, the document is displayed without including the other document.

12. The information processing apparatus according to claim 1,
    wherein a plurality of the other documents are provided,
    the other document attribute information and the positional information are acquired for each of the plurality of the other documents, and
    a rule of alignment is generated based on a plurality of pieces of the acquired positional information, and the position of the document is determined by the generated rule.

13. A non-transitory computer readable medium storing a program causing an information processing apparatus to:
    acquire document attribute information of a document stored in a storage area;

acquire other document attribute information of another document and positional information of the other document by accessing the storage area in a case where the other document is displayed in a display area, wherein the positional information of the other document is calculated by weighting positional information as a history in which the other document is moved to the display area; and determine a position in a case where the document is displayed in the display area based on the document attribute information, the other document attribute information, and the positional information, which are acquired; and align an icon of the document and an icon of the other document based on the determined position.

14. An information processing method comprising:

acquiring document attribute information of a document stored in a storage area;

acquiring other document attribute information of another document, and positional information of the other document by accessing the storage area in a case where the other document is displayed in a display area, wherein the positional information of the other document is calculated by weighting positional information as a history in which the other document is moved to the display area; and determining a position in a case where the document is displayed in the display area based on the document attribute information, the other document attribute information, and the positional information, which are acquired; and aligning an icon of the document and an icon of the other document based on the determined position.

* * * * *